US011102536B2

(12) United States Patent
Igarashi et al.

(10) Patent No.: US 11,102,536 B2
(45) Date of Patent: Aug. 24, 2021

(54) TRANSMISSION APPARATUS, RECEPTION APPARATUS, AND DATA PROCESSING METHOD

(71) Applicant: Saturn Licensing LLC, New York, NY (US)

(72) Inventors: Tatsuya Igarashi, Tokyo (JP); Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/745,296

(22) PCT Filed: Sep. 5, 2016

(86) PCT No.: PCT/JP2016/076052
§ 371 (c)(1),
(2) Date: Jan. 16, 2018

(87) PCT Pub. No.: WO2017/047434
PCT Pub. Date: Mar. 23, 2017

(65) Prior Publication Data
US 2019/0014366 A1    Jan. 10, 2019

(30) Foreign Application Priority Data
Sep. 18, 2015 (JP) .............................. JP2015-186009

(51) Int. Cl.
*H04N 21/2668* (2011.01)
*H04H 60/27* (2008.01)
(Continued)

(52) U.S. Cl.
CPC ......... *H04N 21/2668* (2013.01); *G06F 13/00* (2013.01); *H04H 20/40* (2013.01);
(Continued)

(58) Field of Classification Search
CPC ............. H04N 21/2668; H04N 21/458; H04N 21/23106; H04N 21/23614;
(Continued)

(56) References Cited

U.S. PATENT DOCUMENTS 6,639,980 B1    10/2003  Weiss et al.
7,877,290 B1 *   1/2011  Arsenault .......... G06Q 30/0241
                                                            705/14.4
(Continued)

FOREIGN PATENT DOCUMENTS

CN    101360203    2/2009
CN    103532823    1/2014
(Continued)

OTHER PUBLICATIONS

International Search Report dated Oct. 4, 2016 in PCT/JP2016/076052, 2 pages.
(Continued)

*Primary Examiner* — Michael R Telan
(74) *Attorney, Agent, or Firm* — Oblon, McClelland, Maier & Neustadt, L.L.P.

(57) ABSTRACT

A configuration is implemented by which, in a case where delivery time periods of transmission contents through different channels overlap with each other, a reception apparatus can select an acquisition target on the basis of priority information. A transmission apparatus sets, for each of transmission contents, service selection priority information (Service Selection Priority) capable of being utilized as a cache process priority criterion in the reception apparatus, and transmits the service selection priority information to the reception apparatus. The service selection priority information is utilized as priority information that makes it possible, in a case where delivery time periods of transmission contents through different channels overlap with each
(Continued)

other, for the reception apparatus to select a content having a high value of the service selection priority information as a cache target.

15 Claims, 37 Drawing Sheets

(51) Int. Cl.
    | | |
    |---|---|
    | *H04H 60/72* | (2008.01) |
    | *G06F 13/00* | (2006.01) |
    | *H04N 21/458* | (2011.01) |
    | *H04H 20/40* | (2008.01) |
    | *H04N 21/231* | (2011.01) |
    | *H04N 21/236* | (2011.01) |
    | *H04N 21/258* | (2011.01) |
    | *H04N 21/431* | (2011.01) |

(52) U.S. Cl.
    CPC ............ *H04H 60/27* (2013.01); *H04H 60/72* (2013.01); *H04N 21/23106* (2013.01); *H04N 21/23614* (2013.01); *H04N 21/25891* (2013.01); *H04N 21/4314* (2013.01); *H04N 21/458* (2013.01)

(58) Field of Classification Search
    CPC .......... H04N 21/25891; H04N 21/4314; G06F 13/00; H04H 20/40; H04H 60/27; H04H 60/72
    See application file for complete search history.

(56) References Cited

U.S. PATENT DOCUMENTS

| | | | | |
|---|---|---|---|---|
| 9,055,348 | B1* | 6/2015 | Kerns | .............. H04N 21/26258 |
| 2005/0081252 | A1* | 4/2005 | Chefalas | ................ H04N 7/163 |
| | | | | 725/135 |
| 2008/0077959 | A1 | 3/2008 | Kirimura et al. | |
| 2008/0092191 | A1* | 4/2008 | DeBie | ................... H04N 5/765 |
| | | | | 725/116 |
| 2009/0286520 | A1* | 11/2009 | Nielsen | ................ H04N 21/812 |
| | | | | 455/414.2 |
| 2010/0095328 | A1 | 4/2010 | Hartung et al. | |
| 2010/0134701 | A1* | 6/2010 | Eyer | .................... H04N 21/235 |
| | | | | 348/731 |
| 2010/0146553 | A1* | 6/2010 | Lo | ...................... H04N 5/44543 |
| | | | | 725/54 |
| 2012/0301117 | A1* | 11/2012 | Alder | ................. H04N 5/44543 |
| | | | | 386/293 |
| 2014/0189140 | A1 | 7/2014 | Takahashi | |
| 2014/0201796 | A1 | 7/2014 | Moon et al. | |
| 2014/0298381 | A1 | 10/2014 | Koyama et al. | |
| 2014/0307734 | A1 | 10/2014 | Luby et al. | |
| 2015/0319055 | A1 | 11/2015 | Sakoda et al. | |
| 2017/0171606 | A1* | 6/2017 | Lee | ...................... H04N 21/236 |

FOREIGN PATENT DOCUMENTS

| | | |
|---|---|---|
| EP | 1 263 224 A1 | 12/2002 |
| JP | 2010-500797 A | 1/2010 |
| JP | 2011-87103 A | 4/2011 |
| JP | 2012-164297 A | 8/2012 |
| JP | 2014-57227 A | 3/2014 |
| JP | 2014-126972 A | 7/2014 |
| JP | 2014-211779 A | 11/2014 |
| JP | 5672411 B1 | 2/2015 |
| WO | WO2013/088822 A1 | 6/2013 |

OTHER PUBLICATIONS

Extended European Search Report dated Apr. 2, 2019 in corresponding European Patent Application No. 16846305.7, 10 pages.

* cited by examiner

FIG. 6

(A) EXAMPLE OF ADVERTISEMENT SETTING BY AGE

| AGE (age) = 20 YEARS OLD OR MORE | ADVERTISEMENT OF ALCOHOLIC BEVERAGES (INTOXICATING LIQUORS) |
|---|---|
| AGE (age) = 15 YEARS OLD OR LESS | ADVERTISEMENT OF TOYS |

(B) EXAMPLE OF ADVERTISEMENT SETTING BY RESIDENCE

| ADDRESS (Location) = ALASKA | ADVERTISEMENT OF HEATING EQUIPMENT |
|---|---|
| ADDRESS (Location) = HAWAII | ADVERTISEMENT OF COOLING EQUIPMENT |

(C) EXAMPLE OF ADVERTISEMENT SETTING BY AGE AND RESIDENCE

| AGE (age) = 18 YEARS OLD OR MORE | ADDRESS (Location) = NEW YORK | ADVERTISEMENT OF RESTAURANTS IN NEW YORK |
|---|---|---|
| AGE (age) = 15 YEARS OLD OR LESS | ADDRESS (Location) = CALIFORNIA | ADVERTISEMENT OF TOY STORES IN CALIFORNIA |

FIG. 17
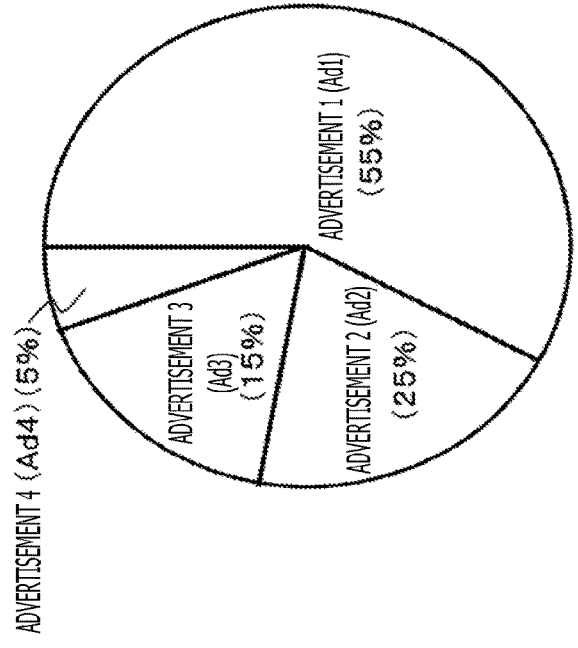
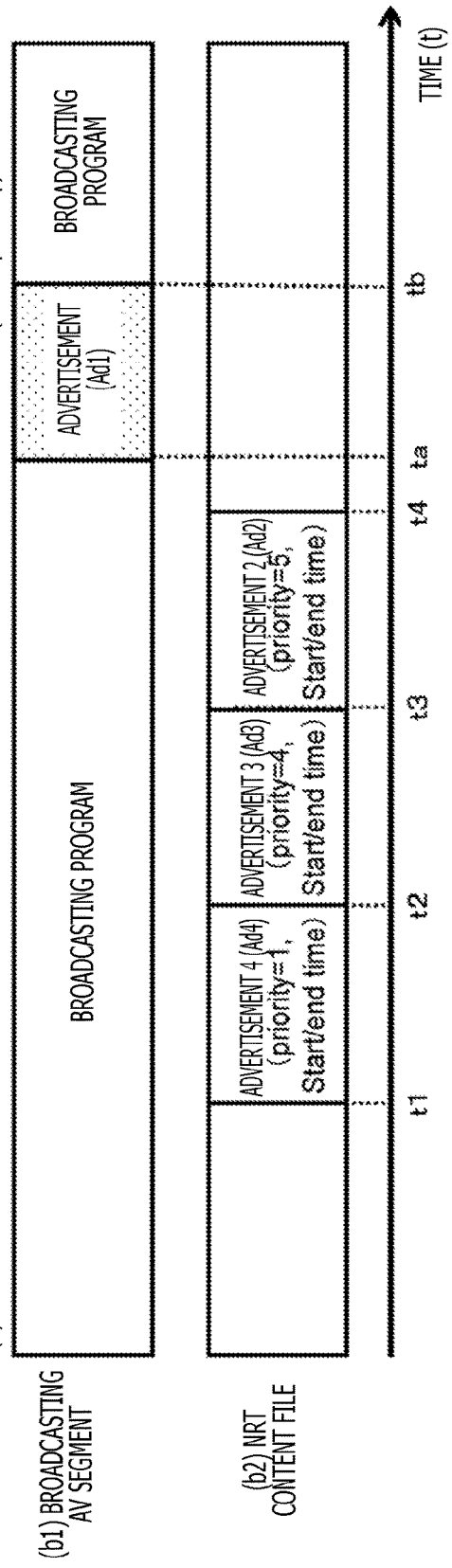

TRANSMISSION APPARATUS, RECEPTION APPARATUS, AND DATA PROCESSING METHOD

TECHNICAL FIELD

The present disclosure relates to a transmission apparatus, a reception apparatus, and a data processing method. More particularly, the present disclosure relates to a transmission apparatus, a reception apparatus, and a data processing method ready for communication data for executing transmission or reception of data, for example, through a broadcasting wave or a network.

BACKGROUND ART

OTT (Over The Top) is available as a data delivery method capable of delivering a content such as image data or sound data irrespective of a service form of each of communications carriers. A delivery content by the OTT is called OTT content, and a delivery service of image (video) data utilizing the OTT is called OTT video or OTT-V (Over The Top Video).

As a data streaming delivery standard in accordance with the OTT-V, the DASH (Dynamic Adaptive Streaming over-HTTP) standard is available. DASH is a standard relating to adaptive (adaptive type) streaming delivery for which a streaming protocol based on HTTP (HyperText Transfer Protocol) is used.

In adaptive (adaptive type) streaming, in order to make it possible for content reproduction to be performed by various clients that are data delivery destinations, a content delivery server of a broadcasting station or the like creates a manifest file in which segmented files of moving picture contents of a plurality of bitrates and attribute information and a URL (Uniform Resource Locator) of each of the segmented files are described, and presents the manifest file to a client.

The client acquires the manifest file from the server and selects an optimum bitrate content according to the size of a display section of the own apparatus or a utilizable communication bandwidth, and receives and reproduces the selected content. Also dynamic change of the bitrate can be performed in response to a variation of the network bandwidth, and the client side can switchably receive an optimum content suitable for a situation at any time, and reproduction of a moving picture content in which occurrence of video intermittence is reduced is implemented. It is to be noted that adaptive (adaptive type) streaming is disclosed, for example, in PTL 1 (JP 2011-87103A).

Development and standardization relating to a system for transmitting and receiving a content such as a broadcasting program using one-way communication by a broadcasting wave or the like from a transmission apparatus of a broadcasting station or some other content server to a reception apparatus such as a television set, a PC or a portable terminal or using bidirectional communication or one-way communication through a network such as the Internet are proceeding actively.

It is to be noted that, as a related art document that discloses a technology for implementing data delivery through a broadcasting wave and a network, for example, PTL 2 (JP 2014-057227A) is available.

As a standard relating to a data delivery system through a broadcasting wave and a network, standardization of ATSC (Advanced Television System Committee) 3.0 is proceeding at present.

In ATSC3.0, a configuration is examined in which middleware for executing a reception process and so forth of an ATSC3.0 broadcast is incorporated in a broadcast delivery device (reception device) in which an ATSC3.0 compliant physical layer (ATSC-PHY) is incorporated so as to make it possible to receive signaling data including control information and so forth for ATSC broadcasting to perform various controls based on the signaling data.

In particular, a configuration is examined which makes it possible to implement, by control based on signaling data, an outputting process of a broadcast content or a data process utilizing various applications provided through a broadcasting wave or the like utilizing an application program utilized in the Internet or the like, namely, a client application, as it is.

For example, an ATSC3.0 compliant physical layer (ATSC-PHY) and ATSC3.0 broadcast reception middleware are incorporated in a server (not only a server for exclusive use but also a PC, a TV, a tablet, a smartphone or the like), which receive broadcast service, installed in a home or at a hot spot.

After an ATSC3.0 broadcast service is once received, the servers transfer the broadcast reception data to a user apparatus (a PC, a TV, a tablet, a smartphone or the like) through a network (home network, LAN/WiFi at a hot spot or the like).

The user apparatus to which the broadcast reception data transferred through a server is input can execute reproduction of a broadcast content or various applications delivered through a broadcast utilizing an application (for example, an ATSC3.0 DASH client application) that operates on a reproduction controlling section or an application controlling section of the user apparatus.

Further, in 3GPP (Third Generation Partnership Project) that is an international standard specification formulation group or DASH-IF that is a standardization group of the MPEG-DASH standard that is a standard for an adaptive (adaptive type) streaming technology, standardization of delivery and reproduction configurations of advertisement contents is being proceeded.

In particular, standardization of a configuration and so forth for dynamically changing advertisements to be outputted to different reception apparatus, for example, in response to viewing users at the reception apparatus side is being proceeded.

However, it is the current situation that a configuration for implementing this configuration is not materialized as yet.

CITATION LIST

Patent Literature

[PTL 1]
  JP 2011-87103A
[PTL 2]
  JP 2014-057227A

SUMMARY

Technical Problems

The present disclosure has been made in view of such problems as described above, and it is an object of the present disclosure to provide a transmission apparatus, a reception apparatus, and a data processing method that make it possible for a reception apparatus, which receives and reproduces a broadcasting program or the like, to selectively output a user-corresponding content such as an advertisement according to a user of a reception apparatus side.

Solution to Problems

A first aspect of the present disclosure resides in a transmission apparatus, including a data processing section that sets, for each of transmission contents, service selection priority information (Service Selection Priority) capable of being utilized as a cache process priority criterion in a reception apparatus, and transmits the service selection priority information (Service Selection Priority) to the reception apparatus.

Further, a second aspect of the present disclosure resides in a reception apparatus, including a data processing section that receives contents and stores the contents into a cache section. The data processing section acquires service selection priority information (Service Selection Priority) set corresponding to each of the contents, and preferentially receives, in accordance with the acquired service selection priority information (Service Selection Priority), a content having a high set value of the service selection priority information (Service Selection Priority) and stores the content into the cache section.

Further, a third aspect of the present disclosure resides in a data processing method executed by a transmission apparatus, including by a data processing section, setting, for each of transmission contents, service selection priority information (Service Selection Priority) capable of being utilized as a cache process priority criterion in a reception apparatus, and transmitting the service selection priority information (Service Selection Priority) to the reception apparatus.

Further, a fourth aspect of the present disclosure resides in a data processing method executed by a reception apparatus, including executing, by a data processing section, a process for receiving contents and storing the contents into a cache section. The data processing section acquires service selection priority information (Service Selection Priority) set corresponding to each of the contents, and preferentially receives, in accordance with the acquired service selection priority information (Service Selection Priority), a content having a high set value of the service selection priority information (Service Selection Priority) and stores the content into the cache section.

Further, a fifth aspect of the present disclosure resides in an application controlling method executed by a reception apparatus. An application controlling section has an API (Application Programming Interface) that issues an instruction regarding whether a content delivered thereto is to be stored into a cache section and an instruction regarding whether or not the content stored in the cache is to be outputted within a given period of time, the application controlling method including determining depending upon a decision of an application whether or not the content is to be outputted finally.

Further objects, features and advantages of the present disclosure will become more apparent from a more detailed description based on the working example hereinafter described and the attached drawings. It is to be noted that the term system herein is a logical aggregation configuration of a plurality of apparatus and is not limited to a system in which component apparatus are accommodated in the same housing.

Advantageous Effects of Invention

With the configuration of one working example of the present disclosure, a configuration is implemented by which, in a case where delivery time periods of transmission contents through different channels overlap with each other, the reception apparatus can select an acquisition target on the basis of priority information.

In particular, the transmission apparatus sets, for each of transmission contents, service selection priority information (Service Selection Priority) capable of being utilized as a cache process priority criterion in the reception apparatus, and transmits the service selection priority information to the reception apparatus. The service selection priority information is utilized as priority information that makes it possible, in a case where delivery time periods of transmission contents through different channels overlap with each other, for the reception apparatus to select a content having a high value of the service selection priority information as a cache target.

By the present configuration, a configuration can be implemented by which, in a case where delivery time periods of transmission contents through different channels overlap with each other, the reception apparatus can select an acquisition target on the basis of the priority information.

It is to be noted that the advantageous effects described herein are illustrative and not restrictive to the last and there may be additional effects.

BRIEF DESCRIPTION OF DRAWINGS

FIG. 6 is a view illustrating an example of selection of an output advertisement utilizing various user information.

FIG. 17 is a view illustrating an example of delivery order setting of a plurality of advertisements.

DESCRIPTION OF EMBODIMENT

In the following, details of a transmission apparatus, a reception apparatus, and a data processing method of the present disclosure are described with reference to the drawings. It is to be noted that the description is given in the following order.

1. Example of Configuration of Communication System
2. Data Communication Protocol FLUTE, and ROUTE
3. Example of Communication Process Executed by Transmission Apparatus and Reception Apparatus
4. Example of Data Output in Reception Apparatus
5. Example of Configuration and Example of Process of Reception Apparatus
6. Signaling Data of Period (Period) Unit Utilizing MPD
7. Example of Particular Configuration for Executing Advertisement Provision Process According to User Information
8. Controlling Configuration of Delivery Order of Advertisement Contents
9. Example of Process Based on Delivery Priority Information (Delivery Priority)
10. Process to Which Service Selection Priority Information (Service Selection Priority) Is Applied
11. Example of Recording Configuration of Individual Priority Information
12. Example of Configuration of Transmission Apparatus and Reception Apparatus
13. Summary of Configuration of Present Disclosure 1. Example of Configuration of Communication System First, an example of a configuration of a communication system that executes a process of the present disclosure is described with reference to FIG. 1.

Figure 1:
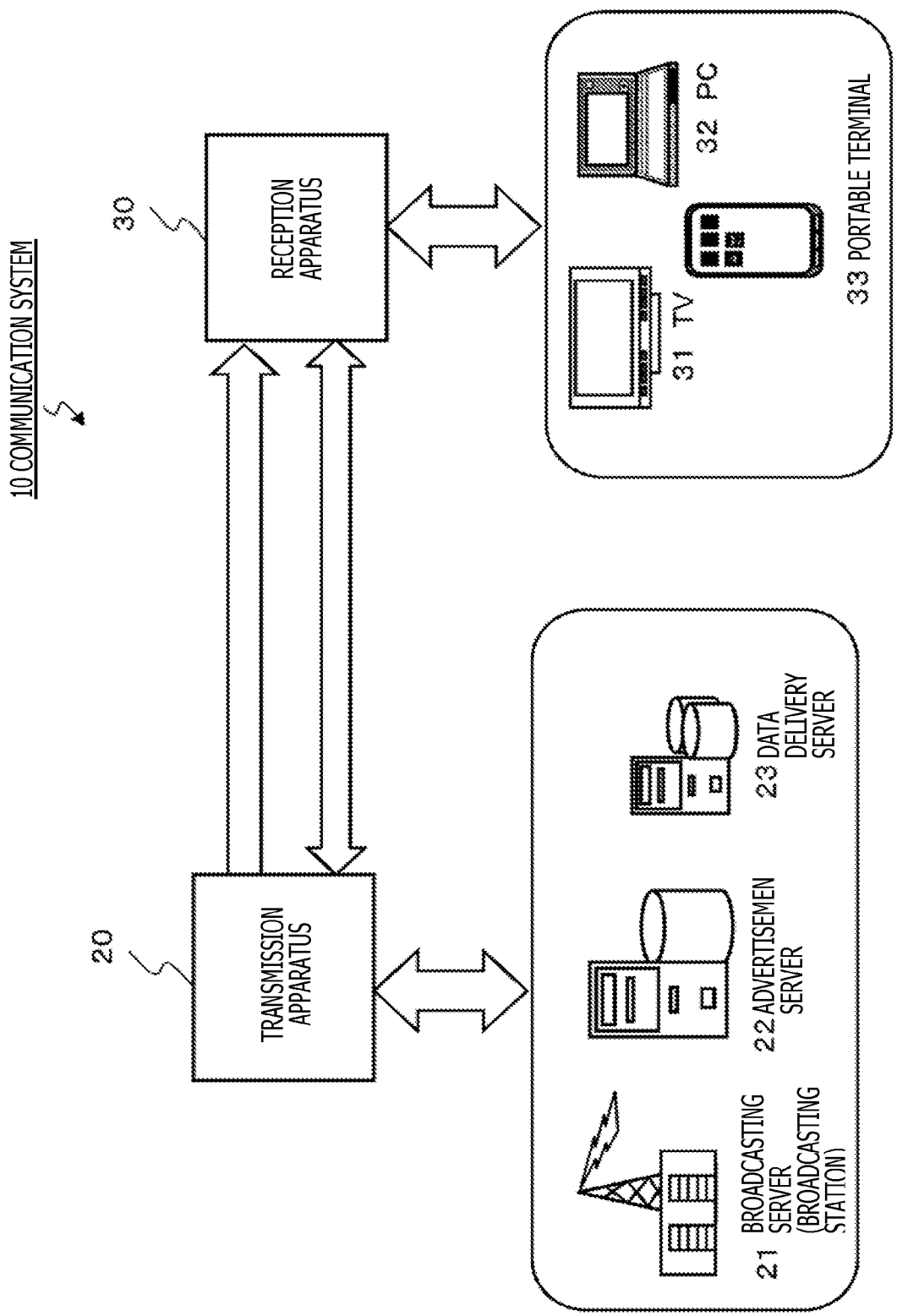
FIG. 1 is a view illustrating an example of a configuration of a communication system that executes a process of the present disclosure.

As depicted in FIG. 1, a communication system 10 includes a transmission apparatus 20 that is a communication apparatus that transmits a content of image data, sound data or the like, and a reception apparatus 30 that is a communication apparatus that receives the content transmitted from the transmission apparatus 20.

The transmission apparatus 20 particularly is an apparatus at the side that provides various contents (broadcasting programs, advertisements and other data) such as, for example, a broadcasting server (broadcasting station) 21 that principally transmits TV programs and so forth, an advertisement service 22 that principally transmits advertisement data, or a data delivery server 23 that transmits various data.

Meanwhile, the reception apparatus 30 is a client apparatus of a general user and particularly is configured, for example, from a television set 31, a PC 32, a portable terminal 33 or the like.

It is to be noted that, although the broadcasting server (broadcasting station) 21, advertisement service 22, and data delivery server 23 are depicted distinctly as examples of the transmission apparatus 20 in FIG. 1, one server may be configured such that it transmits all the broadcasting programs, advertisements and other data.

Data communication between the transmission apparatus 20 and the reception apparatus 30 is performed as communication that utilizes at least one or both bidirectional communication and one way communication through a network such as the Internet or one-way communication by a broadcasting wave.

Content transmission from the transmission apparatus 20 to the reception apparatus 30 is executed, for example, in accordance with the MPEG-DASH standard that is a standard for an adaptive (adaptive) streaming technology.

The MPEG-DASH standard includes the following two standards.

(a) A standard regarding a manifest file (MPD: Media Presentation Description) for describing metadata that is management information for a moving image or an audio file.

(b) A standard regarding a file format (segment format) for transmission of a moving image content.

Content delivery from the transmission apparatus 20 to the reception apparatus 30 is executed in accordance with the MPEG-DASH standard described above.

The transmission apparatus 20 encodes content data to create a data file including encoded data and metadata of the encoded data. The encoding process is executed, for example, in accordance with the MP4 file format prescribed in MPEG. It is to be noted that a file of encoded data in a case where the transmission apparatus 20 creates a data file of the MP4 format is called "mdat," and a file of metadata is called "moov," "moof" or the like.

Contents provided from the transmission apparatus 20 to the reception apparatus 30 are various data including video data such as, for example, music data, movies, television programs, videos, photographs, documents, pictures, charts and so forth, games, software and so forth.

Transmission data of the transmission apparatus 20 are described with reference to FIG. 2.

Figure 2:
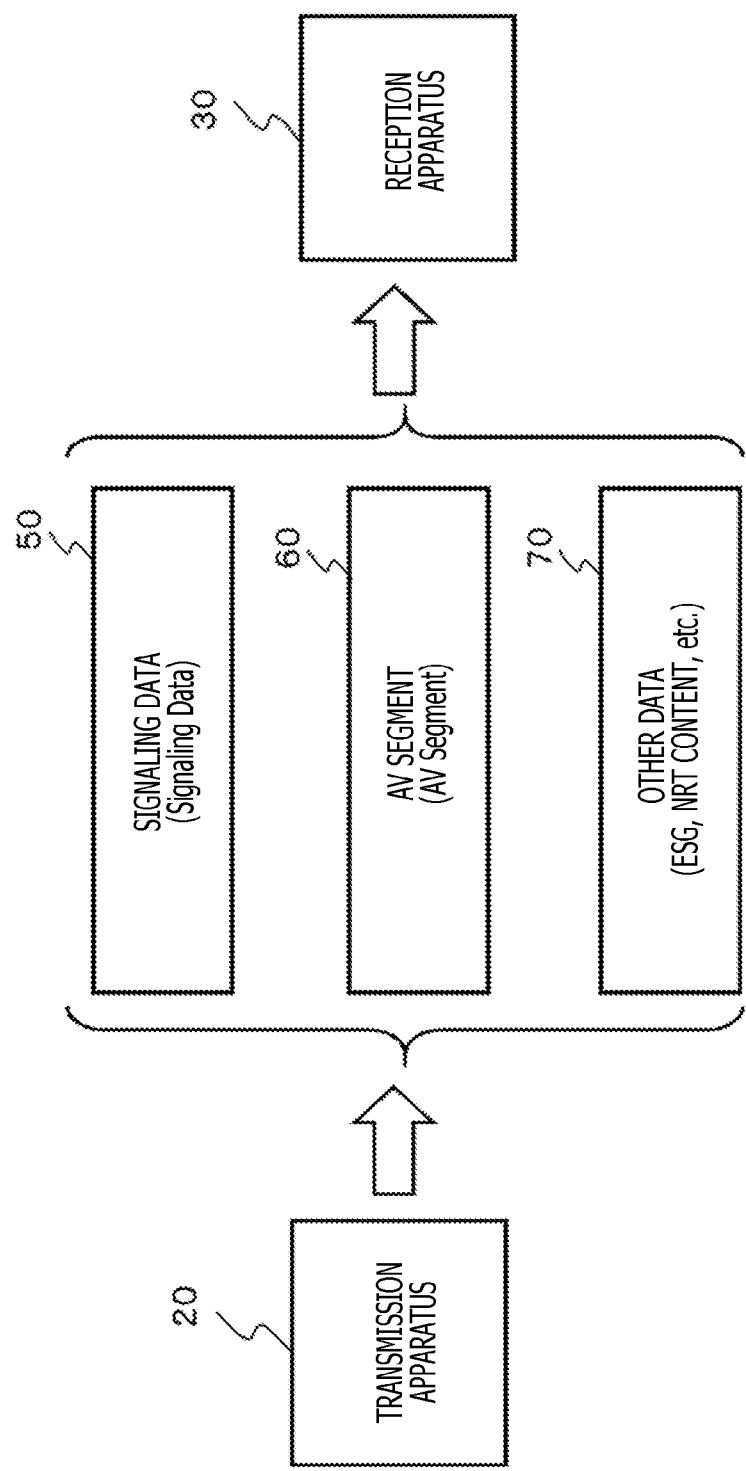
FIG. 2 is a view illustrating transmission data of a transmission apparatus.

The transmission apparatus 20 that executes data transmission in accordance with the MPEG-DASH standard performs transmission of plural kinds of data when divided roughly as depicted in FIG. 2:

(a) signaling data 50
(b) AV segment 60
(c) other data (ESG, NRT content and so forth) 70

The AV segment 60 is configured from image (Video) or sound (Audio) data to be reproduced by a reception apparatus, namely, a broadcasting program content provided, for example, from a broadcasting station or the like. For example, the AV segment 60 is configured from MP4 encoded data (mdat) or metadata (moov, moof) described hereinabove. It is to be noted that an AV segment is also called DASH segment.

Meanwhile, the signaling data 50 is configured from broadcasting program schedule information such as a broadcasting program table, address information required for broadcasting program acquisition (URL (Uniform Resource Locator) or the like), information necessary for a reproduction process of a content, guide information configured, for example, from codec information (encoding method or the like), and various control information such as application control information.

It is necessary for the reception apparatus 30 to receive the signaling data 50 in prior to reception of the AV segment 60 in which a broadcasting program content that is a reproduction target is stored.

The signaling data 50 is transmitted as data of, for example, the XML (Extensible Markup Language) format from the transmission apparatus 20.

The signaling data is repetitively transmitted at any time. For example, the signaling data is transmitted frequently and repetitively after every 100 milliseconds or the like.

This is because it is intended to make it possible for a reception apparatus (client) to acquire the signaling data immediately at any time.

It is possible for the client apparatus (reception apparatus) to execute, at any time without a delay, a process necessary for reception and reproduction of a broadcasting program content such as acquisition of a necessary access address of a broadcasting program content or a codec setting process on the basis of receivable signaling data.

The other data 70 includes, for example, an ESG (Electronic Service Guide), an NRT content and so forth.

The ESG is an electronic service guide (Electronic Service Guide) and is guide information such as, for example, a broadcasting program table.

The NRT content is a content of the non-real time type.

The NRT content includes various application files to be executed, for example, on a browser of the reception apparatus 30 that is a client, data files of moving images, still images and so forth.

It is to be noted that such schedules as delivery time period of an NRT content and presentation time period are described in the ESG.

The following data depicted in FIG. 2, namely, (a) signaling data 50,
(b) AV segment 60, and
(c) other data (ESG, NRT content and so forth) 70 are transmitted, for example, in accordance with the data communication protocol: FLUTE (File Delivery over Uni-directional Transport).

2. Data Communication Protocol FLUTE, and ROUTE

The data communication protocol: FLUTE (File Delivery over Uni-directional Transport) is a protocol for performing session management of contents to be transmitted by a multicast.

For example, a file (identified based on the URL and the version) created by the server side that is a transmission apparatus is transmitted to a client that is a reception apparatus in accordance with the FLUTE protocol.

The reception apparatus (client) 30 accumulates a URL and a version of a reception file and the file in an associated relationship with each other, for example, into a storage section (client cache).

A file that has the same URL but has a different version is regarded that the substance thereof is updated. Although the FLUTE protocol performs only one-way file transfer control and does not have a selective filtering function of a file by a client, if the client side performs selection of files, whose transfer is controlled by the FLUTE, utilizing metadata linked to the file, then selective filtering can be implemented and a local cache reflecting a liking of a user can be configured, updated and managed.

It is to be noted that the metadata can be extended and incorporated into the FLUTE protocol and also can be described by a separate protocol such as a protocol for the ESG (Electronic Service Guide).

It is to be noted that FLUTE was initially specified as a file transfer protocol in the multicast. FLUTE is configured from a combination of an FDT, a multicast protocol of a scalable file object called ALC, and an LCT or FEC component that particularly is a building block of the multicast protocol.

Although the existing FLUTE was developed in order that it is utilized principally for file transfer of the asynchronous type, it is being extended by the ATSC (Advanced Television System Committee), which is a standardization organization for a data delivery system through a broadcasting wave and a network, to make it easy to apply the same also to broadcast live streaming. The extended specification of FLUTE is called ROUTE (Real-Time Object Delivery over Unidirectional Transport).

As a standard whose standardization is being progressed as one of standards for a data delivery system through a broadcasting wave and a network, ATSC (Advanced Television System Committee) 3.0 is available. This ATSC3.0 prescribes a stack configuration adopted for transmission of signaling data, an ESG, an asynchronous file, a synchronous type stream and so forth replacing the existing FLUTE protocol with ROUTE.

3. Example of Communication Process Executed by Transmission Apparatus and Reception Apparatus Now, an example of a communication process executed by a transmission apparatus and a reception apparatus is described.

Figure 3:
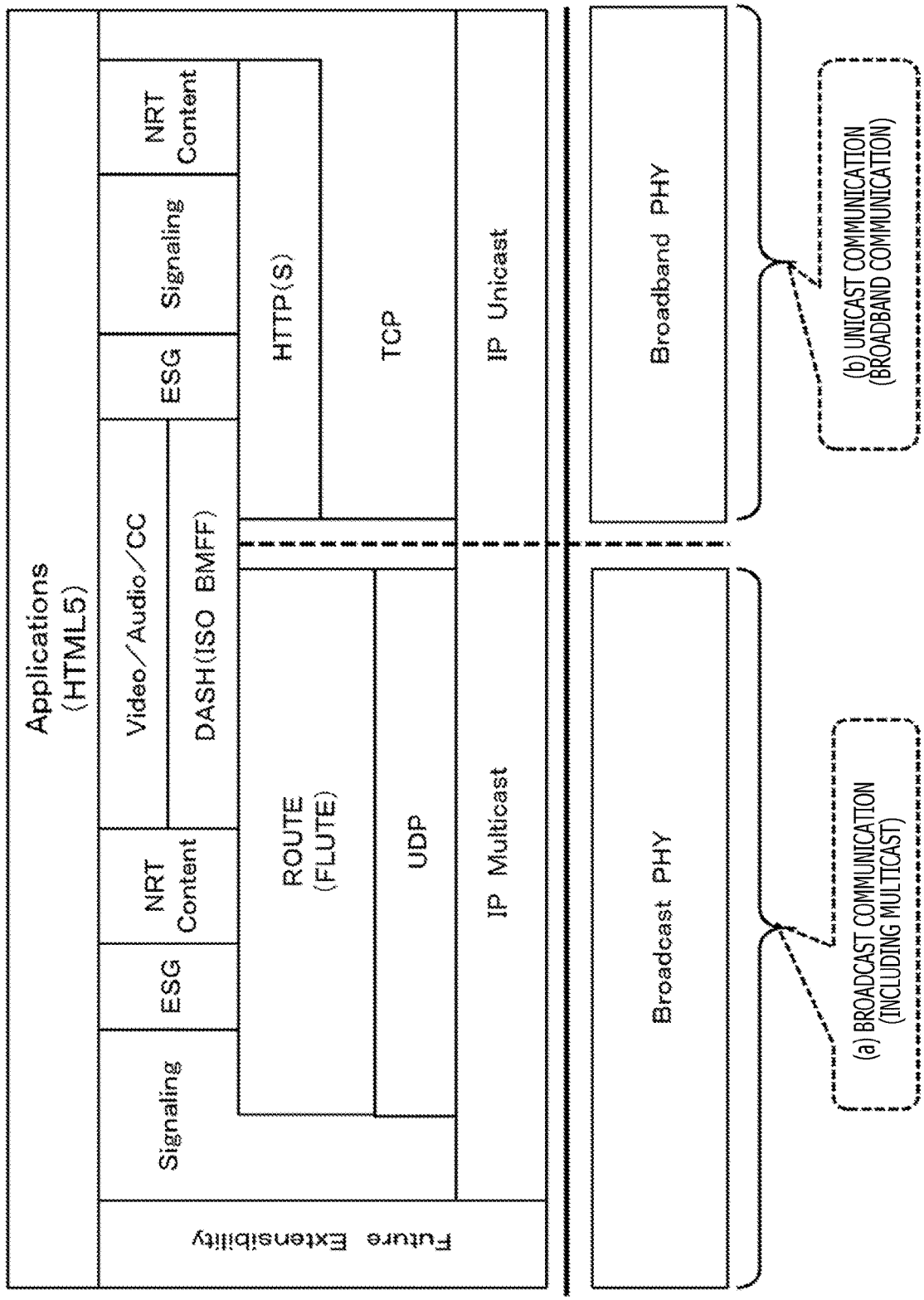
FIG. 3 is a view depicting an example of a protocol stack of the transmission apparatus and a reception apparatus.

FIG. 3 is a view depicting an example of a protocol stack of a transmission apparatus and a reception apparatus.

The example depicted in FIG. 3 has two protocol stacks for performing process of the following two communication data:

(a) broadcast (including multicast) communication (for example, broadcasting type data delivery); and (b) unicast (broadband) communication (for example, P2P communication of the HTTP type)

The left side in FIG. 3 depicts a protocol stack corresponding to the (a) broadcast communication (for example, broadcasting type data delivery).

The right side in FIG. 3 depicts a protocol stack corresponding to the (b) unicast (broadband) communication (for example, P2P communication of the HTTP type).

The (a) broadcast communication (for example, broadcasting type data delivery) depicted at the left side in FIG. 3 has the following layers in order from a lower layer:

(1) broadcast physical layer (Broadcast PHY);

(2) IP multicast layer (IP Multicast);

(3) UDP layer;

(4) ROUTE (=extended type FLUTE) layer;

(5) ESG, NRT content, DASH (ISO BMFF), and Video/Audio/CC; and (6) Application layer (Applications (HTML5))

It is to be noted that a signaling (Signaling) layer is set as an upper layer of the (2) IP multicast layer (IP Multicast).

The signaling layer is a layer applied to transmission and reception of the signaling data 50 described hereinabove with reference to FIG. 2. The signaling data includes broadcasting program schedule information such as a broadcasting program table, address information (URL or the like) necessary for broadcasting program acquisition, information necessary for a reproduction process of a content, guide information configured, for example, from codec information (encoding method or the like) or the like, control information and so forth.

The signaling data is data including access information of an AV segment received and reproduced by a reception apparatus (client), guide information necessary for a process after reception such as a decoding process and control information, and is data transmitted repetitively at any time from a transmission apparatus.

The signaling data has various types according to information. In particular, for example, a USD (user service description (User Service Description)) that is signaling data in a unit of a service is available.

The USD includes various kinds of control information. As representative control information, an MPD (media presentation description (Media Presentation Description)) that is signaling data having a manifest file in which various guide information and control information corresponding to contents (AV segments) are stored is available.

The various kinds of signaling data are data each necessitated by a reception apparatus (client) for reception, a reproduction process, and a control process of an AV segment or an application (application program) transmitted from a transmission apparatus, and are set, for example, as files (metafiles) separate for separate categories and transmitted from a transmission apparatus.

It is to be noted that, (1) as an upper layer of the broadcast physical layer (Broadcast PHY), a utilization permitting layer of a new protocol in the future (Future Extensibility) is set.

The (1) broadcast physical layer (Broadcast PHY) is a physical layer configured by a communication controlling section that controls a communication section, for example, of a broadcasting system for executing broadcast communication.

The (2) IP multicast layer (IP Multicast) is a layer that executes a data transmission and reception process in accordance with the IP multicast.

The (3) UDP layer is a creation, analysis processing layer of a UDP packet.

The (4) ROUTE layer is a layer for performing storage or retrieval of transfer data in accordance with the ROUTE protocol that is an extended type FLUTE protocol.

ROUTE is a multicast protocol of a scalable file object called ALC similarly to FLUTE and particularly is configured from a combination of an LCT that is a building block of the protocol or FEC components.

Figure 4:
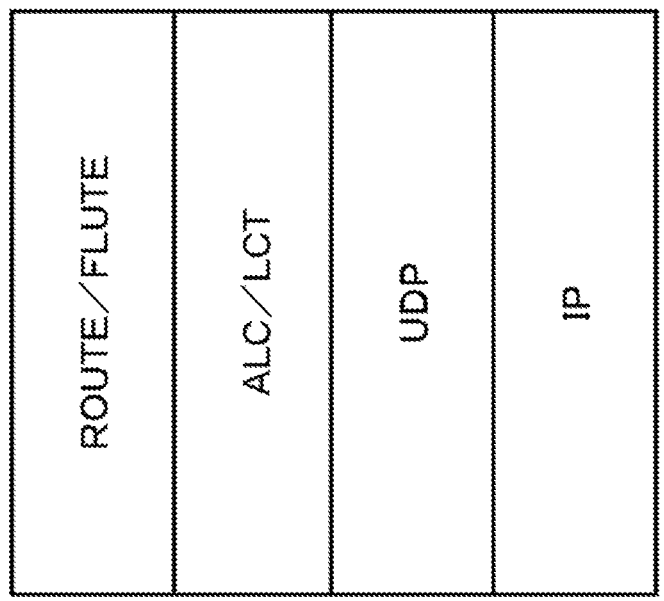
FIG. 4 is a view depicting a protocol stack relating to ROUTE and FLUTE.

FIG. 4 depicts a protocol stack relating to ROUTE and FLUTE.

The (5) ESG, NRT content, DASH (ISO BMFF), and Video/Audio/CC are data transferred in accordance with the ROUTE protocol.

A broadcast type delivery service in accordance with the DASH standard is called MBMS (Multimedia Broadcast Multicast Service). As a method for efficiently implementing the MBMS by LTE, eMBMS (evolved Multimedia Broadcast Multicast Service) is available.

MBMS or eMBMS is a broadcast type delivery service and is a service by which same data, for example, a movie content or the like is delivered all at once using a common bearer to a plurality of user terminals (UEs) that are reception apparatus positioned within a particular area. By broadcast delivery in accordance with MBMS or eMBMS, the same content can be provided simultaneously to a large number of reception apparatus such as smartphones, PCs or television sets positioned within a delivery service providing area.

MBMS and eMBMS prescribe a process for downloading a file, which complies with the 3GPP file format (ISO-BMFF file, MP4 file), in accordance with the transfer protocol ROUTE or FLUTE.

Most of the following data described hereinabove with reference to FIG. 2, namely, (a) signaling data 50, (b) AV segment 60 and (c) other data (ESG, NRT content and so forth) 70 are transmitted in accordance with the ROUTE protocol or the FLUTE protocol.

The (5) ESG, NRT content, DASH (ISO BMFF), and Video/Audio/CC are data transferred in accordance with the ROUTE protocol.

The ESG is electronic service guide (Electronic Service Guide) and is guide information such as, for example, a broadcasting program table.

The NRT content is a content of the non-real time type.

As described hereinabove, the NRT content includes, for example, various application files executed, for example, on a browser of a reception apparatus that is a client, data files of moving images, still images and so forth, and so forth.

The Video/Audio/CC is real data that becomes a reproduction target such as videos, audios and so forth delivered in accordance with the DASH standard.

The (6) application layer (Applications (HTML5)) is an application layer for executing creation or analysis of data to be transferred in accordance with the ROUTE protocol and outputting control and so forth of other various data, and performs data creation, analysis, outputting processes and so forth in which, for example, HTML5 is applied.

On the other hand, the protocol stack corresponding to the (b) unicast (broadband) communication (for example, P2P communication of the HTTP type) depicted at the right side in FIG. 3 has the following layers in order from a lower layer:

(1) broadband physical layer (Broadband PHY);
(2) IP unicast layer (IP Unicast);
(3) TCP layer;
(4) HTTP layer;
(5) ESG, Signaling, NRT content, DASH (ISO BMFF), and Video/Audio/CC; and
(6) application layer (Applications (HTML5)).

The (1) broadband physical layer (Broadband PHY) is a physical layer configured by a communication controlling section such as a device driver that controls a communication section such as, for example, a network card that executes broadband communication.

The (2) IP unicast layer (IP Unicast) is a layer that executes an IP unicast transmission and reception process.

The (3) HTTP layer is a creation and analysis processing layer of an HTTP packet.

The upper layers are similar to those of the stack configuration of the (a) broadcast communication (for example, broadcasting type data delivery) at the left side in FIG. 3.

It is to be noted that the transmission apparatus (server) 20 and the reception apparatus (client) 30 perform process in accordance with at least one of the two processing systems of FIG. 3, namely, of the two communication protocol stacks for (a) broadcast communication (for example, broadcasting type data delivery); and
(b) unicast (broadband) communication (for example, P2P communication of the HTTP type).

In the protocol stack depicted in FIG. 3, an attribute of a file group (including a URL that is an identifier of a file) to be multicast transferred in accordance with ROUTE (FLUTE) not only can be described in a control file of ROUTE (FLUTE) but also can be described in signaling (Signaling) data in which a file transfer session is to be described. Further, also it is possible to describe a further detailed attribute of the file transfer session through an ESG (that can be applied also to a presentation application to an end user).

As described hereinabove, standardization of ATSC (Advanced Television System Committee) 3.0 is being progressed as one of standards relating to a data delivery system through a broadcasting wave and a network.

In standardization of the IP-based transport stack in ATSC3.0, a method has been proposed by which a file based on the file format of MPEG-DASH (ISO-BMFF file, MP4 file) is transferred by the ROUTE (Real-Time Object Delivery over Unidirectional Transport) protocol extended from FLUTE (File Delivery over Unidirectional Transport), and is set as a standard candidate method.

By applying the ROUTE protocol, a fragmented MP4 (fragmented MP4) of the DASH standard and an MPD (Media Presentation Description) that is a control information (signaling data) storage metafile of the DASH standard as well as the USBD/USD and the S-TSID (Service based Transport Session Description) that are signaling data for broadcast delivery and so forth can be transferred.

As described hereinabove, the ROUTE protocol is a protocol based on FLUTE. A metadata file that describes transfer control parameters in FLUTE is called FDT (File Delivery Table), and a metadata file in which transfer control parameters in ROUTE are described is called S-TSID (Service based Transport Session Description). The S-TSID is a superset of FDTs and includes FDTs.

USBD/USD, S-TSID, MPD and so forth proposed as signaling data of the ATSC3.0 service layer (SLS: Service Layer Signaling) are all transferred by a ROUTE session.

4. Example of Data Output from Reception Apparatus

Now, an example of data outputting from the reception apparatus (client) 30 that receives data from the transmission apparatus 20 such as the broadcasting server 21 or the advertisement server 22 and outputs the data is described.

Figure 5:
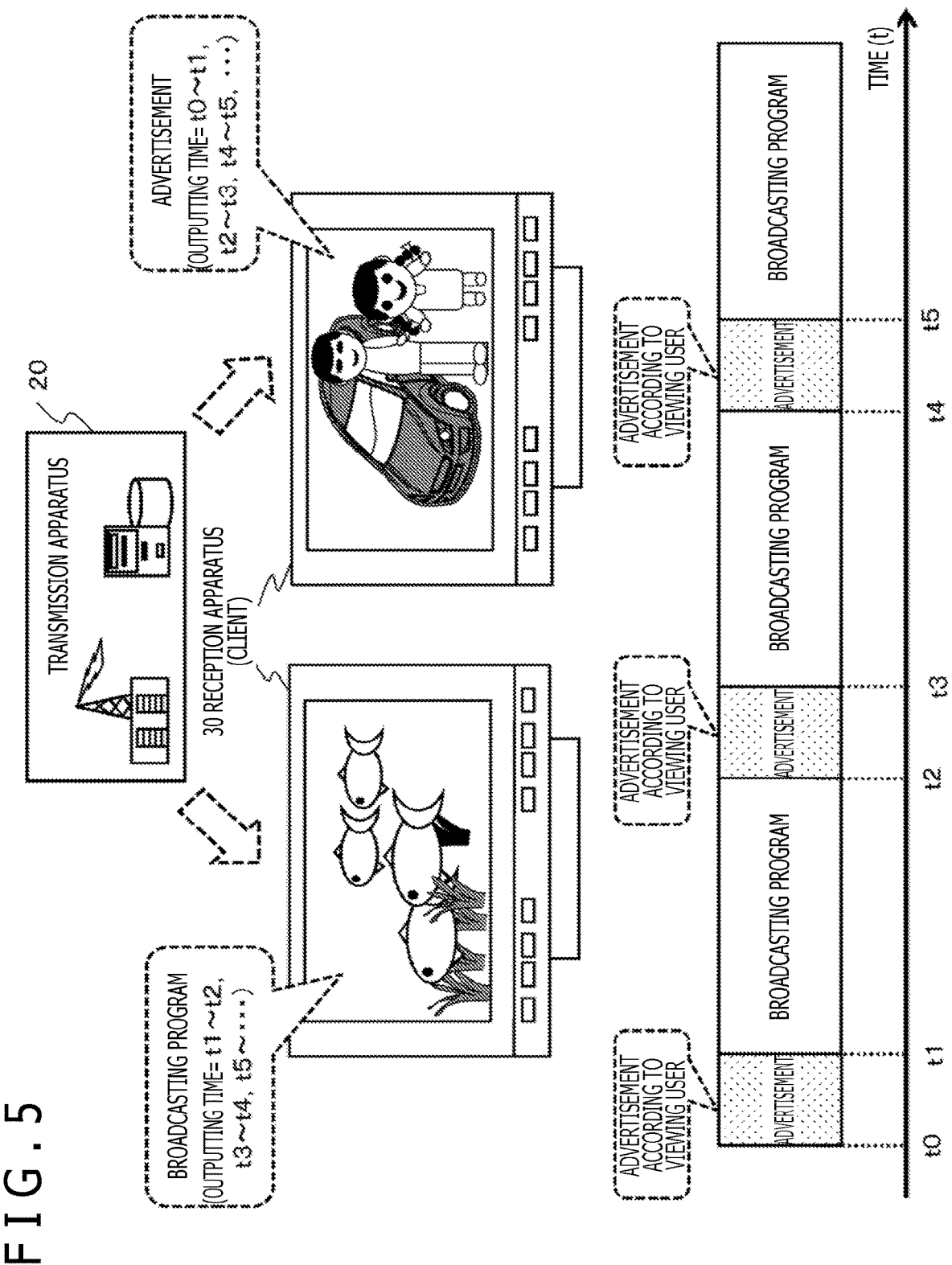
FIG. 5 is a view illustrating an example of a data output of a reception apparatus (client) 30.

FIG. 5 is a view illustrating an example of data outputting from the reception apparatus (client) 30.

To the reception apparatus 30, for example, a movie, news or some other broadcasting program (main content) and an advertisement are outputted alternately along a timeline (time axis (t)) depicted at a lower portion in FIG. 5.

If the broadcasting program start time of a certain channel selected by a user is represented by t0, then a broadcasting program and an advertisement are outputted alternately in accordance with time transition in the following manner:

time period from t0 to t1: advertisement;
time period from t1 to t2: broadcasting program;
time period from t2 to t3: advertisement;
time period from t3 to t4: broadcasting program;
time period from t4 to t5: advertisement; and
time period from t5 or more: broadcasting program.

The advertisement outputted from the reception apparatus 30 here is an advertisement selected from among many advertisement contents by a viewing user at the reception apparatus 30 side.

The reception apparatus 30 selects and outputs an advertisement optimum to a user on the basis of user (viewer) information set by the reception apparatus 30 side under the control of an application.

The user information is various information such as, for example, an age, a sex, an address, a hobby, a taste and so forth of a user (viewer).

For such user information, information registered in advance in the storage section of the reception apparatus is used.

Alternatively, the reception apparatus 30 may be configured such that, at a point of time at which a broadcasting program is started, user information is inputted by the user (viewer) such that the input information is utilized.

Alternatively, the reception apparatus 30 may be configured such that an advertisement to be outputted can be selected freely in response to a user input to the reception apparatus 30.

Various forms are available as setting and utilization forms of user information. For example, a configuration that uses and sets user information in a unit of a broadcasting program and various setting and utilization configures such as setting of a unit of a channel and setting common to all channels are possible.

Such user information is stored into a storage section of a reception apparatus and utilized as occasion demands.

A particular configuration for advertisement selection utilizing user information is hereinafter described.

It is to be noted that, since selection of an advertisement optimum to a user is performed by an application executed by the application controlling section, an optimum advertisement may be acquired from a server through the Internet by the application or it is possible for the application itself to display a question about a sex, an age and so forth such that it asks the user depending upon a reaction of the user or the like.

Examples of selection of an output advertisement utilizing various user information are described with reference to FIG. 6.

FIG. 6 depicts the following three particular examples are depicted:

(A) example of advertisement setting by age;

(B) example of advertisement setting by residence; and (C) example of advertisement setting by age and residence.

In the (A) example of advertisement setting by age, the following examples are depicted.

To a user (viewer) of an age (age)=20 years old or more, an advertisement of alcoholic beverages (intoxicating liquors) is selected and outputted.

To a user (viewer) of an age (age)=15 years old or less, an advertisement of toys is selected and outputted.

The examples are examples in which a user is caused to execute registration of the age of a user as user information registered by the reception apparatus 30 side and an advertisement suitable for the user age is outputted to the reception apparatus 30 utilized by the user on the basis of the registered user information (viewer age).

In the (B) example of advertisement setting by residence, the following examples are depicted.

To a user (viewer) whose address (Location)=Alaska, an advertisement of heating equipment is selected and outputted.

To a user (viewer) whose address (Location)=Hawaii, an advertisement of cooling equipment is selected and outputted.

The examples are examples in which a user is caused to execute registration of an address of a user as user information registered by the reception apparatus 30 side and an advertisement suitable for the address of the user is outputted to the reception apparatus 30 utilized by the user on the basis of the registered user information (viewer address).

In the (C) example of advertisement setting by age and residence, the following examples are depicted.

In a case where the following two conditions the age (age) of a user (viewer)=18 years old or more and the address (Location) of the user (viewer)=New York are satisfied, an advertisement of restaurants in New York is selected and outputted.

In a case where the following two conditions the age (age) of a user (viewer)=15 years old or less and the address (Location) of the user (viewer)=California are satisfied, an advertisement of toy stores in California is selected and outputted.

The examples are examples in which a user is caused to execute registration of the age and the address of a user as user information registered by the reception apparatus 30 side and an advertisement suitable for the user age and address is outputted to the reception apparatus 30 utilized by the user on the basis of the registered user information (viewer age and address).

In this manner, in the process of the present disclosure, a configuration is implemented which selects and outputs an advertisement decided to be optimum to a user (viewer), namely, to have a high advertisement effect, in response to various user information set by the reception apparatus 30 side by an application executed by the application controlling section.

A particular process is hereinafter described.

5. Example of Configuration and Example of Process of Reception Apparatus

Now, an example of a configuration and an example of process of the reception apparatus 30 are described with reference to FIG. 7 and so forth.

It is to be noted that the reception apparatus 30 is configured from a television set 31, a PC 32, a portable terminal 33 or some of various apparatus such as, for example, a smartphone, a tablet terminal, a smart watch, a wearable device and so forth as described hereinabove with reference to FIG. 1.

The reception apparatus 30 depicted in FIG. 7 receives transmission data from the transmission apparatus 20 such as a broadcasting server or an advertisement server, namely, the following respective data described hereinabove with reference to FIG. 2:

signaling data 50;

AV segment 60; and other data (ESG, NRT content and so forth) 70 and executes processing.

Figure 7:
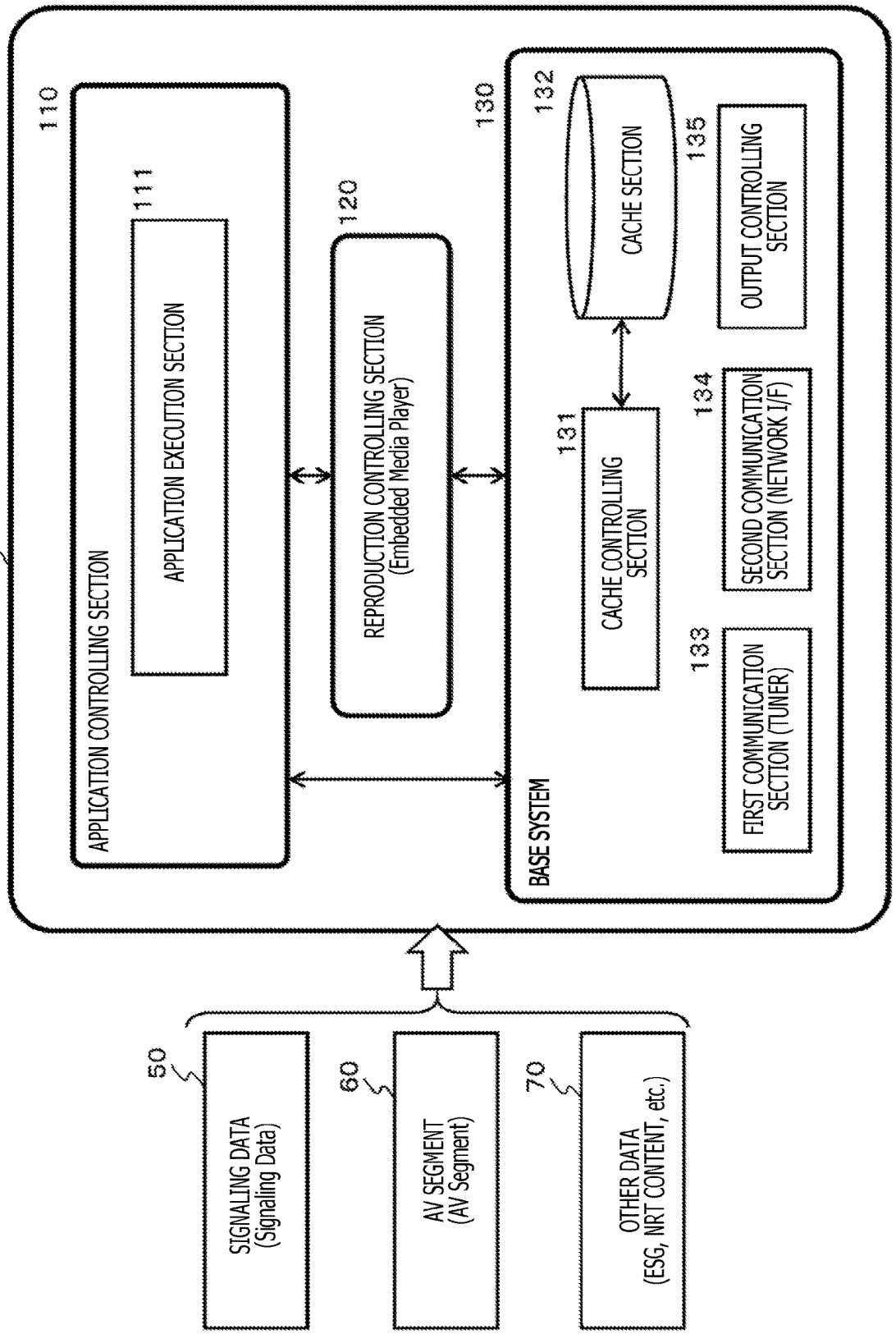
FIG. 7 is a view illustrating an example of a configuration of the reception apparatus.

As depicted in FIG. 7, the reception apparatus 30 includes an application controlling section 110, a reproduction controlling section (Embedded Medial Player) 120, and a base system 130.

The application controlling section 110 includes an application execution section 111 and executes an application transmitted thereto from the transmission apparatus 20 such as, for example, a broadcasting station, an application stored in advance in the reception apparatus 30 or the like.

The reproduction controlling section 120 executes a data reproduction process by broadcasting program reproduction or application execution.

The base system 130 includes a cache controlling section 131, a cache section 132, a first communication section (tuner) 133, a second communication section (network I/F) 134, and an output controlling section 135, and executes a process for receiving and storing data from the transmission apparatus 20, data outputting control for a display section, a speaker and so forth, and so forth.

The first communication section (tuner) 133 executes a reception process of a broadcasting wave. The second communication section (network I/F) 134 executes data communication through a network such as the Internet.

The reproduction controlling section (Embedded Media Player) 120 executes reproduction control of a content transmitted in accordance with, for example, the DASH (MPEG-DASH) standard.

As described hereinabove, the MPEG-DASH standard includes the following two standards:

(a) standard regarding a manifest file (MPD: Media Presentation Description) for describing metadata that is management information for a moving image or an audio file; and (b) standard regarding a file format (segment format) for transmission of a moving image content Content delivery from the transmission apparatus 20 to the reception apparatus 30 is executed in accordance with the MPEG-DASH standard described above.

A content is transmitted as segments (AV segments or the like) that are divisional data of a predetermined unit, for example, in accordance with the MP4 file format prescribed in MPEG, and the reproduction controlling section 120 refers to the manifest file (MPD) to execute a process for acquiring a segment in which a reproduction target content is stored and so forth.

It is to be noted that the reproduction controlling section 120 or the application controlling section 110 refers to signaling data transmitted from the transmission apparatus 20 (broadcasting server 21, advertisement server 22 or the like), acquires necessary data in accordance with information described in the signaling data, and executes reproduction control or application control in accordance with the information described in the signaling data.

It is to be noted that, in the cache section 132, data and so forth received through a broadcasting wave or a network are stored.

As described hereinabove with reference to FIG. 2, the signaling data 50 is configured from broadcasting program schedule information such as a broadcasting program table, address information required for broadcasting program acquisition (URL (Uniform Resource Locator) or the like), information necessary for a reproduction process of a content, guide information configured, for example, from codec information (encoding method or the like), and various control information such as application control information.

The reproduction controlling section 120 or the application controlling section 110 acquires signaling data (SLS: Service Layer Signaling) and executes a data acquisition process, data reproduction control, application execution control and so forth based on the acquired signaling data.

The reproduction controlling section 120 or the application controlling section 110 acquires and utilizes, as signaling data in which control information and so forth for reproduction of a content or an application is recorded, various signaling data such as, for example, a USBD/USD, an application information table (AIT: Application Information Table), an S-TSID, an MPD and so forth.

The signaling data include, for example, an AV segment required for broadcasting program reproduction and address information (URL) for acquiring various data files (resources) required for execution of an application and so forth.

Figure 8:
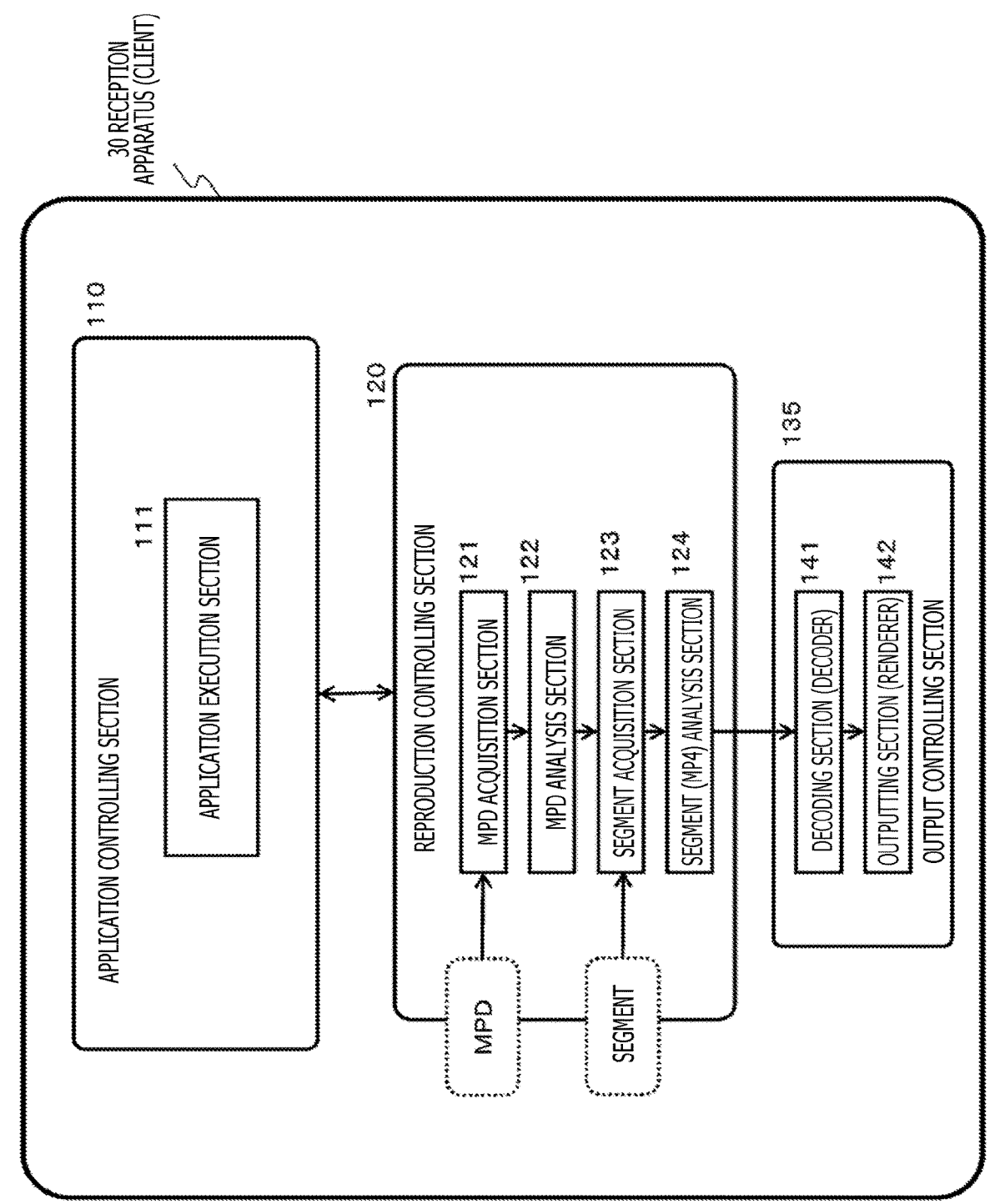
FIG. 8 is a view illustrating an example of a configuration of the reception apparatus.

FIG. 8 is a view depicting a detailed configuration of
the reproduction controlling section 120, and
the output controlling section 135
the reception apparatus (client) 30 has.

The reproduction controlling section 120 of the reception apparatus (client) 30 includes an MPD acquisition section 121, an MPD analysis section 122, a segment acquisition section 123, and a segment (MP4) analysis section 124.

The reproduction controlling section 120 executes reproduction control of a content transmitted in accordance with the DASH (MPEG-DASH) standard as described hereinabove.

The MPD acquisition section 121 acquires a manifest file (MPD: Media Presentation Description) that is a management information description file of moving picture and sound files.

The MPD is provided from the transmission apparatus 20 such as the broadcasting server 21 or the advertisement server 22 and is acquired by the reproduction controlling section 120 after it is stored into the cache section 132.

The MPD analysis section 122 analyzes the description substance of the MPD acquired by the MPD acquisition section 121 and provides information and so forth required for acquisition of a segment corresponding to reproduction target data to the segment acquisition section.

The segment acquisition section 123 performs acquisition of a segment corresponding to reproduction target data in accordance with an MPD analysis result of the MPD analysis section 122.

The segment is predetermined unit data set in accordance with a file format (segment format) for content transmission configured from AV data.

The segment analysis section 124 acquires encoded image data and encoded sound data from a segment acquired by the segment acquisition section 123 and outputs the acquired data to a decoding section (decoder) 141 of the output controlling section 135.

The output controlling section 135 of the reception apparatus (client) 30 includes the decoding section (decoder) 141 and an outputting section (renderer) 142.

The decoding section (decoder) 141 executes a decoding process (decode) of encoded image data and encoded sound data provided from the segment analysis section 124.

The outputting section 142 outputs the decoded image data and sound data to an outputting section (display, speaker).

The reproduction controlling section 120 of the reception apparatus (client) 30 is an execution section of an ATSC3.0 client application (3.0 DASH Client).

The ATSC3.0 client application is executed on a browser incorporated in an ATSC3.0 broadcast reception client device. Alternatively, the ATSC3.0 client application is sometimes executed not only as a browser application but also as native application.

6. Signaling Data of Period (Period) Unit Utilizing MPD

As described hereinabove with reference to FIG. 2 and so forth, the transmission apparatus 20 provides signaling data 50 configured from various control information to the reception apparatus 30.

As described hereinabove, various types according to information are available as signaling data. In particular, a USD (user service description (User Service Description)) that is signaling data, for example, of a unit of a service of a broadcasting program or the like is available.

The USD includes various kinds of control information. As representative control information, an MPD [media presentation description (Media Presentation Description)] that is signaling data including a manifest file in which various guide information and control information corresponding to contents (AV segments) are stored is available.

According to the MPD (Media Presentation Description) that is one of signaling data prescribed in the DASH standard, various control data can be provided to the reception apparatus (client) 30 in a unit of a period (Period) that is a time section, for example, when a broadcasting time period of a certain broadcasting program is subdivided.

Figure 9:
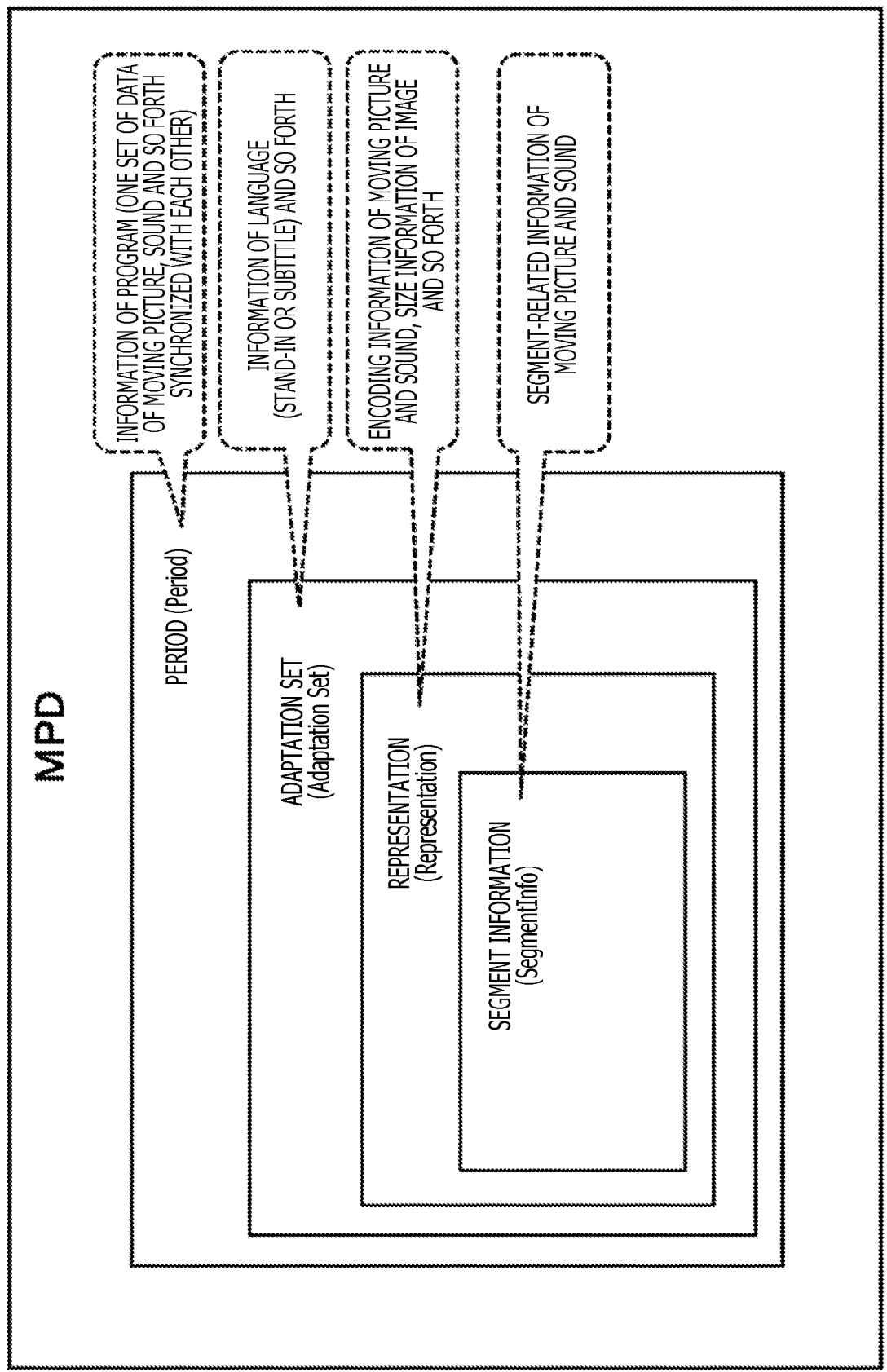
FIG. 9 is a view illustrating an example of a configuration of an MPD.

FIG. 9 is a view depicting an example of a format of the MPD.

According to the MPD, information of an attribute or control information can be described in a unit of the following various prescribed ranges for each of streams of an image or sound:

(1) period (Period) that prescribes a section on the time axis;

(2) adaptation (Adaptation) that prescribes a data type or the like of an image, sound or the like;

(3) representation (Representation) that defines a type of an image, a type of sound or the like; and (4) segment information (SegmentInfo) that becomes an information recording region of a unit of a segment (AV segment) of an image or sound.

Figure 10:
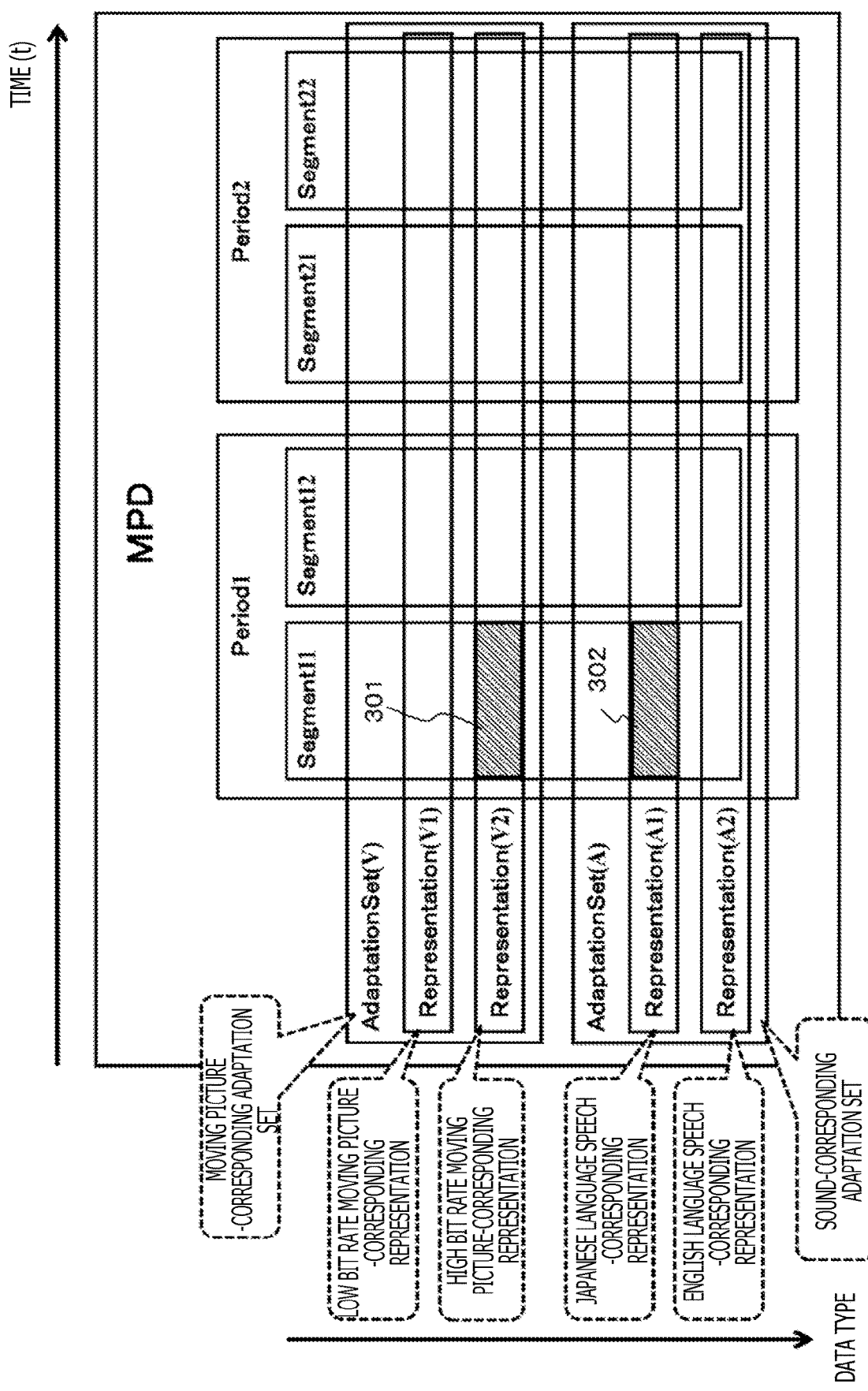
FIG. 10 is a view illustrating an example of a configuration of another MPD.

FIG. 10 is a view depicting information (control information, management information, attribute information and so forth) corresponding to an AV segment recorded in the MPD in a form expanded in time series.

It is assumed that the time passes from the left to the right. This time axis corresponds, for example, to a reproduction time period of AV contents in the reception apparatus.

Various kinds of information corresponding to AV segments are recorded in the MPD. It is to be noted that the MPD is part of signaling data and is transmitted, for example, prior to an AV segment.

According to the MPD, information can be recorded in a unit of the following data as described with reference to FIG. 9:

(1) period (Period) that prescribes a section on the time axis;

(2) adaptation (Adaptation) that prescribes a data type or the like of an image, sound or the like;

(3) representation (Representation) that defines a type of an image, a type of sound or the like; and (4) segment information (SegmentInfo) that becomes an information recording region of a unit of a segment (AV segment) of an image or sound.

FIG. 10 is a view depicting the data regions in a form expanded in time series and in data types.

FIG. 10 depicts the following two adaptations (Adaptation):

(V) adaptation V (Adaptation (V)) that is an image-corresponding information recording region; and (A) adaptation A (Adaptation (A)) that is a sound-corresponding information recording region.

The adaptation V (Adaptation (V)) that is an image-corresponding information recording region has, as information recording regions for units of streams having different attributes from each other, the following two representations (Representation):

(V1) representation (V1) (Representation (V1)) that is an information recording region corresponding to a low bit rate image; and (V2) representation (V2) (Representation (V2)) that is an information recording region corresponding to a high bit rate image.

Similarly, the (A) adaptation A (Adaptation (A)) that is a sound-corresponding information recording region has, as information recording regions for units of streams having different attributes from each other, the following two representations (Representation):

(A1) representation (A1) (Representation (A1)) that is an information recording region corresponding to Japanese language speech; and (A2) representation (A2) (Representation (A2)) that is an information recording region corresponding to English language speech.

Further, each representation (Representation) is configured such that information can be recorded in a unit of a period corresponding to the reproduction time axis and in a unit of a segment.

For example, a reception apparatus (client) that selects and reproduces a high bitrate image and Japanese language speech selects and acquires, upon reproduction of a segment (11) of a period 1, information relating to a high bitrate image and Japanese language speech, which is a reproduction target.

Recording information of the MPD that is made a target of selection becomes information of segment regions 301 and 302 depicted in the figure.

In this manner, the reception apparatus selects information corresponding to data (segment), which is to be made a reproduction target by the own apparatus, from the MPD transmitted as signaling data from the transmission apparatus and refers to the information.

In this manner, in the MPD, segment-corresponding information in a unit of a data type and a time period can be recorded.

As described hereinabove with reference to FIG. 5, in a case where a content outputting process for alternately outputting a broadcasting program and an advertisement, the transmission apparatus can perform, for the reception apparatus, control of a content (broadcasting program or advertisement) in each time unit by utilizing the MPD in which control information in a unit of a predetermined period of time (period) described hereinabove is recorded. In particular, the process for providing an advertisement corresponding to a user described hereinabove with reference to FIG. 5 can be implemented.

Figure 11:
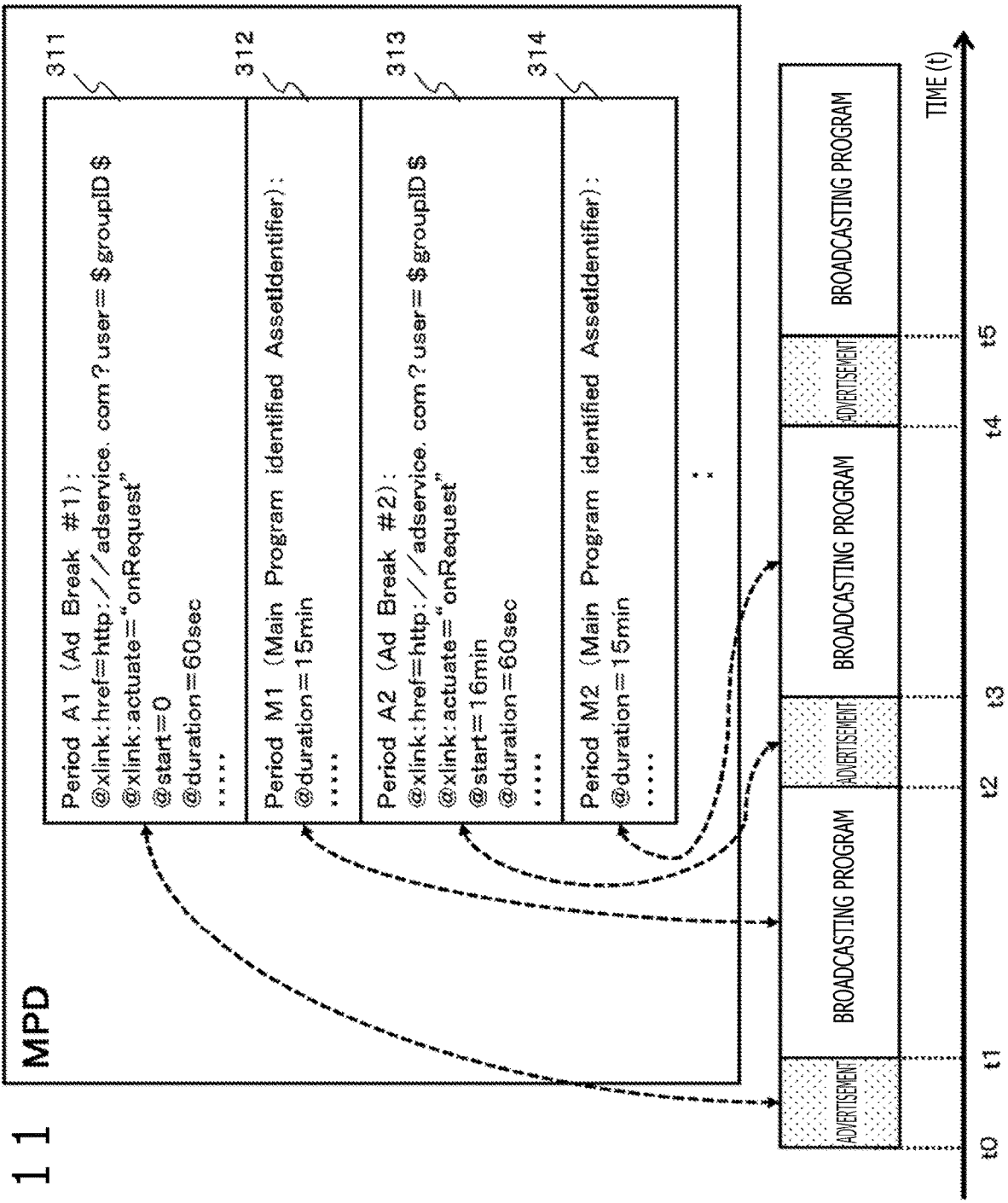
FIG. 11 is a view illustrating an example of a configuration of a further MPD.

FIG. 11 is a view depicting an example of a configuration of the MPD that is control information description data (signaling data) corresponding to the content outputting process for alternately outputting a broadcasting program and an advertisement described hereinabove with reference to FIG. 5.

The MPD is divided into period information 311 to 314 of units of an advertisement and a broadcasting program corresponding to output contents within predetermined time intervals.

The period information 311 is control information (signaling data) corresponding to an advertisement outputted from the reception apparatus within a period from time t0 to time t1.

The period information 312 is control information (signaling data) corresponding to a broadcasting program outputted from the reception apparatus within a period from time t1 to time t2.

The period information 313 is control information (signaling data) corresponding to an advertisement outputted from the reception apparatus within a period from time t2 to time t3.

The period information 314 is control information (signaling data) corresponding to a broadcasting program outputted from the reception apparatus within a period from time t3 to time t4.

In the period information, information necessary for acquisition of data (content) to be outputted to the reception apparatus such as access information (URL) or the like to a broadcasting program or an advertisement to be transmitted from the transmission apparatus, various kinds of information required for the reception apparatus to acquire and output a content such as a decoding method (codec) and so forth are recorded.

The transmission apparatus transmits the MPD depicted in FIG. 11 to the reception apparatus prior to time to.

The reception apparatus refers to the MPD to acquire an advertisement or a broadcasting program through a broadcasting wave or a network, perform a decoding process and so forth using a designated codec and output the advertisement or broadcasting program to a display section, a speaker or the like.

Figure 12:
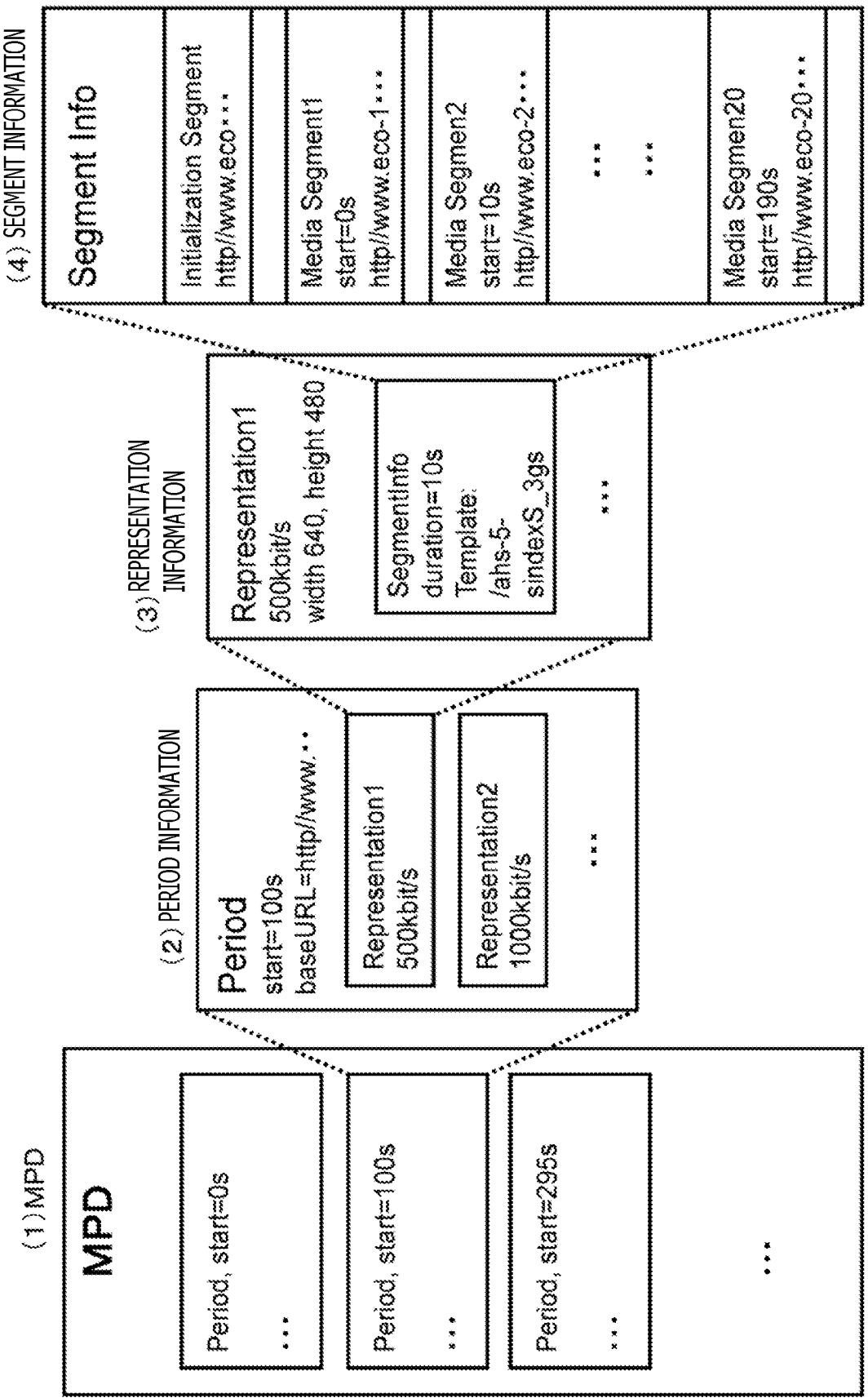
FIG. 12 is a view illustrating an example of a utilization sequence of an MPD.

FIG. 12 is a view illustrating a procedure of an analysis (parse) of the MPD executed by the reception apparatus.

FIG. 12 depicts the following figures:

(1) MPD;

(2) period information;

(3) representation information; and (4) segment information.

The reception apparatus (client) that is to receive an AV segment and execute a reproduction process of the AV content acquires an MPD included in signaling data received in advance before reception of the AV segment and acquires information corresponding to the data to be reproduced by the own apparatus from the MPD.

First, the (2) period information in which information of a particular period (time interval) corresponding to an AV segment reproduction time period is recorded is selected from within the (1) MPD depicted in FIG. 10.

Further, the (3) representation information corresponding to the type of the data to be reproduced by the own apparatus (client) is selected, and further, the (4) segment information corresponding to the reproduction target segment is selected.

It is possible to refer to data recorded in the (4) segment information to acquire an AV segment that becomes a reproduction target or acquire various information necessary for reproduction of the AV segment.

7. Example of Particular Configuration for Executing Advertisement Provision Process According to User Information Now, an example of a particular configuration for executing an advertisement provision process according to user information is described.

A configuration of the period information 311 in the MPD depicted in FIG. 11 is described with reference to FIG. 13.

As can be recognized from FIG. 11, the period information 311 is period information that is control information corresponding to an advertisement to be outputted from the reception apparatus within the period from time t0 to time t1.

Figure 13:
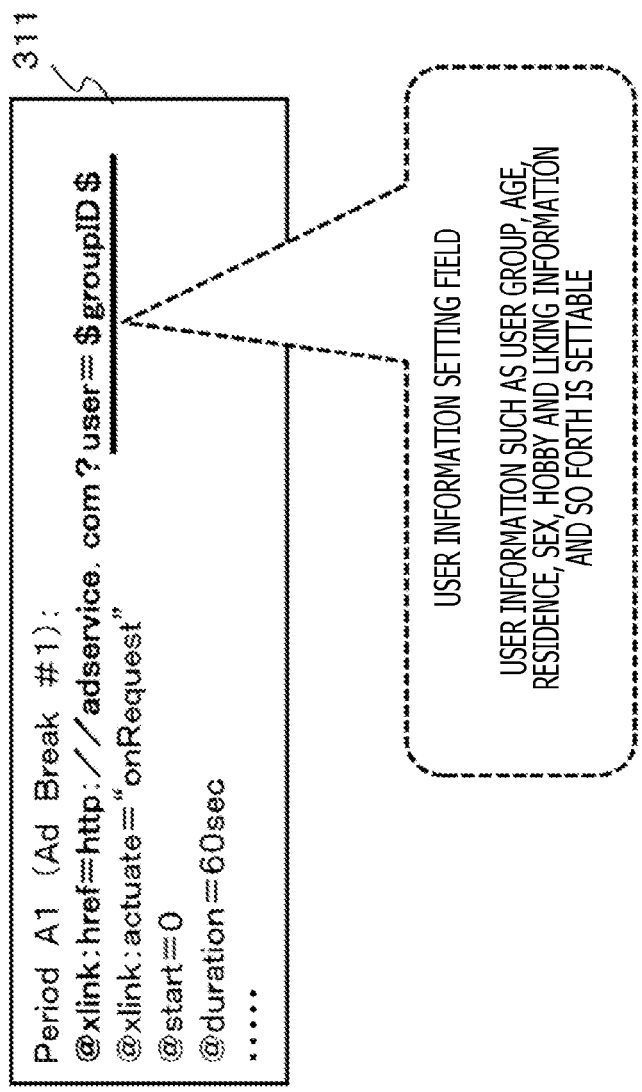
FIG. 13 is a view illustrating an example of a configuration of advertisement-corresponding period information in an MPD.

As depicted in FIG. 13, the period information 311 corresponding to an advertisement has the following description data.

---

Period A1 (Ad Break #1):
@xlink:href=http://adservice.com?user=$groupID$
@xlink:actuate="onRequest"
@start=0
@duration=60sec
.....

---

In the period information 311 corresponding to an advertisement, description of particular data of
  adaptation,
  representation, and
  segment information
described hereinabove with reference to FIGS. 10 and 12 is omitted, and link information (xlink) as access information for acquiring period information having particular descriptions of them is recorded.

"@xlink:href=http://adservice.com?user=$groupID$"

This information recording field is link (xlink) information recording field.

It is to be noted that "@xlink:href=" indicates that the field is a setting field of a URL to be referred to.

A process for selecting and acquiring a period element according to user information on the basis of this xlinkURL (=access information of a period element according to user information) is executed, for example, by an application (link resolution application) provided from the transmission apparatus.

The link resolution application is executed by the application controlling section 110 of the reception apparatus 30.

The application controlling section 110 executes a link resolution process by execution of the link resolution application.

A period element selection process according to user information performed for an advertisement (Ad) outputting process according to user information is described with reference to FIG. 14.

The application execution section 111 of the application controlling section 110 executes an application provided from the transmission apparatus 20 such as, for example, a broadcasting station.

The application execution section 111 executes a process to which an API (advertisement insertion API 112) for performing a link resolution process is applied.

In particular, the application execution section 111 applies the advertisement insertion API 112 to notify the application, which is being executed, of an Xlink URL, and the application selects an advertisement content to be inserted into an advertisement insertion period from the Xlink URL and user information and executes a link resolution (xlink Resolver) process for selecting a period element corresponding to the advertisement content.[0]

The application execution section 111 replies, by a process to which the advertisement insertion API 112 is applied, a period element including a URL and so forth of an advertisement segment in which a selected advertisement corresponding to user information is stored to the reproduction controlling section 120 of the reception apparatus 30.

The reproduction controlling section 120 of the reception apparatus 30 performs an acquisition process of the advertisement segment using the advertisement segment URL recorded in the period element to reproduce the advertisement.

In particular, within an advertisement insertion period, a period element designated from an application, namely, an advertisement content, is reproduced in place of the original period element described in the MPD.

It is to be noted that an application executed by the application execution section 111 of the application controlling section 110 of the reception apparatus 30 performs also control for acquisition and cache processes of various advertisement contents transmitted from the transmission apparatus 20 such as a broadcasting station.

It is to be noted that activation of an application is performed in accordance with data described in an AIT (Application Information Table) that is signaling data delivered, if a broadcast is being received, by the broadcast. In a case where a broadcast is not being received, for example, in the late night or the like, activation time of the application may be scheduled in the ESG.

For example, various advertisement contents according to user information are transmitted as NRT (non-real time) content files separately from delivery of a broadcasting program.

The reception apparatus 30 acquires, on the basis of, for example, an ESG (electronic service guide: Electronic Service Guide) or other signaling data of an FDT or the like, delivery information or access information of an NRT content file in which advertisement data is stored and acquires advertisement data using such information.

Figure 15:
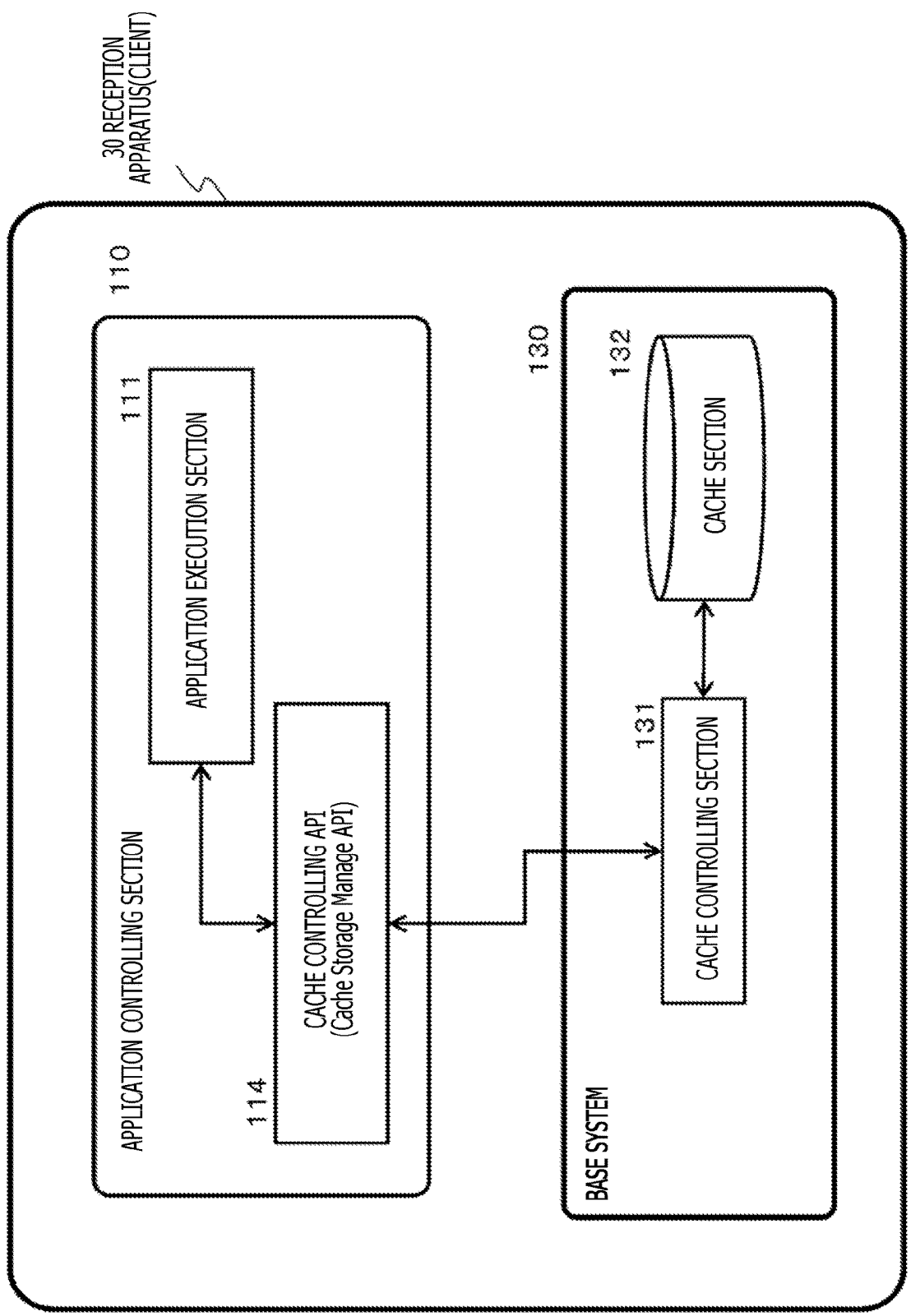
FIG. 15 is a view illustrating another example of process utilizing an application by the reception apparatus.

An acquisition process of advertisement data executed by the reception apparatus 30 is described with reference to FIG. 15.

The application execution section 111 of the application controlling section 110 of the reception apparatus 30 executes an application provided from the transmission apparatus 20 such as, for example, a broadcasting station.

The application executed by the application execution section 111 performs cache control to which a cache controlling API (CacheStorageManager) 114 that executes cache control of advertisement data.

The application executed by the application execution section 111 applies the cache controlling API (CacheStorageManager) 114 to perform control of the cache controlling section 131 in the base system 130 of the reception apparatus 30 to cause the cache controlling section 131 to execute acquisition of an advertisement data file (NRT content file)

transmitted from the transmission apparatus 20 and a storage process of the advertisement data file into the cache section 132.

Acquisition and cache processes of an advertisement data file (NRT content file) transmitted from the transmission apparatus 20, an outputting process of the cached advertisement data, and a sequence of such a series of processes are described with reference to FIG. 16.

Figure 16:
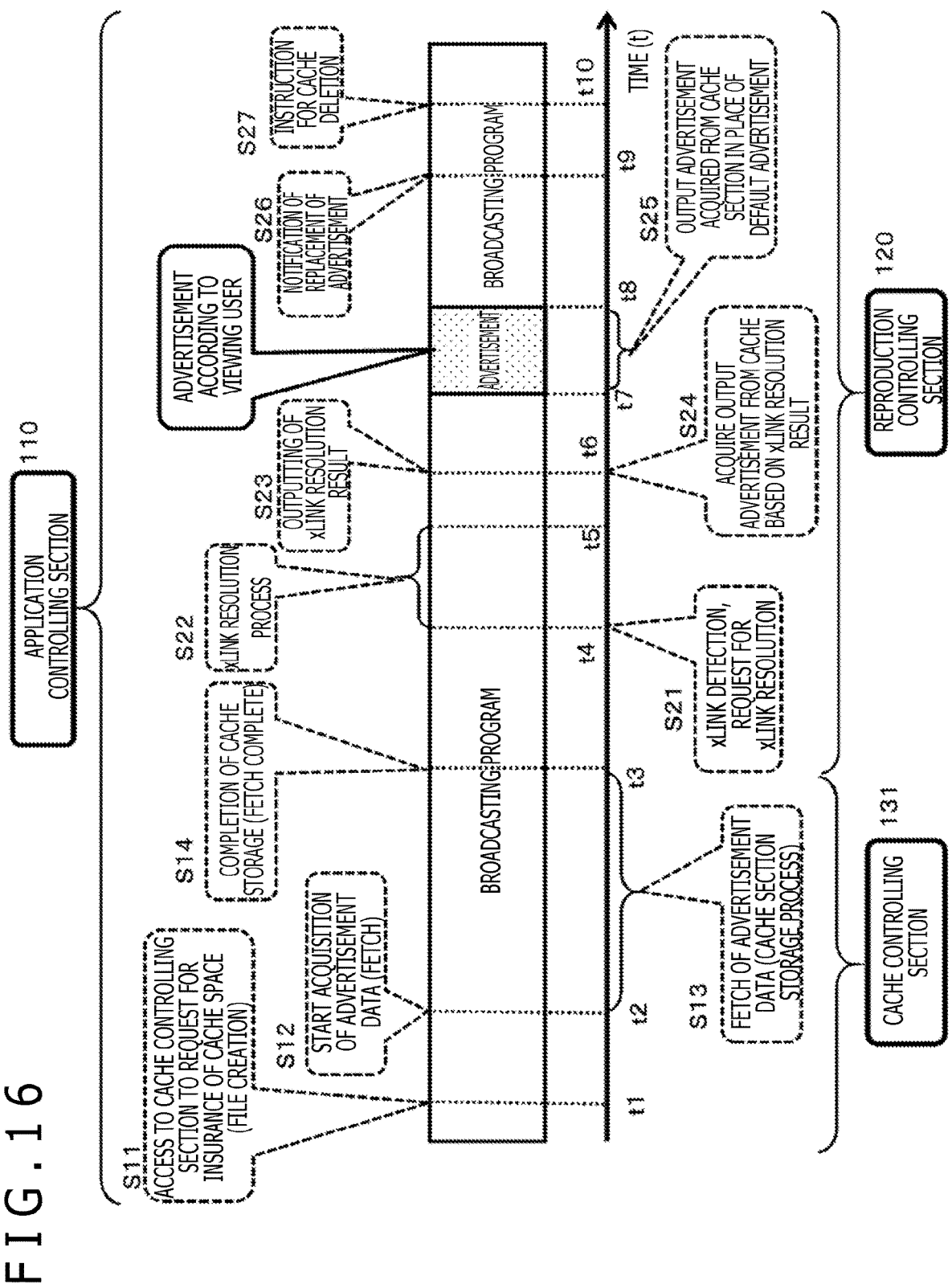
FIG. 16 is a view illustrating a further example of process utilizing an application by the reception apparatus.

FIG. 16 is a view illustrating processes along a time (t) axis depicted from the left to the right.

Processes executed by the reception apparatus 30 at timings of time t1 to time t9 depicted on the time axis are depicted as processes at steps S11 to S26.

The processes on the upper side of the time axis depicted in FIG. 16 are processes by an application executed by the application controlling section 110 of the reception apparatus 30.

On the other hand, processes on the lower side of the time axis depicted in FIG. 16 are processes executed by the cache controlling section 131 and the reproduction controlling section 120 of the reception apparatus 30.

In the following, the processes at the steps depicted in FIG. 16 are described successively.
(Step S11)
First at step S11, an application executed by the application controlling section 110 accesses the cache controlling section 131 to perform an insurance request for a cache space for storing advertisement data (file generation).

This process is executed applying the cache controlling API 114 described hereinabove with reference to FIG. 15.
(Step S12)
Then at step S12, the application being executed by the application controlling section 110 applies the cache controlling API 114 to instruct the cache controlling section to start an advertisement data acquisition process.

This acquisition process is executed by the reception apparatus 30 referring to the ESG (electronic service guide: Electronic Service Guide) acquired in advance. In the ESG, a delivery schedule of and access information to an NRT content file in which advertisement data is stored are recorded, and acquires advertisement data using such information.
(Steps S13 to S14)
At step S13, the cache controlling section 131 executes a storage process (fetch) of the advertisement data acquired by the application into the cache section 132.

At step S14, the cache storage is completed.
(Step S21)
The processes at the steps beginning with step S21 are processes for reading out and outputting an advertisement file (NRT content file) stored in the cache section 132.

It is to be noted that a delivery content from a broadcasting station is a content in which a prescribed advertisement (default advertisement) is set to a period between predetermined broadcasting programs (from time t7 to time t8) as depicted in FIG. 16.

Accordingly, if a replacement process of an advertisement is not performed by the reception apparatus 30 side, then the prescribed advertisement (default advertisement) is outputted.

The processes described in the following are processes by which the application selects, applying link (xlink) information recorded in period information corresponding to an advertisement of an MPD described hereinabove with reference to FIGS. 11, 13 and so forth, an advertisement corresponding to a user selected on the basis of the user information and conveys the advertisement to the reproduction controlling section, and the reproduction controlling section acquires an advertisement content designated from the cache section 132 and replaces the prescribed advertisement (default advertisement) with and outputs the acquired advertisement content.

At step S21, the reproduction controlling section 120 of the reception apparatus 30 executes an analysis process of the MPD to detect link (xlink) information recorded in period information corresponding to an advertisement of the MPD.

The reproduction controlling section 120 performs a link (xlink) resolution request to the application being executed by the application controlling section 110 in response to detection of the link (xlink) information recorded in the period information.
(Steps S22 to S23)
The application being executed by the application controlling section 110 executes a link resolution process in response to an input of the link resolution request from the reproduction controlling section.

Figure 14:
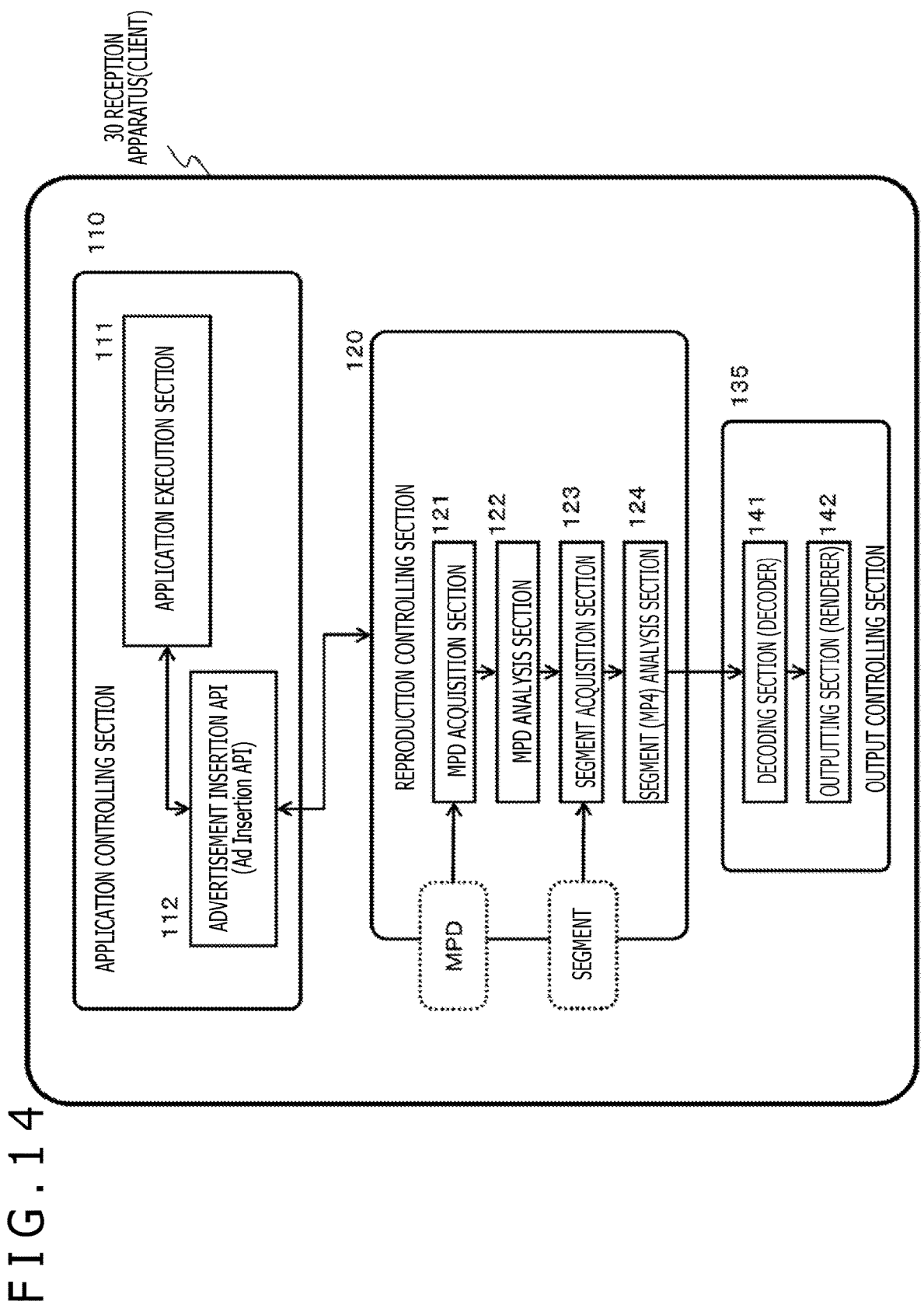
FIG. 14 is a view illustrating an example of process utilizing an application by the reception apparatus.

This process is a process to which the advertisement insertion API 112 described hereinabove with reference to FIG. 14 is applied. The application controlling section 110 applies the advertisement insertion API 112 to execute a link resolution (xlink Resolver) process for selecting a period element according to user information on the basis of the xlinkURL.

In particular, the application controlling section 110 selects a period element according to the user information and replies a period element, which includes a URL or the like of an advertisement segment in which the selected advertisement corresponding to the user information is stored, to the reproduction controlling section 120 of the reception apparatus 30.
(Steps S24 to S25)
Then at step S24, the reproduction controlling section 120 of the reception apparatus 30 performs an acquisition process of an advertisement segment from the cache section 132 using the advertisement segment URL recorded in the period element, and then reproduces the advertisement acquired at step S25.

In particular, a process for replacing the prescribed advertisement (default advertisement) scheduled to be reproduced continuously to a broadcasting program within the period from time t7 to time t8 into the advertisement acquired from the cache section and reproducing the acquired advertisement.

By this process, reproduction of the advertisement selected in response to the user information is performed.
(Step S26)
After the advertisement reproduction is completed, the reproduction controlling section 120 notifies the application that the reproduction of the designated advertisement content has been performed applying the advertisement insertion API 112 of the application controlling section 110.
(Step S27)
The application instructs the cache controlling section 131 to delete the file of the advertisement content cached in the cache controlling section applying the advertisement insertion API 112, and the cache controlling section 131 performs a deletion process of the designated file.

In this manner, the reception apparatus 30 performs the acquisition process and the selection and reproduction process of various advertisement contents under the management of an application executed by the application controlling section 110.

8. Controlling Configuration of Delivery Order of Advertisement Contents

Now, a control configuration of the delivery order of advertisement contents is described.

As can be recognized from the description given above, the transmission apparatus 20 such as a broadcasting station provides, as an advertisement that can be outputted within one advertisement reproduction time period, a large number of different advertisement contents to the reception apparatus 30.

The reception apparatus 30 selects one advertisement from among the large number of advertisements transmitted thereto from the transmission apparatus 20 and reproduces the selected advertisement.

In other words, from among a plurality of advertisement contents provided by the transmission apparatus 20, only one advertisement content is reproduced by one reception apparatus.

It is necessary for the advertisement selection process by the reception apparatus 30 to be executed before the advertisement reproduction time period.

Before an advertisement outputting time period set in advance, the reception apparatus 30 executes a process for storing a plurality of advertisements corresponding to the advertisement reproduction time period into the cache section 132 of the reception apparatus 30 and selects and outputs one content of a reproduction target from among the plurality of contents.

However, in the plurality of advertisements stored in the cache section, an advertisement that is selected by many users (viewers) in high possibility or an advertisement that is selected but in low possibility is mixed.

For example, in a case where a broadcasting program to which an advertisement is set is a baseball live broadcast, it is estimated that the ratio of male viewers who like the baseball is high among viewers of the broadcasting program. It is assumed that, as an advertisement corresponding to such a broadcasting program, a plurality of advertisement contents different from each other and given below are transmitted:

(advertisement 1) advertisement content for children;
(advertisement 2) advertisement content for adult males; and
(advertisement 3) advertisement content for females.

In a case where such various contents by user layers as described above are transmitted, it is anticipated that the advertisement that is selected by the reception apparatus 30 in a high possibility is the (advertisement 2) advertisement content for adult males.

Where an advertisement having high selection possibility and an advertisement having low selection possibility in a broadcasting region are estimated in advance, control for increasing the acquisition possibility or the viewer rating of an advertisement by the reception apparatus is performed by controlling the delivery order of the plurality of advertisement contents.

A delivery order controlling configuration of advertisement contents is described with reference to FIG. 17.

FIG. 17 depicts the following views:

(a) user viewing distribution prediction data by advertisement; and
(b) example of setting of an advertisement transmission order and delivery priority information (Delivery Priority).

The (a) user viewing distribution prediction data by advertisement is data held by the transmission apparatus 20 such as a broadcasting station or the like that performs advertisement delivery. For example, the (a) user viewing distribution prediction data by advertisement is a result of an analysis performed, for example, on the basis of advertisement viewing history data or the like in the past.

The (b) example of setting of an advertisement transmission order and delivery priority information (Delivery Priority) indicates an example of advertisement delivery in accordance with the advertisement delivery order set on the basis of the (a) user viewing distribution prediction data by advertisement.

In (b), the following data transmitted from the transmission apparatus 20 are depicted:

(b1) broadcasting AV segment; and
(b2) NRT content file.

In a case where a reproduction process by the (b1) broadcasting AV segment transmitted from the transmission apparatus 20 is to be performed, the reception apparatus performs outputting of a broadcasting program and an advertisement 1 (Ad1) as a prescribed advertisement (default advertisement) set in advance.

In the (b2) NRT content file transmitted from the transmission apparatus 20, an example of delivery of advertisement content files (NRT content files) that are replaceable into the advertisement 1 (Ad1) that is the prescribed advertisement (default advertisement) within an advertisement reproduction time period between time ta and time tb is depicted.

The reception apparatus 30 stores an advertisement 2 (Ad2) to an advertisement 4 (Ad4) transmitted as the (b2) NRT content file into the cache section, and can select one of the advertisements, replace the selected advertisement into the advertisement 1 (Ad1) within the reproduction time period from ta to tb and output the selected advertisement.

As indicated by the (a) user viewing distribution prediction data by advertisement, the viewing prediction data by advertisement are set in the following manner:

advertisement 1 (Ad1)=55%;
advertisement 2 (Ad2)=25%;
advertisement 3 (Ad3)=15%; and
advertisement 4 (Ad4)=5%.

They are prediction data of the viewing ratio of the four kinds of advertisement contents (Ad1 to Ad4) that can be selectively outputted within the period from time ta to time tb in the reproduction broadcasting program based on the broadcasting AV segments depicted in (b1) of FIG. 17.

In particular, when the users as a whole who view the advertisements within the period from time ta to time tb are represented by 100%, the prediction data is data indicative of a distribution of the viewing ratios of the individual advertisements of the advertisement 1 (Ad1) to advertisement 4 (Ad4).

Where the broadcasting station acquires the viewing prediction data described above in advance, the prescribed advertisement (default advertisement) to be delivered together with a broadcasting program is determined as an advertisement (advertisement 1 (Ad1)) that has the highest viewing possibility.

Further, it is set that, immediately before the advertisement reproduction time ta, an advertisement (advertisement 2 (Ad2)) having the second highest viewing possibility is transmitted.

For example, the advertisement 2 (Ad2) is transmitted from the transmission apparatus 20 to the reception apparatus 30 within the period from time t3 to time t4.

Further, it is set that, before delivery of the advertisement (advertisement 2 (Ad2)), an advertisement (advertisement 33 (Ad3)) having the third highest viewing possibility is delivered.

For example, the advertisement 2 (Ad2) is transmitted from the transmission apparatus 20 to the reception apparatus 30 within the period from time t2 to time t3.

Further, it is set that, before delivery of the advertisement (advertisement 3 (Ad3)), an advertisement (advertisement 4 (Ad4)) having the fourth highest viewing possibility is delivered.

For example, the advertisement 3 (Ad3) is transmitted from the transmission apparatus 20 to the reception apparatus 30 within the period from time t1 to time t2.

In this manner, it is set that an advertisement having high viewing possibility is transmitted within the period (t3) nearest to the advertisement reproduction start time (ta). An advertisement having the lowest viewing possibility begins to be transmitted at the time (t1) spaced most from the advertisement reproduction start time (ta).

The broadcast segment depicted in (b1) of FIG. 17 is a delivery broadcasting program of a certain one broadcasting station and is data that is not received if the reception apparatus 30 is not tuned (channel setting) to the broadcasting station.

Also the NRT content file depicted in (b2) of FIG. 17 is data that can be received only by the reception apparatus 30 that is set for reception of the broadcasting segment depicted in (b1), namely, that is tuned (channel setting) for the broadcasting station.

The reception apparatus 30 is turned ON/OFF at an arbitrary timing by a user (viewer) and is subjected to channel switching at an arbitrary timing.

Users (viewers) who view some of the advertisement 1 (Ad1) to advertisement 4 (Ad4) within the advertisement reproduction time period from ta to tb are limited only to users whose reception apparatus is ON and whose reception apparatus 30 is set to a channel in which the advertisement is delivered.

For example, the channel in which the data depicted in (b) of FIG. 17 is delivered is represented as channel A.

The timing at which the user of the reception apparatus 30 side performs channel setting of the reception apparatus 30 to set the channel to the channel A differs in various manners.

Figure 18:
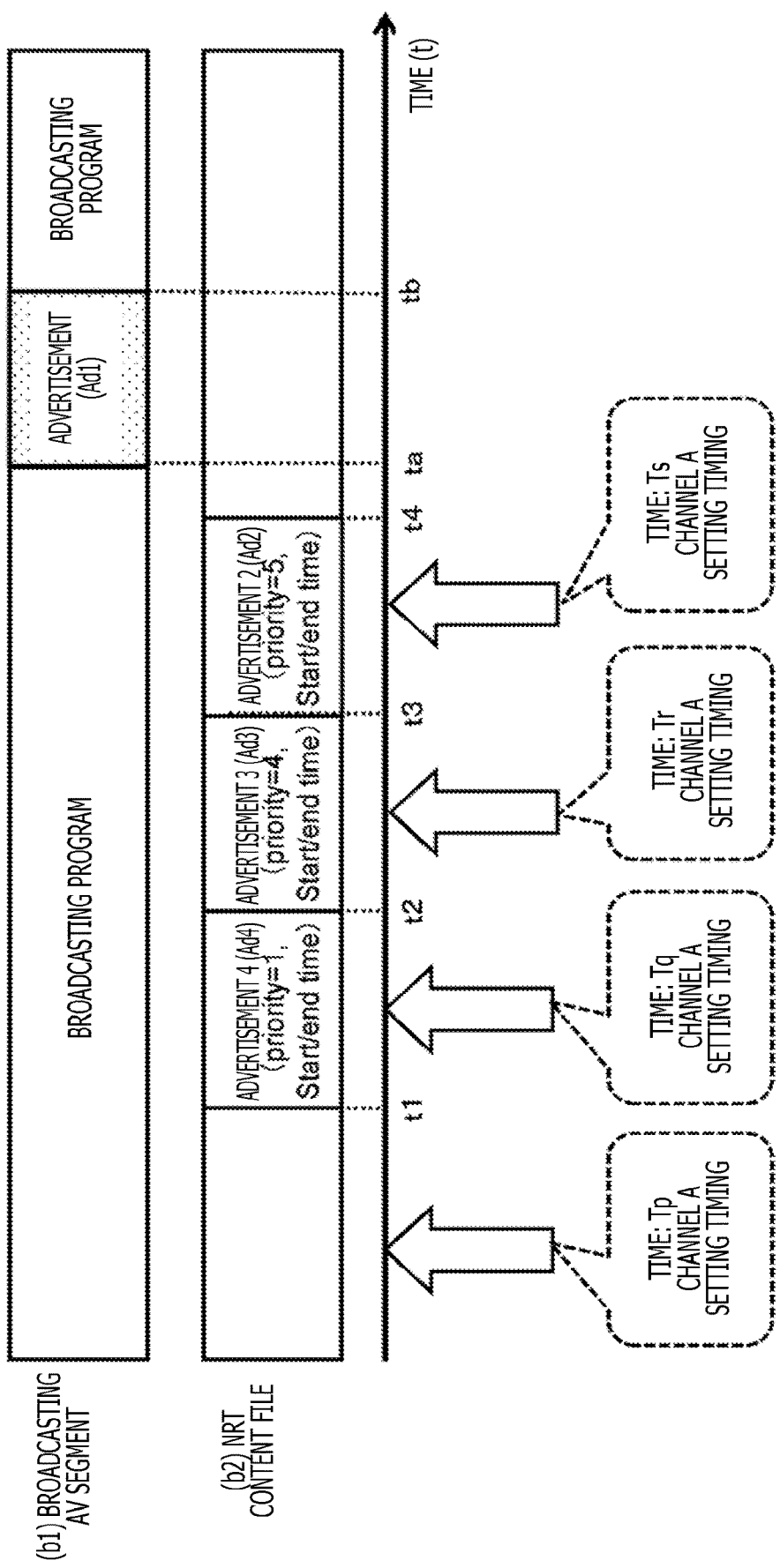
FIG. 18 is a view illustrating an example of delivery order setting of a plurality of advertisements and reproducible advertisements.

FIG. 18 depicts a plurality of examples of the channel setting timing by the reception apparatus 30.

For example, if the reception apparatus 30 sets the channel to the channel A at time Tp, then the reception apparatus 30 acquires and stores all of three advertisement contents (advertisement 2 to advertisement 4) transmitted as NRT content files from the transmission apparatus 20 into the cache section and can select and output one of the three advertisement contents.

On the other hand, if the reception apparatus 30 sets the channel to the channel A at time Tq, then the reception apparatus 30 cannot acquire the advertisement 4 (Ad4) from among the three advertisement contents (advertisement 2 to advertisement 4) transmitted as NRT content files from the transmission apparatus 20 but can acquire and store only the advertisement 2 to the advertisement 3 and selectively output one of the two advertisement contents.

On the other hand, if the reception apparatus 30 sets the channel to the channel A at time Tr, then the reception apparatus 30 cannot acquire the advertisement 3 (Ad3) and the advertisement 4 (Ad4) from among the three advertisement contents (advertisement 2 to advertisement 4) transmitted as NRT content files from the transmission apparatus 20 but can acquire and store only the advertisement 2 (Ad2) and selectively output this advertisement content (Ad2).

Further, if the reception apparatus 30 sets the channel to the channel A at time Ts, then the reception apparatus 30 cannot acquire any of the three advertisement contents (advertisement 2 to advertisement 4) transmitted as NRT content files from the transmission apparatus 20. In this case, only reproduction of the prescribed advertisement (advertisement 1) transmitted together with the broadcasting program is permitted.

It is to be noted that, even if the reception apparatus 30 is set to the channel A within the period from time Tp to time Ts, if the reception apparatus 30 is switched to a different channel before the advertisement outputting start time ta, then none of the advertisement 1 to advertisement 4 are viewed.

In order for the reception apparatus 30 to view one of the advertisement 1 to advertisement 4, it is necessary for the reception apparatus 30 to have the channel A set therein at the advertisement outputting timing ta.

Advertisements that can be outputted at the advertisement outputting timing ta from the reception apparatus 30 are set in the following manner in response to time set for the channel A by the reception apparatus 30:

(1) channel A setting time=before Tp to ta: advertisement 1 (Ad1) to advertisement 4 (Ad4);

(2) channel A setting time=Tq to ta: advertisement 1 (Ad1) to advertisement 3 (Ad3);

(3) channel A setting time=Tr to ta: Advertisement 1 (Ad1) to advertisement 2 (Ad2); and (4) channel A setting time=Ts to ta: advertisement 1 (Ad1).

In particular, the channel setting timings at which the individual advertisements can be reproduced are such as given below:

(1) advertisement 1 (Ad1)=Tp, Tq, Tr, and Ts;

(2) advertisement 2 (Ad2)=Tp, Tq, and Tr;

(3) advertisement 3 (Ad3)=Tp and Tq; and (4) advertisement 4 (Ad4)=Tp

In this manner, the result is that the probability that the advertisement 1 (Ad1) may be reproducible is highest and the probability that the advertisement 4 (Ad4) may be reproducible is lowest.

From this study result, a conclusion is obtained that, in a case where an advertisement that can be replaced into the prescribed advertisement (default advertisement (advertisement 1)) is transmitted as an NRT content file, the reception and reproduction possibilities in the reception apparatus 30 can be improved when the advertisement is transmitted immediately before the reproduction start time ta.

In particular, if such setting of the transmission order that an advertisement content having higher viewing possibility is transmitted immediately before the advertisement outputting start time (ta) of an advertisement and an advertisement content having lower viewing possibility is transmitted before then is performed, then user selection by the reception apparatus 30 and the reception and reproduction probabilities of an advertisement selected in accordance with user information can be improved.

The transmission apparatus 20 sets a transmission order of the advertisement contents, which are to be transmitted as NRT content files, on the basis of the study result and transmits the advertisement content.

Figure 19:
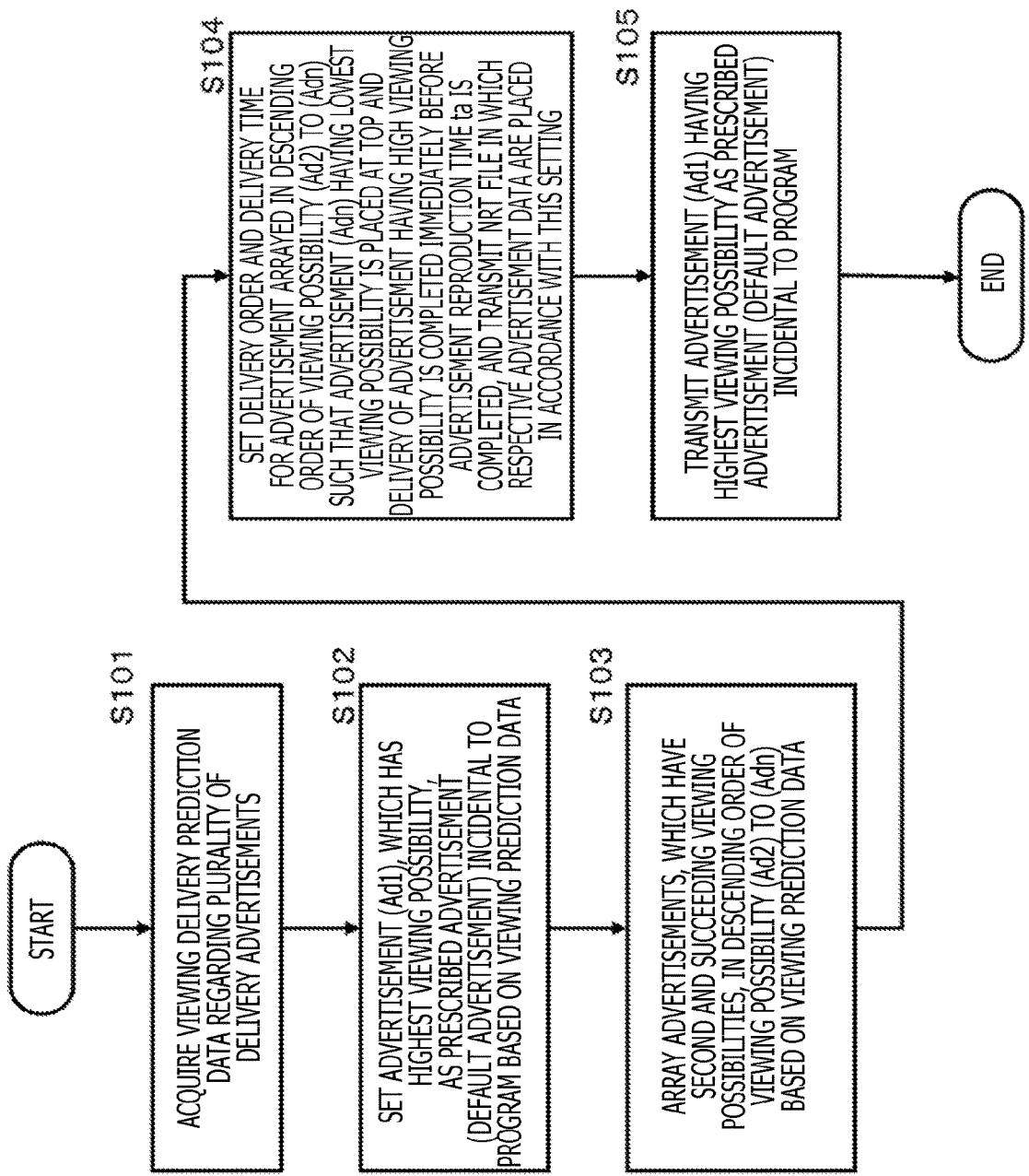
FIG. 19 is a flow chart illustrating a processing sequence executed by the transmission apparatus.

A delivery controlling sequence of an advertisement content executed by the transmission apparatus 20 is described with reference to a flow chart of FIG. 19.

(Step S101)

The data processing section of the transmission apparatus first acquires, at step S101, viewing distribution prediction data regarding a plurality of delivery advertisements.

In particular, the viewing distribution prediction data is, for example, such user viewing distribution prediction data by advertisement as depicted in (a) of FIG. 17. For example, the viewing prediction data by advertisement is set in the following manner:

advertisement 1 (Ad1)=55%;
advertisement 2 (Ad2)=25%;
advertisement 3 (Ad3)=15%; and
advertisement 4 (Ad4)=5%.

This is prediction data of the viewing ratio of the four kinds of advertisement contents (Ad1 to Ad4) that can be selectively outputted within the period from time ta to time tb in the reproduction broadcasting program based on the broadcasting AV segment depicted in (b1) of FIG. 17.

In particular, where the users as a whole who view the advertisements within the period from time ta to time tb are represented by 100%, the prediction data is data indicative of a distribution of the viewing ratios of the individual advertisements of the advertisement 1 (Ad1) to advertisement 4 (Ad4).

(Step S102)

Then at step S102, the transmission apparatus sets the advertisement (Ad1) having the highest viewing possibility to the prescribed advertisement (default advertisement) incidental to the broadcasting program on the basis of the viewing prediction data.

(Step S103)

Then at step S103, the transmission apparatus arrays advertisements having the second and succeeding viewing possibilities into a descending order of the viewing possibility (Ad2) to (Adn) on the basis of the viewing prediction data.

(Step S104)

Then at step S104, the transmission apparatus determines a delivery order and delivery time periods of the advertisements (Ad2) to (Adn) arrayed in the descending order of the viewing possibility such that the advertisement (Adn) having low viewing possibility is transmission data at the top and the delivery of the advertisement (Ad2) having high viewing possibility is completed immediately before the advertisement reproduction time ta, and transmits NRT content files in which the individual advertisement data are stored in accordance with the determined delivery order and delivery time periods.

(Step S105)

Then at step S105, the transmission apparatus transmits the advertisement (Ad1) having the highest viewing possibility as the prescribed advertisement (default advertisement) incidental to the broadcasting program.

In this manner, the transmission apparatus 20 determines a delivery order of advertisements on the basis of the user viewing distribution prediction data by advertisement depicted, for example, in FIG. 17 and transmits the advertisements. In particular, the transmission apparatus 20 executes a transmission order determination process in which the transmission time points of a content having high viewing possibility is set as a time point nearest to a content outputting time point and the transmission time point of a content having lower viewing possibility is set to a point of time before the transmission time point of the content having the high viewing possibility.

For example, it is set that the user viewing distribution prediction data by advertisement depicted in FIG. 17 are successively updated. For example, such a configuration may be adopted that viewer rating information of advertisement contents outputted in prior is acquired and the user viewing distribution prediction data by advertisement depicted in FIG. 17 are successively updated on the basis of the acquired viewer rating information and a delivery order is determined utilizing the updated data.

A viewer rating of an advertisement outputted in prior can be determined by the reception apparatus or an application, which is executed by the application execution section, notifying a broadcasting station of a result of an outputting result of the advertisement using a communication line such as the Internet.

Figure 20:
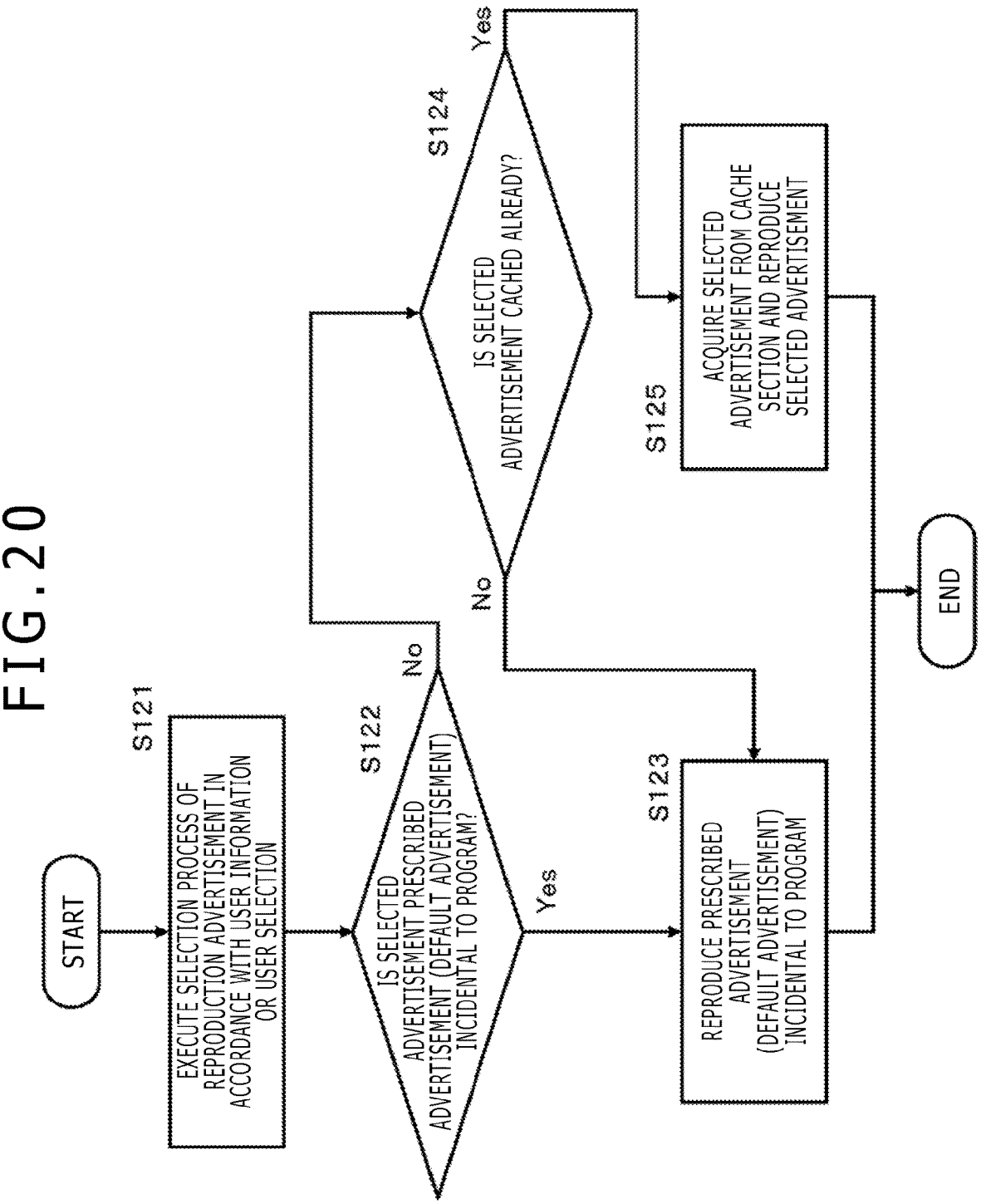
FIG. 20 is a flow chart illustrating another processing sequence executed by the transmission apparatus.

Now, an example of a processing sequence executed by the reception apparatus 30 is described with reference to a flow chart depicted in FIG. 20.

(Step S121)

First at step S121, the data processing section of the reception apparatus executes a selection process of a reproduction advertisement in accordance with user information or user selection.

This is an advertisement selection process based on link information (xlink) to which user information is set as described hereinabove with reference to FIG. 13 and so forth or an advertisement selection process based on a user input to the reception apparatus.

(Step S122)

Then at step S122, the reception apparatus decides whether or not the selected advertisement is the prescribed advertisement (default advertisement) incidental to the broadcasting program.

If the selected advertisement is the prescribed advertisement (default advertisement) incidental to the broadcasting program, then the process advances to step S123.

If the selected advertisement is not the prescribed advertisement (default advertisement), then the process advances to step S124.

(Step S123)

If the selected advertisement is the prescribed advertisement (default advertisement), then the process advances to step S123, at which the reception apparatus reproduces the prescribed advertisement (default advertisement) incidental to the broadcasting program.

(Step S124)

On the other hand, if the selected advertisement is not the prescribed advertisement (default advertisement), then the process advances to step S124, at which it is confirmed further whether or not the selected advertisement is cached already.

If the selected advertisement is cached already, then the process advances to step S125.

On the other hand, if the selected advertisement is not cached as yet, then the process advances to step S123, at which the reproduction apparatus reproduces the prescribed advertisement (default advertisement) incidental to the broadcasting program.

(Step S125)

If the selected advertisement is cached already at step S124, then the process advances to step S125, at which the reception apparatus acquires and reproduces the selected advertisement from the cache section at step S125.

9. Example of Process Based on Delivery Priority Information (Delivery Priority)

To each of advertisement contents for replacement process to be transmitted as NRT contents from the transmission apparatus 20, a priority degree as a criterion for the decision of whether or not execution of reception and cache processes by the reception apparatus 30 is required can be set individually.

This priority degree is called delivery priority information (Delivery Priority).

Although the delivery priority information (Delivery Priority) can be set also to an advertisement content itself to be transmitted as an NRT content file, it is possible to record the delivery priority information (Delivery Priority) into data (for example, signaling data of an FDT or the like or an ESG or the like) to be transmitted before delivery of the advertisement content and provide the data to the reception apparatus in advance.

In the following, an example of process in which the delivery priority information (Delivery Priority) is utilized is described.

Figure 21:
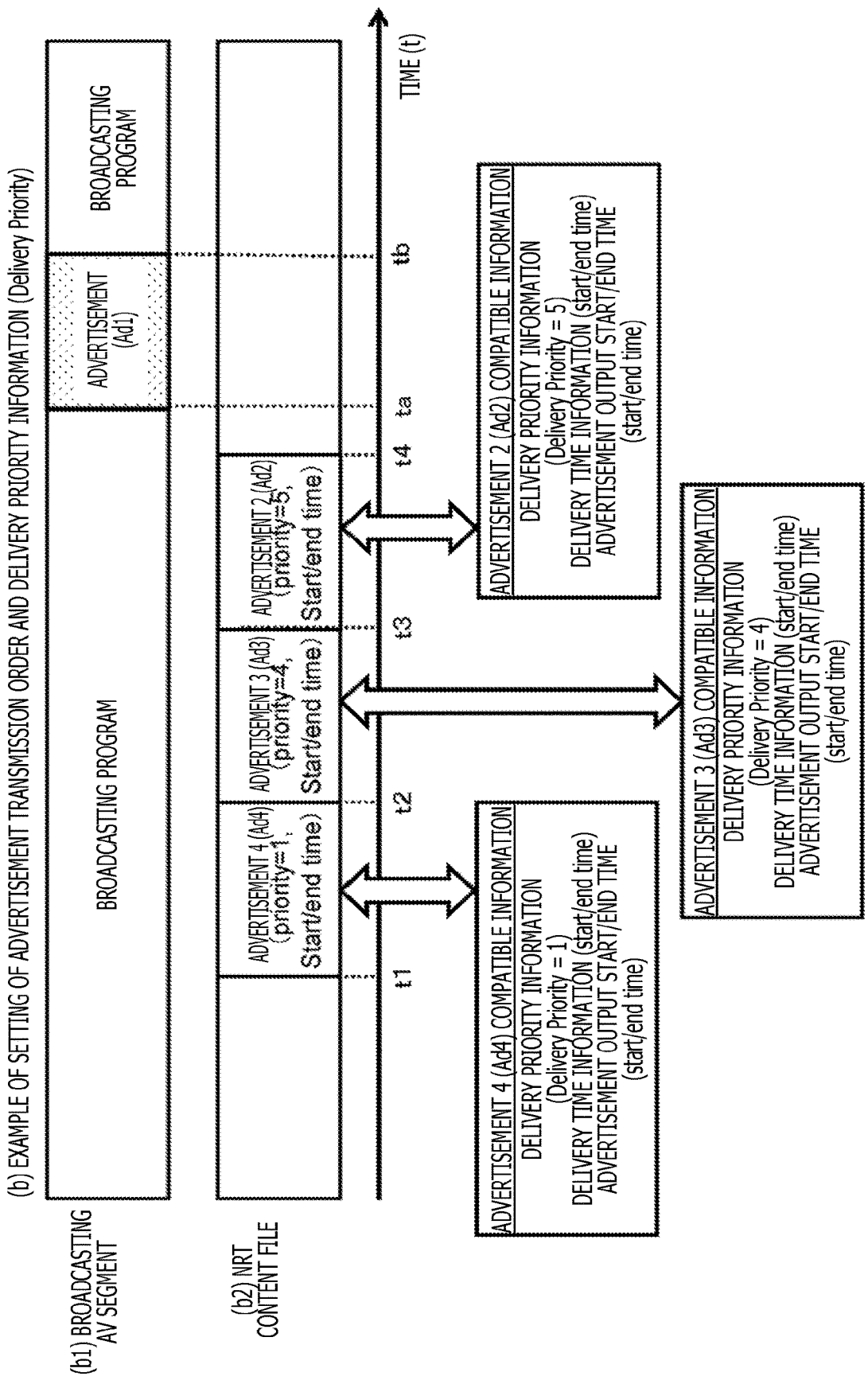
FIG. 21 is a view illustrating an example in which delivery priority information (Delivery Priority) is set to an advertisement content transmitted from the transmission apparatus.

FIG. 21 is a view depicting an example of recording data of correspondence information (for example, signaling data of an FDT or the like or an ESG or the like) corresponding to each of the replacement advertisement contents (Ad2 to Ad4) as NRT content files to be transmitted.

In the correspondence information corresponding to each of the advertisement data (Ad2 to Ad4), the following attribute data regarding each advertisement are recorded:
(a) delivery priority information (Delivery Priority);
(b) delivery time information (start/end time); and
(c) advertisement outputting start/end time (start/end time).

The (a) delivery priority information (Delivery Priority) is a priority degree as a criterion in accordance with which it is to be decided whether or not execution of reception and cache processes by the reception apparatus 30 regarding each advertisement is required, and is a value that can be set freely by the transmission apparatus 20 side.

In the example depicted in FIG. 21, the (a) delivery priority information (Delivery Priority) is set as:
delivery priority information of advertisement 2 (Ad2)=5;
delivery priority information of advertisement 3 (Ad3)=4; and
delivery priority information of advertisement 4 (Ad4)=1,
and the set value of the delivery priority information of the advertisement 2 (Ad2) is highest.

The reception apparatus 30 can perform a process for preferentially selecting, receiving and caching, for example, using the prescribed value as a decision reference value prescribed in advance by the reception apparatus 30, advertisement data to which a delivery priority degree equal to or higher than the prescribed value is set.

The transmission apparatus 20 sets delivery priority information (Delivery Priority) to each of a plurality of advertisement contents to be transmitted to the reception apparatus 30 and transmits the delivery priority information (Delivery Priority) to the reception apparatus 30.

It is to be noted that the delivery priority information (Delivery Priority) is set as a value, for example, according to the degree of the viewing possibility.

The (b) delivery time information (start/end time) is time information within which an advertisement is to be delivered, and has a delivery start time point and a delivery end time point recorded therein.

The (c) advertisement outputting start/end time (start/end time) is a recording region of the output start time point and the output end time point of the advertisement in the reception apparatus.

It is to be noted that an example of particular data in which such information as described above is recorded, for example, an example of an information record such as signaling data such as an FDT, an ESG or the like, is hereinafter described.

Figure 22:
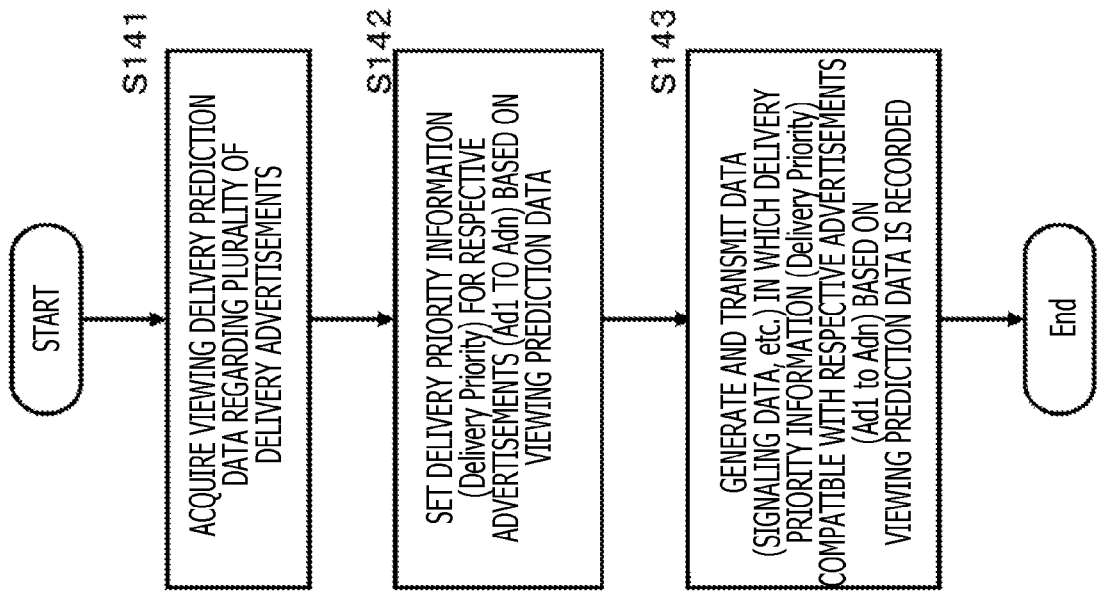
FIG. 22 is a view depicting a flow cart illustrating a processing sequence executed by the transmission apparatus that executes a transmission process of delivery priority information (Delivery Priority).

A generation and transmission sequence of delivery priority information (Delivery Priority) corresponding to an advertisement executed by the transmission apparatus 20 is described with reference to a flow chart depicted in FIG. 22.
(Step S141)

First at step S141, the data processing section of the transmission apparatus acquires user viewing distribution prediction data regarding a plurality of delivery advertisements.

For example, the data processing section acquires such user viewing distribution prediction data by advertisement as depicted in (a) of FIG. 17. For example, the viewing prediction data by advertisement are set in the following manner:
advertisement 1 (Ad1)=55%;
advertisement 2 (Ad2)=25%;
advertisement 3 (Ad3)=15%; and
advertisement 4 (Ad4)=5%.

They are prediction data of the viewing ratio of the four kinds of advertisement contents (Ad1 to Ad4) that can be selectively outputted within the period from time ta to time tb in the reproduction broadcasting program based on the broadcasting AV segment depicted in (b1) of FIG. 17.

In particular, when the users as a whole who view the advertisements within the period from time ta to time tb are represented by 100%, the prediction data are data indicative of a distribution of the viewing ratios of the individual advertisements of the advertisement 1 (Ad1) to advertisement 4 (Ad4).
(Step S142)

Then at step S142, the transmission apparatus sets delivery priority information (Delivery Priority) to the individual advertisements (Ad1 to Adn) on the basis of the viewing prediction data.

For example, the priority information described with reference to FIG. 21:
delivery priority information of advertisement 2 (Ad2)=5;
delivery priority information of advertisement 3 (Ad3)=4; and
delivery priority information of advertisement 4 (Ad4)=1,
is set.
(Step S143)

Then at step S143, the transmission apparatus generates and transmits data in which delivery priority information (Delivery Priority) corresponding to the individual advertisements (Ad1 to Adn) based on the viewing prediction data, for example, signaling data, are recorded.

It is to be noted that, in the signaling data and so forth generated here, not only the delivery priority information (Delivery Priority) but also information corresponding to other various advertisements are recorded. At least, the following data:
(a) delivery priority information (Delivery Priority);
(b) delivery time information (start/end time); and
(c) advertisement outputting start/end time (start/end time),
are recorded as described hereinabove with reference to FIG. 21.

Figure 23:
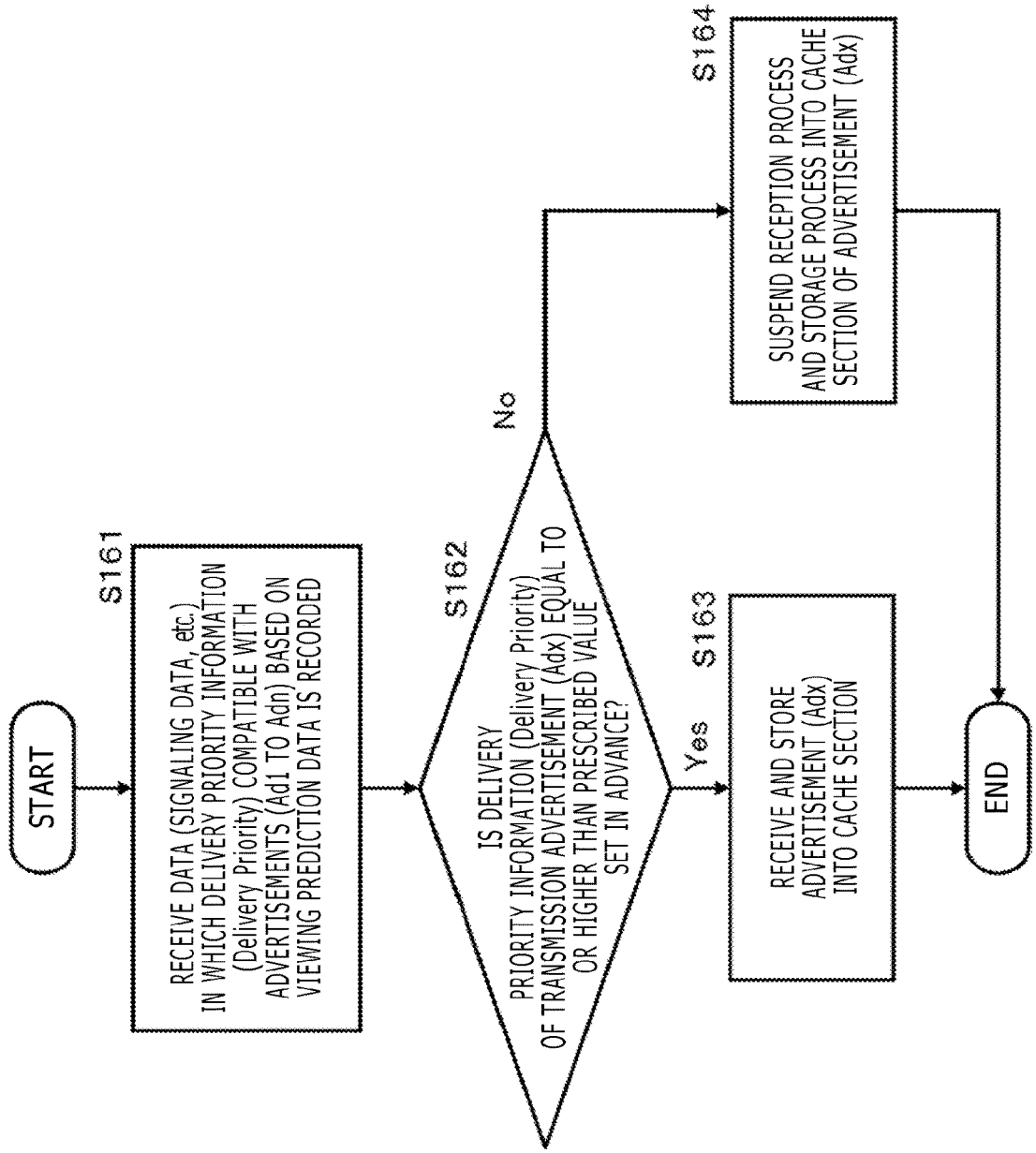
FIG. 23 is a view depicting a flow cart illustrating another processing sequence executed by the transmission apparatus that executes a transmission process of delivery priority information (Delivery Priority).

Now, an example of a processing sequence based on delivery priority information (Delivery Priority) executed by the reception apparatus 30 is described with reference to a flow chart of FIG. 23.

(Step S161)

First at step S161, the data processing section of the reception apparatus receives data in which delivery priority information (Delivery Priority) corresponding to individual advertisements (Ad1 to Adn), for example, signaling data, based on viewing prediction data.

It is to be noted that the received signaling data has the following data:

(a) delivery priority information (Delivery Priority);
(b) delivery time information (start/end time); and
(c) advertisement outputting start/end time (start/end time)

recorded therein as described hereinabove with reference to FIG. 21.

(Step S162)

Then at step S162, the reception apparatus confirms a set value of the delivery priority information (Delivery Priority) regarding each of the advertisements (Adx) transmitted from the transmission apparatus and decides whether or not the delivery priority information (Delivery Priority) is equal to or higher than a prescribed value set in advance.

If the delivery priority information (Delivery Priority) of the transmission advertisement (Adx) is equal to or higher than the prescribed value set in advance, then the process advances to step S163.

If the delivery priority information (Delivery Priority) of the transmission advertisement (Adx) is not equal to or higher than the prescribed value set in advance, then the process advances to step S164.

(Step S163)

If the delivery priority information (Delivery Priority) of the transmission advertisement (Adx) is equal to or higher than the prescribed value set in advance, then the process advances to step S163, at which the reception apparatus performs processes for receiving and storing the transmission advertisements (Adx) into the cache section.

(Step S164)

On the other hand, if the delivery priority information (Delivery Priority) of the transmission advertisements (Adx) is not equal to or higher than the prescribed value set in advance, then the process advances to step S164, at which the reception apparatus stops the reception process and the cache section storage process of the transmission advertisements (Adx).

In this manner, the reception apparatus can decide whether or not a cache storage process is required on the basis of the delivery priority information (Delivery Priority) corresponding to each advertisement, store only advertisements having higher priorities into the cache section and reproduce them.

Consequently, although whether a delivered NRT content is to be stored into a cache is originally determined under the control of an application, even if no request is received from the application, the cache controlling section or the data processing section of the reception apparatus that controls the cache controlling section can decide whether the NRT is to be cached on the basis of the delivery priority information (Delivery Priority).

10. Process to which Service Selection Priority Information (Service Selection Priority) is Applied Now, a process in a case where advertisement deliveries from a plurality of different channels compete with each other is described.

In particular, a process to which service selection priority information (Service Selection Priority) is applied is described.

A great number of broadcasting stations deliver advertisements, and a plurality of transmission apparatus 20 such as individual broadcasting stations execute various advertisement deliveries during various time periods.

If the user of the reception apparatus 30 is in a state in which the user is viewing (tuned to) a specific broadcasting station 20, then the reception apparatus 30 receives an NRT content file in which a broadcasting program content of the selected channel and an NRT content incidental to the broadcasting program, for example, an advertisement content for replacement are stored.

However, in a state in which the reception apparatus 30 does not receive a broadcast of the specific channel, for example, while the reception apparatus is set to a standby mode late at night, the transmission apparatus 20 sometimes transmits various data files.

The reception apparatus 30 can know a delivery schedule of various contents in advance on the basis of signaling data of an ESG (electronic service guide (Electronic Service Guide)) received already in advance, and can receive data delivered late at night or the like and store the data into the cache section in the standby mode.

For example, signaling data such as an ESG or an FDT has access information and delivery timing information of delivery data recorded therein, and the reception apparatus 30 can automatically execute, in the standby mode, tuning (channel setting) for receiving data to acquire delivery data and store the delivery data into the cache section suitably.

However, if different data are transmitted at the same timing, for example, from different broadcasting stations, for example, if different advertisements, an advertisement 1 (Ad1) and another advertisement 2 (Ad2), are transmitted from two different broadcasting stations, the reception apparatus 30 can perform a reception process of only one of the advertisements.

In particular, if such competition of delivery data occurs, then it is necessary for the reception apparatus 30 to execute a selection process of reception data in accordance with some algorithm.

Figure 24:
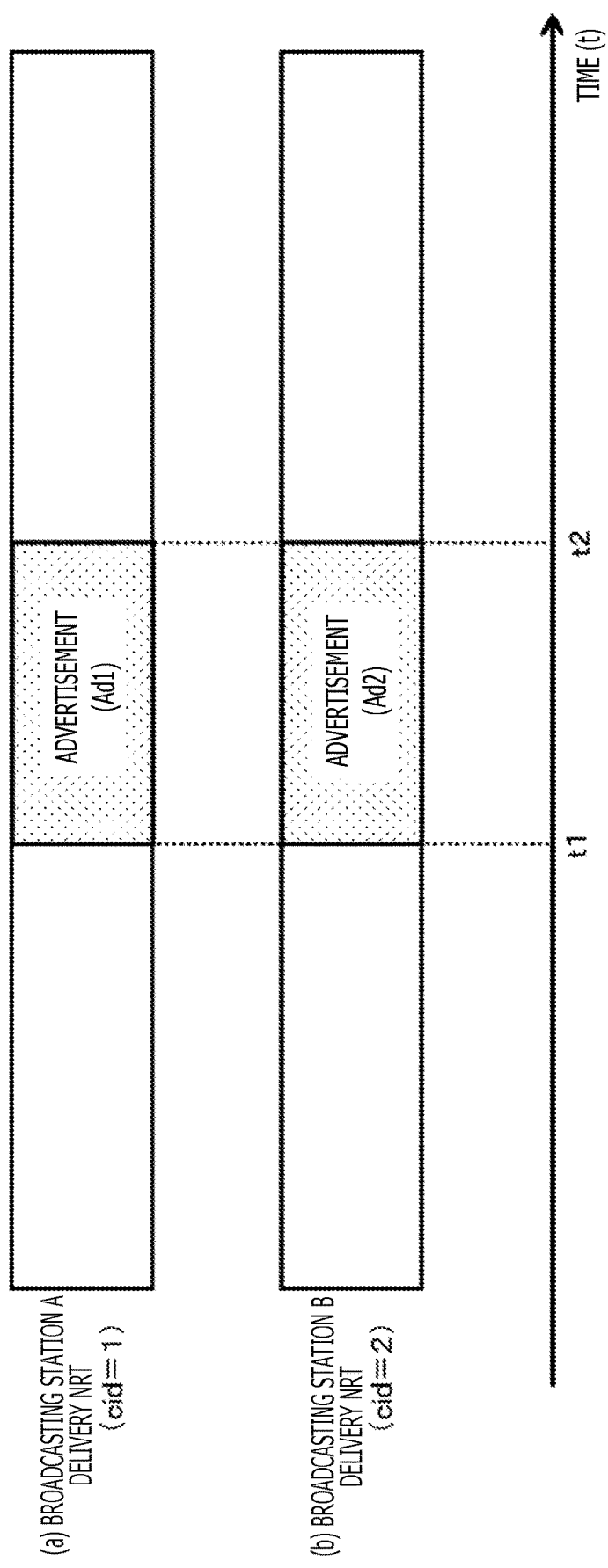
FIG. 24 is a view illustrating an example in which delivery time periods of advertisement contents transmitted through different channels overlap with each other.

FIG. 24 depicts a transmission sequence in a case where different advertisements, an advertisement 1 (Ad1) and another advertisement 2 (Ad2), are transmitted at the same timing from different broadcasting stations (broadcasting station A and broadcasting station B).

The broadcasting station A (cid=1) transmits an advertisement 1 (AD1) as an NRT content file within the period from time t1 to time t2.

Also the broadcasting station B (cid=2) transmits another advertisement 2 (Ad2) as an NRT content file within the period from time t1 to time t2.

If such competition of delivery data occurs, then it becomes necessary for the reception apparatus 30 to execute a selection process of reception data in accordance with some algorithm.

In the following, a configuration of the reception apparatus 30 for selectively acquiring one of advertisements in such a case as just described is described. Before an advertisement delivery process, priority information for decision of selective acquisition is set to data to be transmitted from the transmission apparatus 20 to the reception apparatus 30, for example, to signaling data such as an ESG or an FDT, and an advertisement to be selectively acquired is determined on the basis of the priority information.

It is to be noted that the priority information to be applied to the advertisement selection is called service selection priority information (Service Selection Priority).

Transmission and utilization processes of signaling data in which service selection priority information (Service Selection Priority) is recorded are described with reference to FIGS. 25 and 26.

Figure 25:
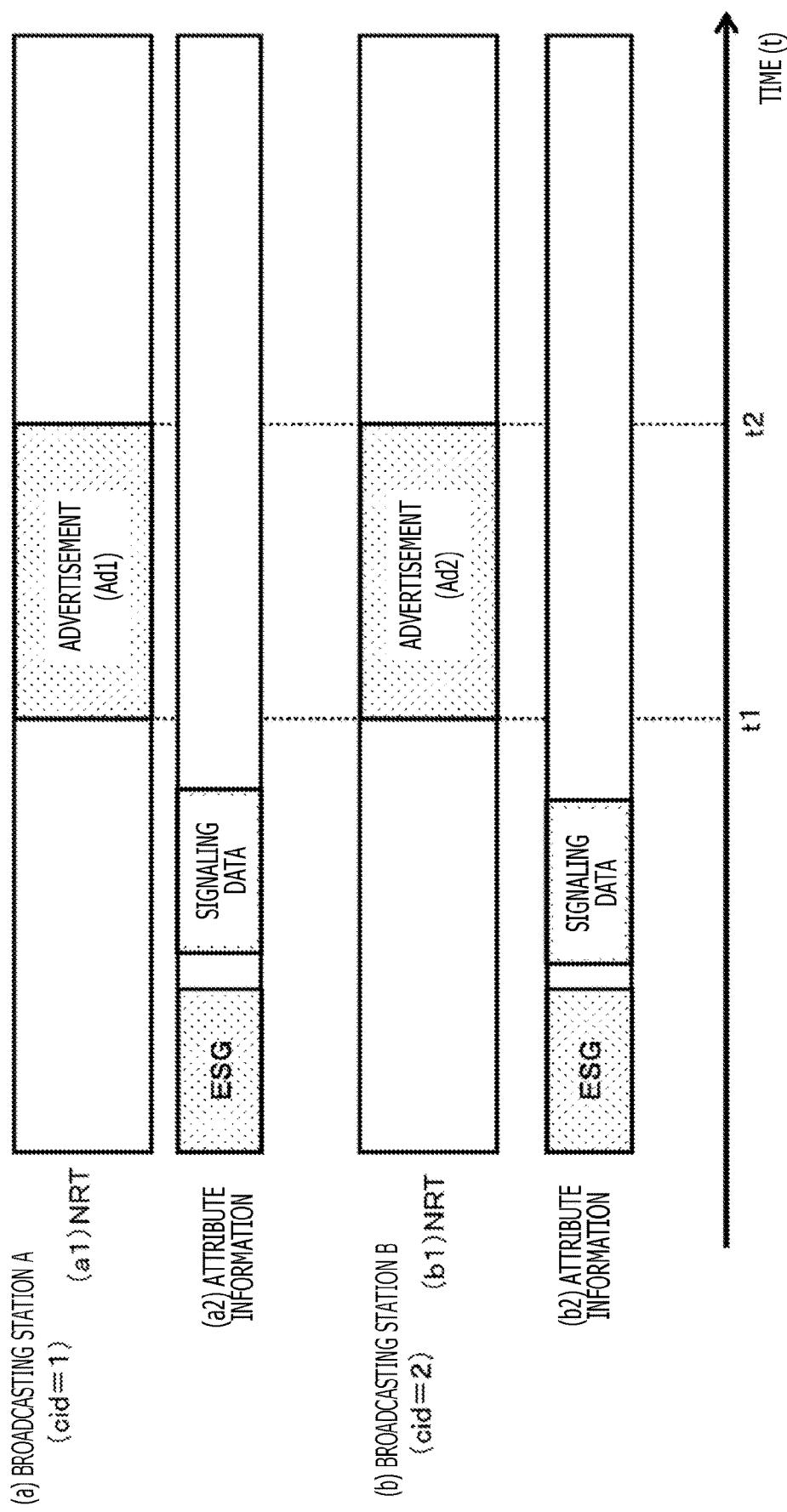
FIG. 25 is a view illustrating an example of a configuration in which, where delivery time periods of advertisement contents transmitted through different channels overlap with each other, the reception apparatus can select data to be received.

FIG. 25 depicts an example of a transmission process of advertisement data (NRT content file) and advertisement-corresponding attribute information, for example, an ESG or signaling data, transmitted from each of the broadcasting station A (cid=1) and the broadcasting station B (cid=2). The advertisement-corresponding attribute information depicted in FIG. 25 is signaling data of an ESG, an FDT or the like in which attribute information and control information regarding the advertisement 1 (Ad1) and the advertisement 2 (Ad2) provided by the broadcasting stations are recorded.

In the signaling data such as an ESG or an FDT, service selection priority information (Service Selection Priority) is recorded.

This service selection priority information (Service Selection Priority) is applied to a content selection decision process for selectively receiving and caching one content in a case where delivery time periods of delivery contents such as advertisements overlap with each other.

The acquisition content selection process in which the service selection priority information (Service Selection Priority) executed by the reception apparatus is used is described with reference to FIG. 26.

First, the reception apparatus receives, as depicted at step A, pre-acquired data in which access information such as delivery time information regarding delivery advertisements is recorded, for example, an ESG or an FDT that is signaling data and confirms the delivery time periods of the advertisements.

Here, it is assumed that it is confirmed that delivery time periods of a plurality of different advertisements overlap (compete) with each other as indicated at step B.

In this case, the reception apparatus 30 refers to the signaling data such as the ESG or the FDT transmitted from each broadcasting station and refers to the service selection priority information (Service Selection Priority) associated with the individual delivery advertisements.

It is to be noted that, as the recording data of the service selection priority information (Service Selection Priority), for example, one of (a) ESG (Electronic Service Guide) that is an electronic service guide including a broadcasting program table or the like, (b) FDT (File Delivery Table) in which metadata of transmission files are recorded, and (c) CRT (Conflict Resolution Table) that is data for exclusive use for recording of the service selection priority information (Service Selection Priority) can be utilized.

Figure 26:
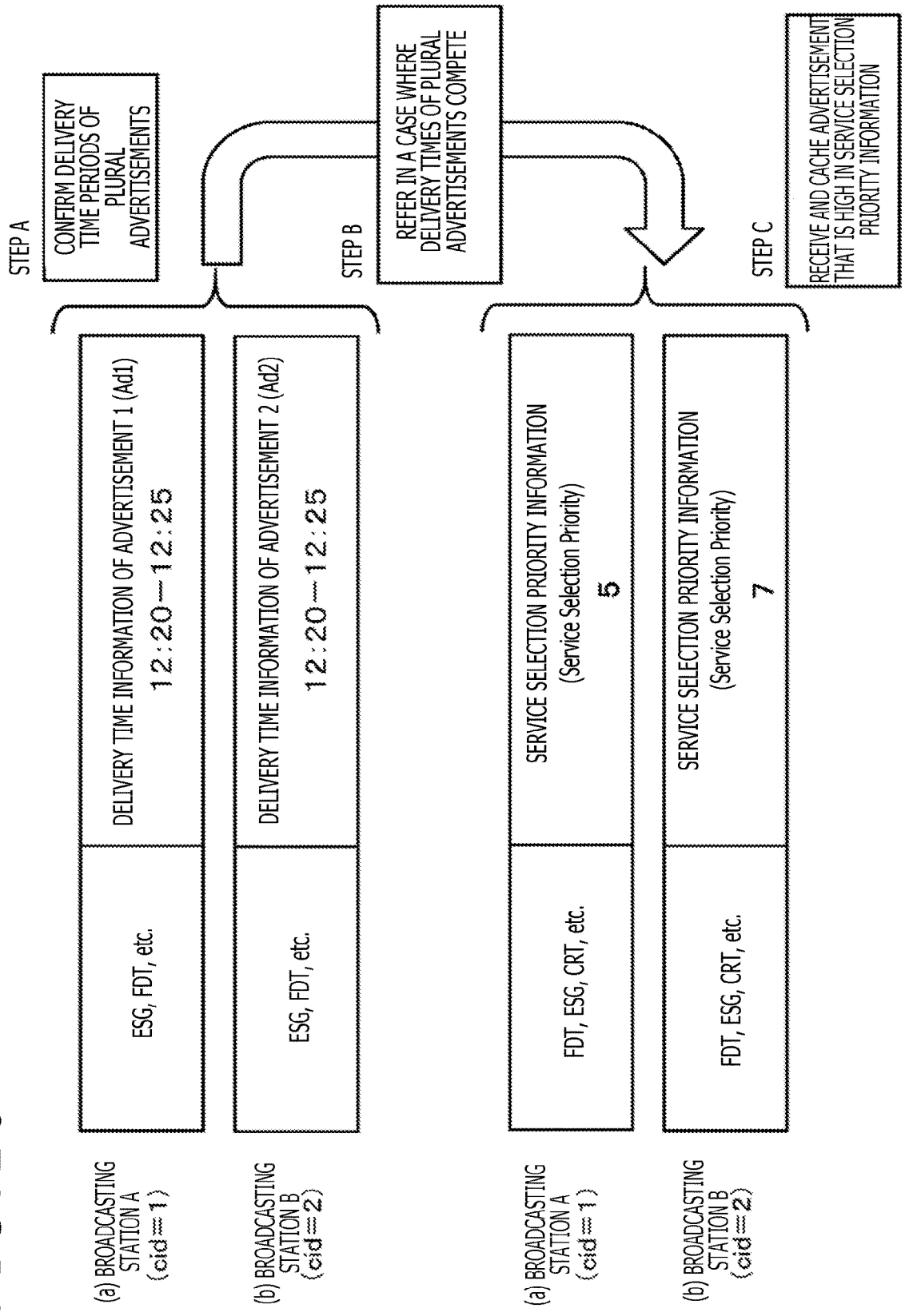
FIG. 26 is a view illustrating another example of a configuration in which, where delivery time periods of advertisement contents transmitted through different channels overlap with each other, the reception apparatus can select data to be received.

Then at step C depicted in FIG. 26, the reception apparatus 30 compares the service selection priority information (Service Selection Priority) associated with the individual delivery advertisements with each other to select an advertisement to which comparatively high priority information is set as a target for reception and cache.

In the example depicted in FIG. 26, the service selection priority information (Service Selection Priority) corresponding to the advertisement 1 (Ad1) transmitted from the broadcasting station A (cid=1) is [5].

Meanwhile, the service selection priority information (Service Selection Priority) corresponding to the advertisement 2 (Ad2) transmitted from the broadcasting station B (cid=2) is [7].

In this case, the reception apparatus 30 selectively receives the advertisement (Ad2) transmitted from the broadcasting station B (cid=2) and executes a cache process.

By executing such processes as described above, the reception apparatus 30 can select and acquire one reception content with certainty even in a case in which delivery time periods of a plurality of contents (advertisements or the like) overlap with each other.

It is to be noted that, in a case where a provision content corresponding to each broadcasting station is to be received, an application corresponding to the broadcasting station for executing a reception process of a reception target content is activated to execute a process.

In particular, the reception apparatus 30 compares the service selection priority information (Service Selection Priority) associated with the individual delivery advertisements and determines to receive an advertisement to which comparatively high priority information is set, and then activates an application for receiving the advertisement to execute an advertisement reception process and a cache process.

Figure 27:
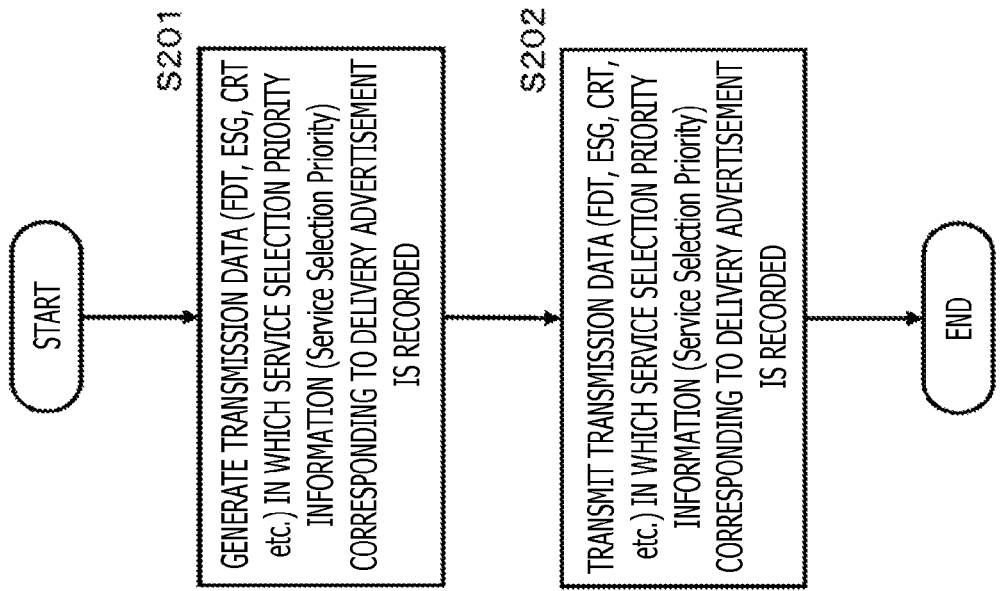
FIG. 27 is a view depicting a flow chart illustrating a processing sequence executed by the transmission apparatus that executes a reception process of service selection priority information (Service Selection Priority).

A generation and transmission sequence of service selection priority information (Service Selection Priority) executed by the transmission apparatus 20 is described with reference to a flow chart depicted in FIG. 27.

(Step S201)

The data processing section of the transmission apparatus generates, first at step S201, transmission data (FDT, ESG, CRT and so forth) in which service selection priority information (Service Selection Priority) corresponding to a delivery advertisement is recorded.

As described hereinabove, the service selection priority information (Service Selection Priority) is recorded, for example, into one of the data of (a) ESG (Electronic Service Guide) that is an electronic service guide including a broadcasting program table or the like, (b) FDT (File Delivery Table) in which metadata of transmission files are recorded, and (c) CRT (Conflict Resolution Table) that is data for exclusive use for recording of the service selection priority information (Service Selection Priority).

(Step S202)

Then at step S202, the transmission apparatus transmits the transmission data (FDT, ESG, CRT or the like) in which the service selection priority information (Service Selection Priority) corresponding to the delivery advertisement is recorded.

Figure 28:
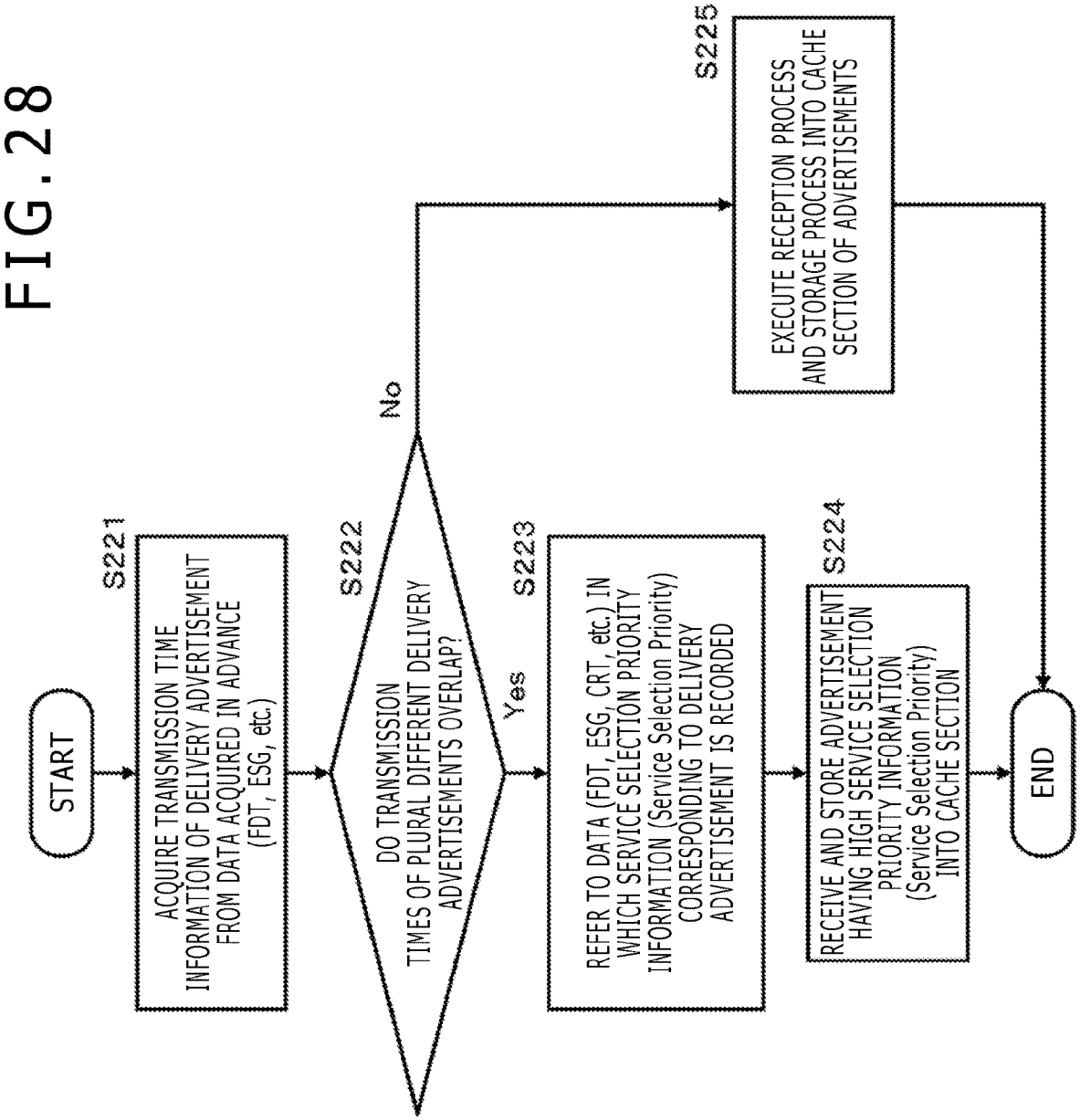
FIG. 28 is a view depicting a flow chart illustrating a processing sequence executed by the reception apparatus that executes a transmission process of service selection priority information (Service Selection Priority).

Now, an example of a processing sequence based on the service selection priority information (Service Selection Priority) executed by the reception apparatus 30 is described with reference to a flow chart depicted in FIG. 28.

(Step S221)

First at step S221, the data processing section of the reception apparatus acquires transmission time information of delivery advertisements from pre-acquired data such as, for example, an ESG or an FDT.

(Step S222)

Then at step S222, the reception apparatus decides whether or not transmission time periods of a plurality of different delivery advertisements overlap with each other.

If it is confirmed that the transmission time periods overlap, then the process advances to step S223.

If it is confirmed that the transmission time periods do not overlap, then the process advances to step S225.

(Step S223)

If it is confirmed that transmission time periods of a plurality of different delivery advertisements overlap with each other, then the process advances to step S223, at which the reception apparatus refers to the data (FDT, ESG, CRT or the like) in which the service selection priority information (Service Selection Priority) corresponding to the delivery advertisements is recorded.

(Step S224)

Then at step S224, the reception apparatus selects an advertisement having high service selection priority information as a target for reception and cache on the basis of the service selection priority information (Service Selection Priority) referred to at step S223, and receives and stores the selected advertisement into the cache section.

It is to be noted that, in order to execute the advertisement reception and cache processes under the application control, it is necessary to activate an application to be applied to the reception and cache storage processes of an advertisement that becomes a reception target, and the reception apparatus 30 activates the application for executing a process corresponding to the selected advertisement to execute the reception and cache processes of the advertisement.

(Step S225)

On the other hand, if it is confirmed by the decision process at step S222 that the transmission time periods of the plurality of different delivery advertisements do not overlap with each other, then the process advances to step S225, at which a process for successively receiving and storing the delivery advertisements into the cache section is executed.

In this manner, in a case where delivery time periods of a plurality of different contents such as advertisements compete with each other, the reception apparatus 30 can select one of the contents and receive and store the content into the cache section.

Although, in the working example described above, an application is activated such that a cache process is executed under the control of the application, if the application issues an instruction for acquisition of an NRT file by a cache API in advance, then the data reception section can perform a process for deciding from delivery time periods of the ESG and storing an NRT content into the cache without activating the application.

11. Example of Recording Configuration of Individual Priority Information

In the description given above, as the priority information to be applied to a priority acquisition decision of a content such as an advertisement by the reception apparatus 30, the following two kinds of priority information are described:

(1) delivery priority information (Delivery Priority); and
(2) service selection priority information (Service Selection Priority).

The (1) delivery priority information (Delivery Priority) is priority information associated with each of a plurality of advertisement contents that can be outputted within one advertisement outputting time zone of one certain channel as described hereinabove with reference to FIGS. 21 to 23.

The (1) delivery priority information (Delivery Priority) is priority information set to each of different content (for example, different advertisement) data delivered successively through one NRT transmission channel.

The reception apparatus 30 can selectively receive and cache a content (advertisement) of a high delivery priority degree on the basis of the delivery priority information (Delivery Priority).

The (2) service selection priority information (Service Selection Priority) is priority information associated with each of advertisement contents delivered through a plurality of different channels as described hereinabove with reference to FIGS. 24 to 28.

In a case where delivery time periods of advertisement contents delivered through a plurality of different channels overlap with each other, the reception apparatus 30 refers to the service selection priority information (Service Selection Priority) corresponding to each advertisement and selects, receives and caches a content (advertisement) having a high service selection priority degree.

The two kinds of priority information can be transmitted incidentally to an advertisement content itself that is to be transmitted from the transmission apparatus 20 to the reception apparatus and also can be transmitted in a form in which it is recorded in signaling data such as an ESG or an FDT to be transmitted in prior to each advertisement content.

Although the two kinds of priority information can be recorded directly into an advertisement data file (NRT content file), it is possible, for example, to record the priority information into such data as described below, which are transmitted in prior to the advertisement data file, and transmit the data from the transmission apparatus 20 to the reception apparatus 30:

(a) ESG (Electronic Service Guide) that is an electronic service guide including a broadcasting program table or the like;

(b) FDT (File Delivery Table) in which metadata of transmission files are recorded; and (c) CRT (Conflict Resolution Table) that is data for exclusive use for recording of service selection priority information (Service Selection Priority).

One of such data as described above can be utilized, for example.

Figure 29:
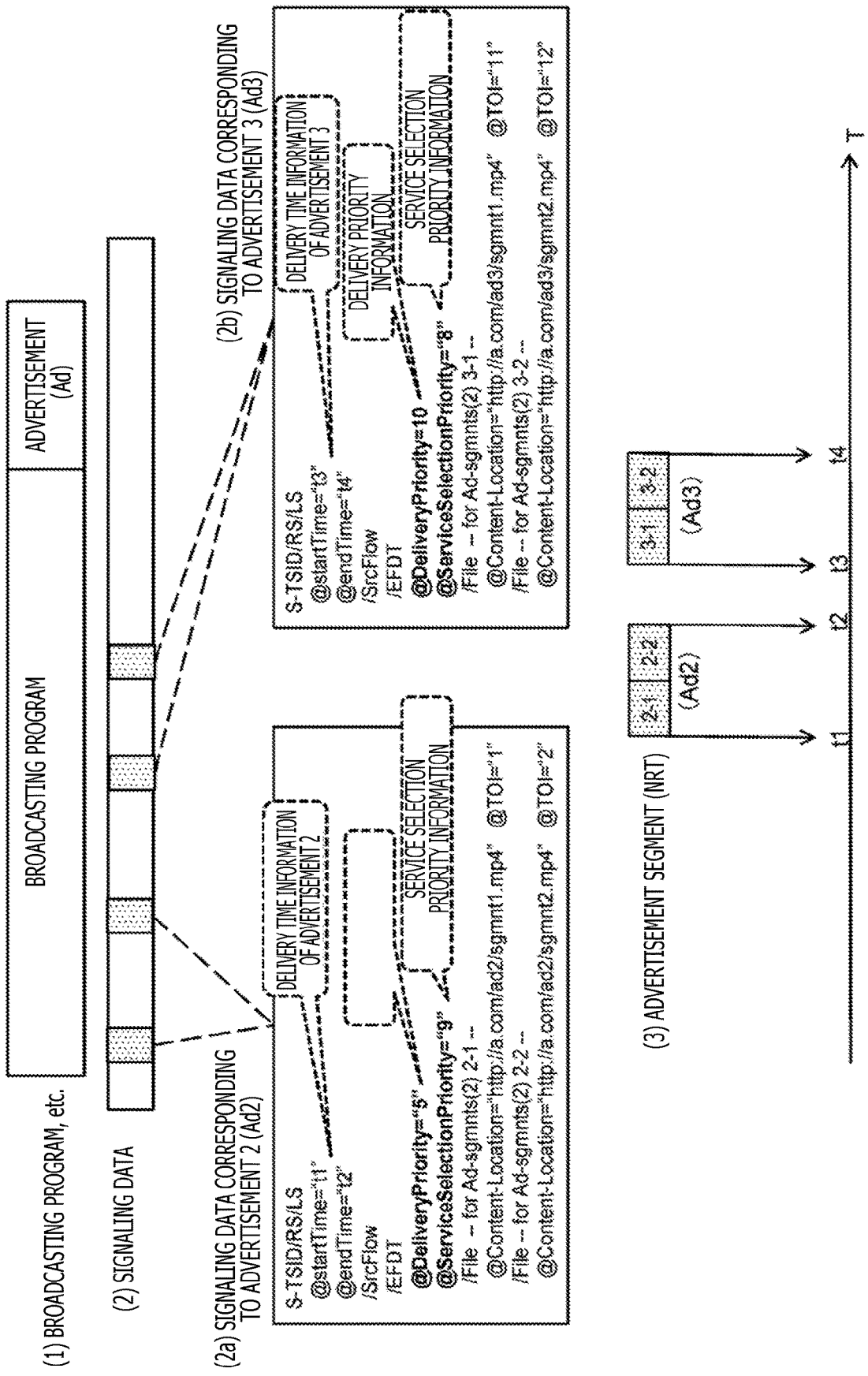
FIG. 29 is a view illustrating an example of recording and transmission processes of priority information.

FIG. 29 depicts an example in which two kinds of priority information given below are recoded in an FDT (File Delivery Table) in which metadata of each transmission file is recorded:

(1) delivery priority information (Delivery Priority) and
(2) service selection priority information (Service Selection Priority).

FIG. 29 depicts an example of delivery of the following data:

(1) delivery data of a broadcasting program and so forth;
(2) signaling data; and
(3) delivery data of an advertisement segment (NRT).

Further, as details of the signaling data, (2a) signaling data corresponding to the advertisement 2 (Ad2) and
(2b) signaling data corresponding to the advertisement 3 (Ade) are depicted.

In each signaling data, (1) delivery priority information (Delivery Priority) and
(2) service selection priority information (Service Selection Priority)

are recorded, and further, delivery time information and so forth of the advertisement are recorded.

The reception apparatus receives the signaling data before each advertisement is transmitted from the transmission apparatus, and executes analysis of the signaling data.

The reception apparatus can acquire, on the basis of the analysis of the signaling data, the following priority information regarding each advertisement to be scheduled for transmission, namely, (1) delivery priority information (Delivery Priority) and
(2) service selection priority information (Service Selection Priority)

and select an advertisement content for which reception and cache processes are to be executed on the basis of the acquired priority information.

An example of a recording position of each kind of priority information in a case where the following two kinds of priority information are recorded into an FDT (File Delivery Table) that is signaling data into which metadata of each transmission file is to be recorded is described with reference to FIG. 30 and so forth:

(1) delivery priority information (Delivery Priority) and
(2) service selection priority information (Service Selection Priority)

Figure 30:
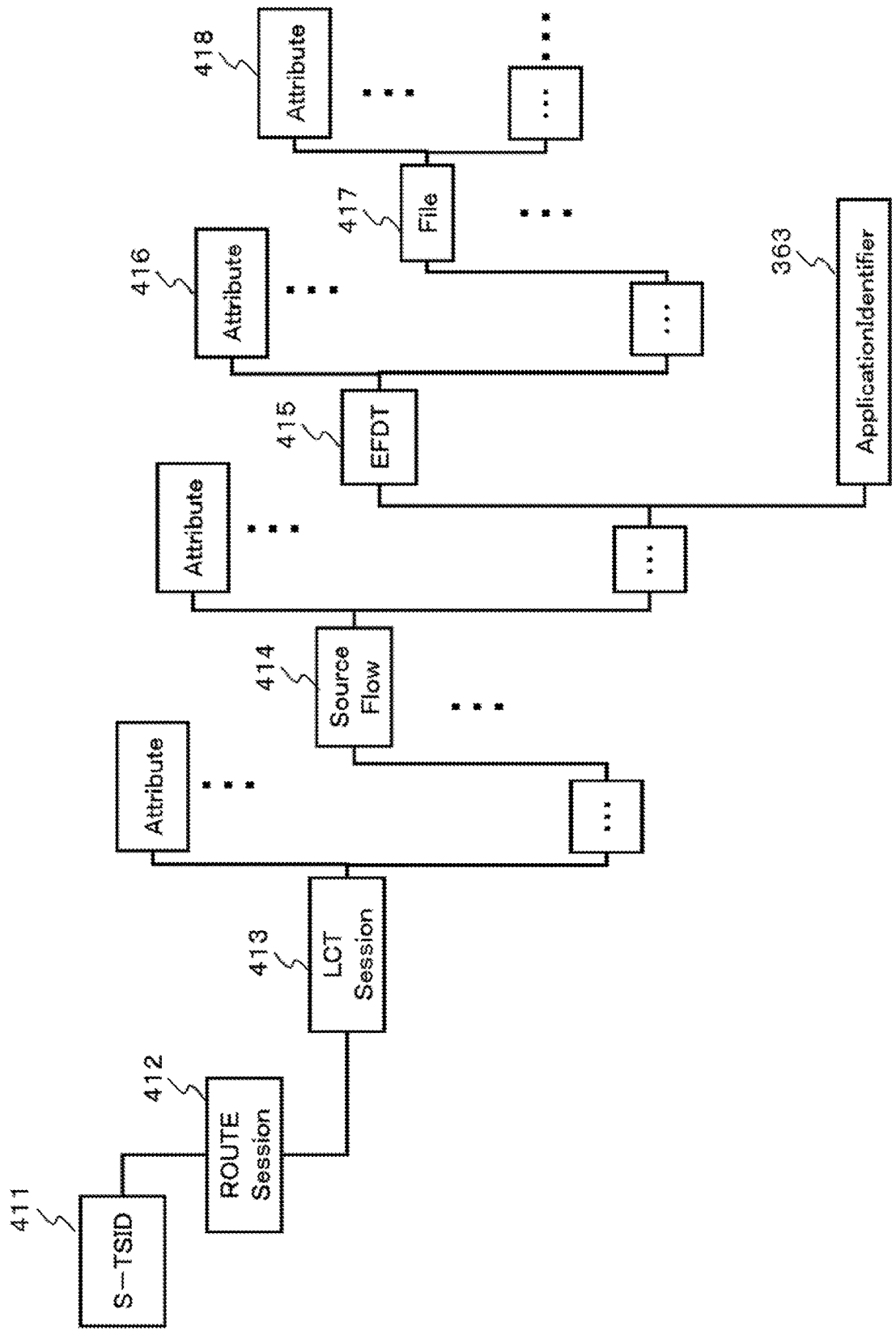
FIG. 30 is a view illustrating an example of a recording configuration of priority information.
Figure 31:
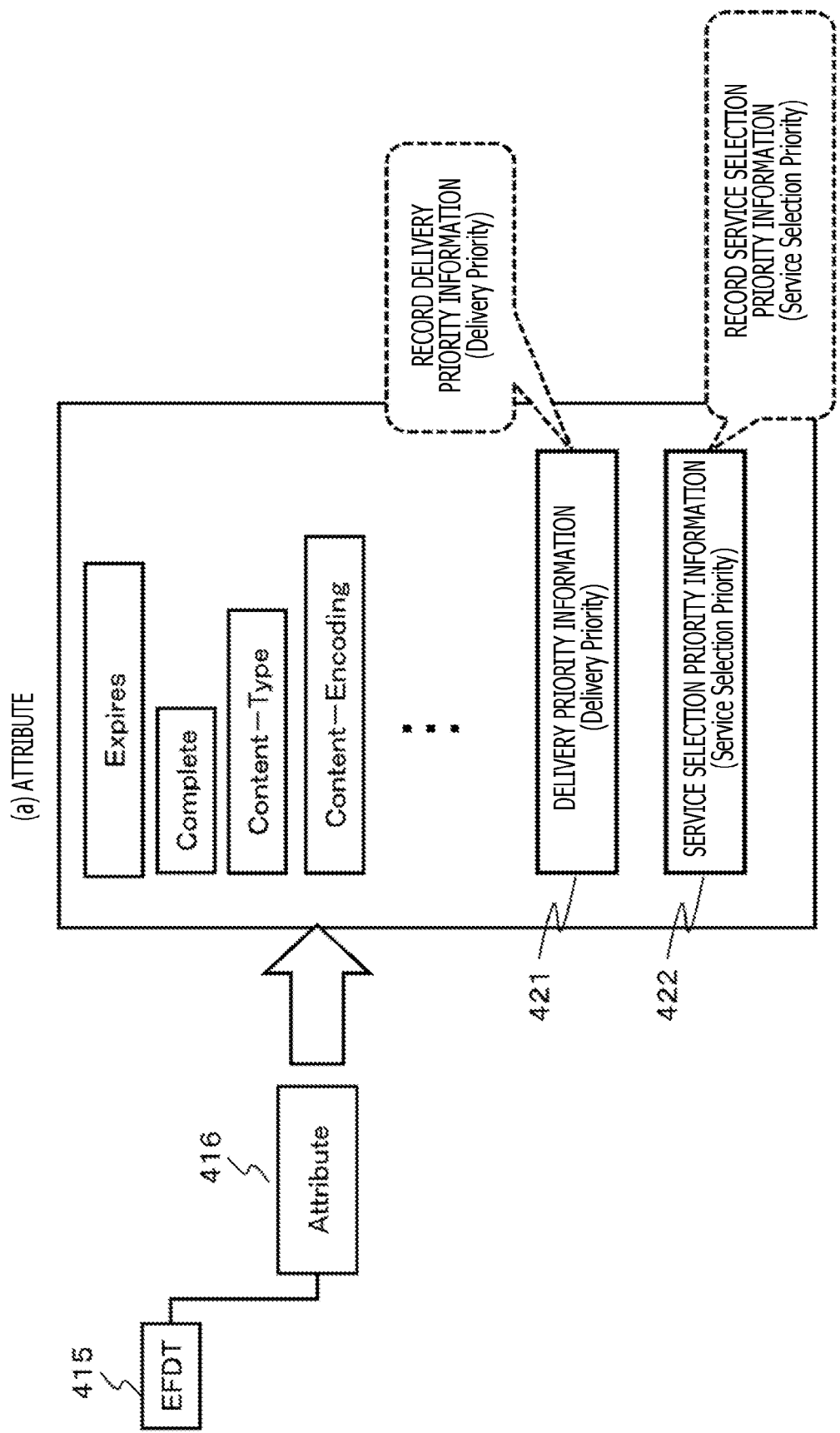
FIG. 31 is a view illustrating the example of the recording configuration of priority information.

The example depicted in FIGS. 30 and 31 is an example in which the following priority information:

(1) delivery priority information (Delivery Priority) and
(2) service selection priority information (Service Selection Priority)

are recorded in the attribute (Attribute) of S-TSID/RS/LS/SrcFlow/EFDT elements of the S-TSID that is signaling data.

FIG. 30 depicts a configuration of the S-TSID that is signaling data prescribed in ROUTE. The S-TSID has a hierarchical configuration of the following elements:

an S-TSID element 411;
a ROUTE session (ROUTESession) element 412;
an LCT session (LCTSession) element 413;
a source flow (SourceFlow) element 414;
an EFDT element 415; and
a file (File) element 417.

The S-TSID has a hierarchical setting of the hierarchies given above.

The priority information regarding each advertisement data can be recorded into an attribute (attribute) (Attribute) data element 416 in a unit of the EFDT element 415.

A detailed configuration of this is depicted in FIG. 31.

In the attribute (attribute) recording region, a data recording field (any) into which free data can be stored is set in addition to a recording region for prescribed attribute (Attribute) information.

In this data recording field (any), such priority information as (1) delivery priority information (Delivery Priority) 421 and
(2) service selection priority information (Service Selection Priority) 422 is recorded.

It is to be noted that it can be set to record, into this attribute (attribute) recording region, the above-described two kinds of priority information corresponding to a plurality of advertisements for each advertisement.

Alternatively, it may be set to record only the above-described two kinds of priority information corresponding to one advertisement.

Figure 32:
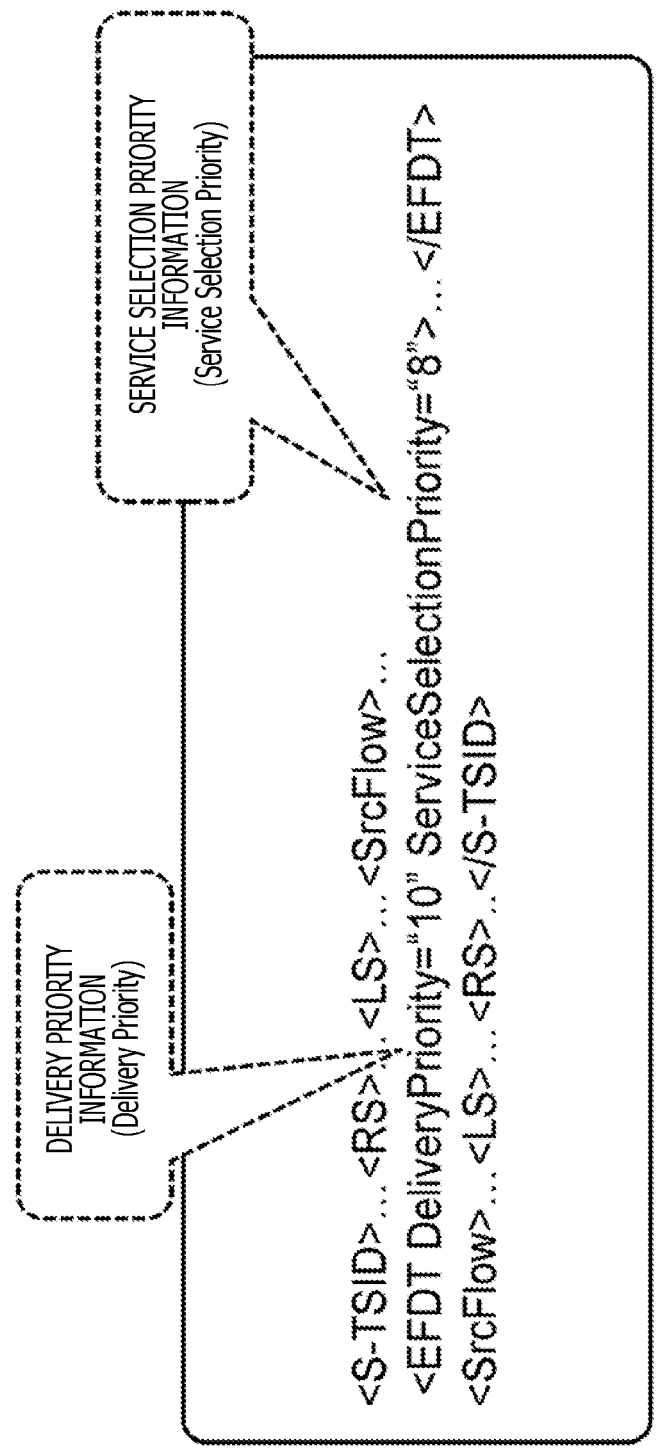
FIG. 32 is a view illustrating the example of the recording configuration of priority information.

An example of a particular description (XML data) of each kind of priority information is depicted in FIG. 32 and indicated below.

<S-TSID> . . . <RS> . . . <LS> . . . <SrcFlow> . . .
<EFDT DeliveryPriority="10" ServiceSelectionPriority="8" . . . </EFDT>
<SrcFlow> . . . <LS> . . . <RS>> . . . </S-TSID>

The above-described XML data is an example of data in which priority information having a setting of (1) delivery priority information (Delivery Priority)=10 and
(2) service selection priority information (Service Selection Priority)=8
is recorded.

Although the example described with reference to FIGS. 30 to 32 is an example in which two kinds of priority information are recorded as an attribute (Attribute) of the EFDT element of the S-TSID, also it is possible to record the two kinds of priority information into an attribute (Attribute) element 418 of the lower file (File) element 417 of the EFDT element 415 depicted in FIG. 30.

In particular, also it is possible to record such priority information as (1) delivery priority information (Delivery Priority) and
(2) service selection priority information (Service Selection Priority)

in the attribute (Attribute) of the S-TSID/RS/LS/SrcFlow/EFDT/File element.

Attribute information of a unit of an NRT content file that is a transmission file of advertisement data can be recorded into the attribute (attribute) (Attribute) data element 418 of a unit of the file (File) element 417.

Figure 33:
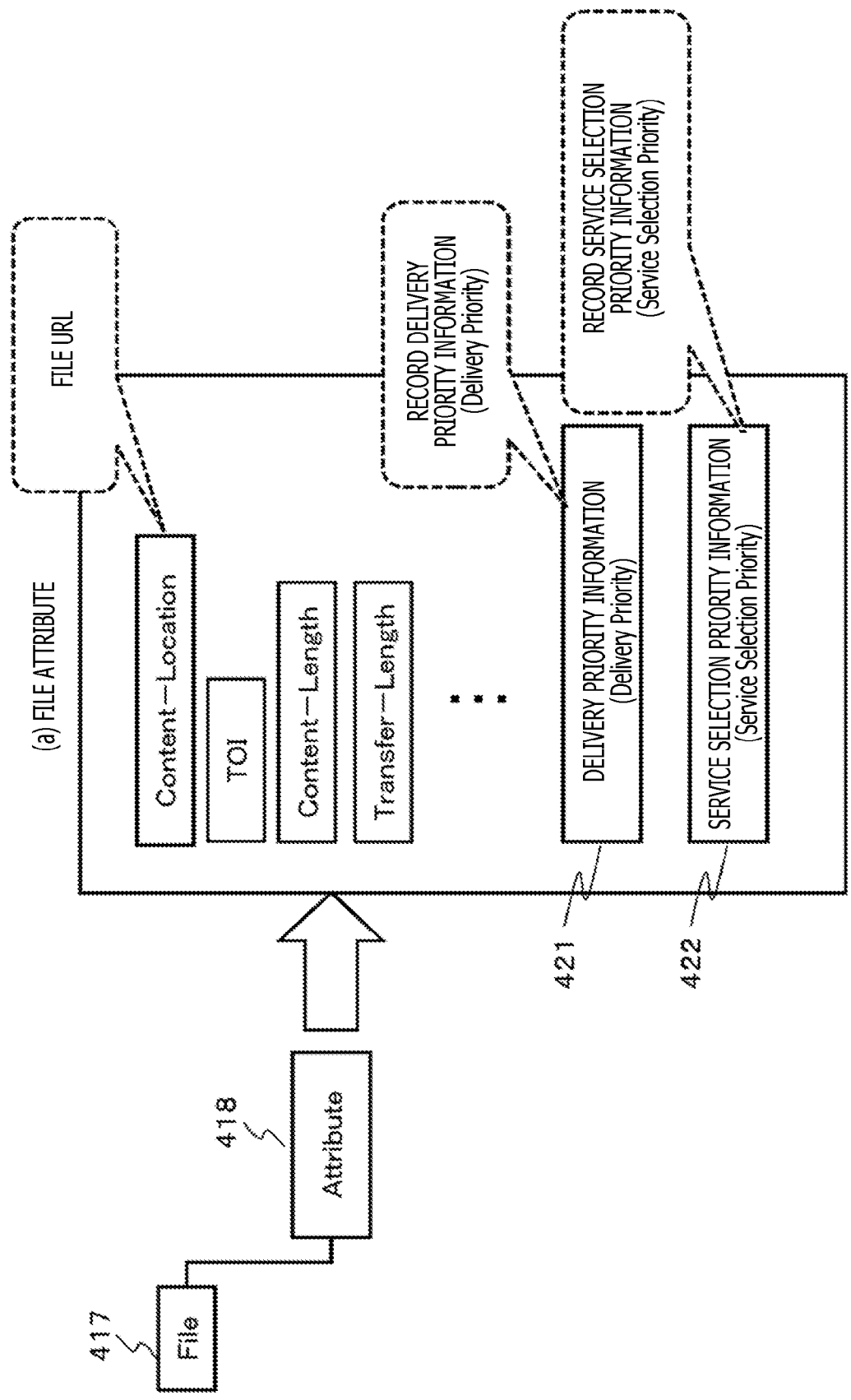
FIG. 33 is a view illustrating the example of the recording configuration of priority information.

A detailed configuration of this is depicted in FIG. 33.

In the attribute (attribute) recording region, a data recording field (any) into which free data can be stored is set in addition to a recording region for prescribed attribute (Attribute) information.

In this data recording field (any), such priority information as (1) delivery priority information (Delivery Priority) 421 and
(2) service selection priority information (Service Selection Priority) 422
is recorded.

Figure 34:
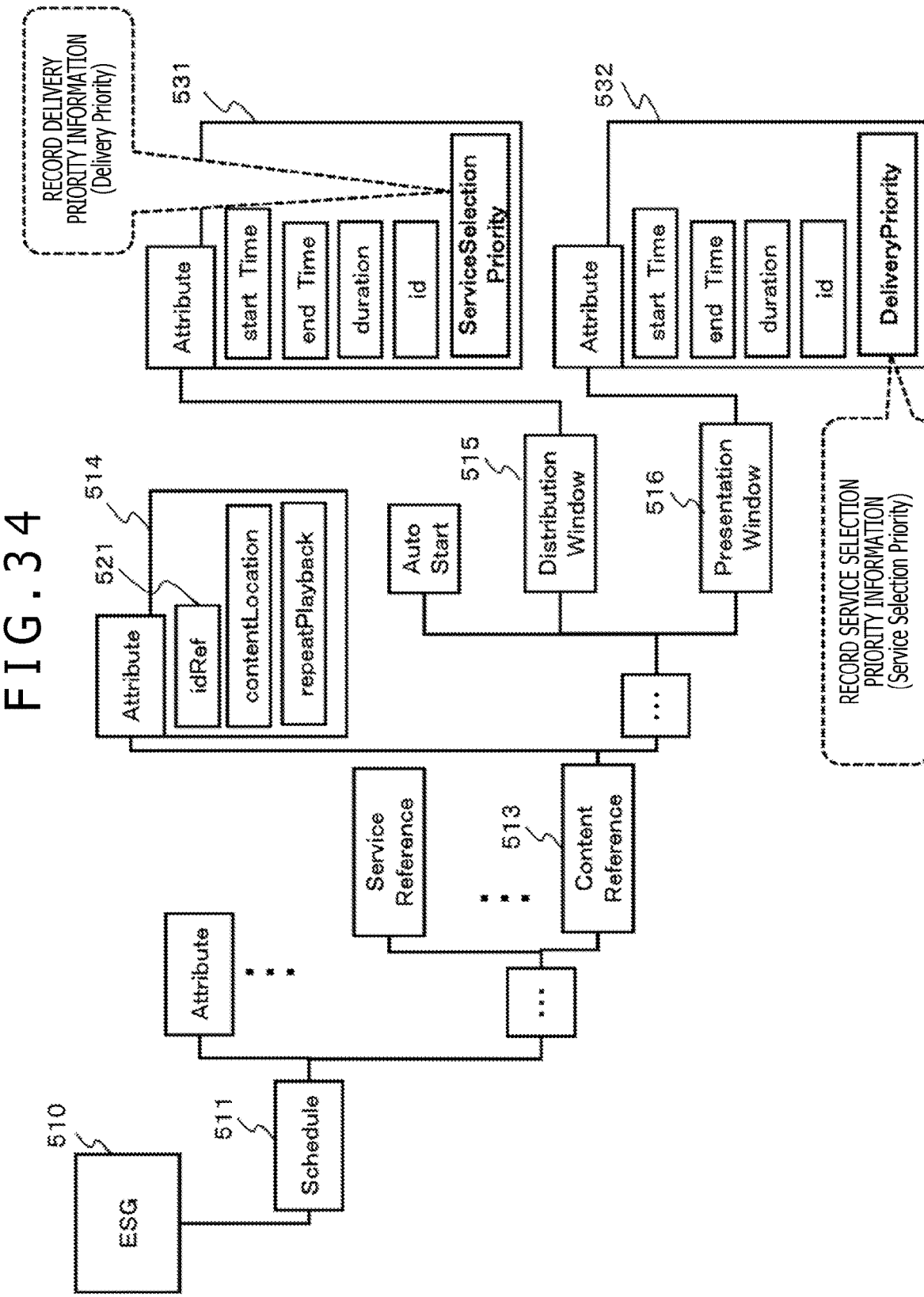
FIG. 34 is a view illustrating a different example of a recording configuration of priority information.

Further, referring to FIG. 34, an example of data recording in a case where such priority information as (1) delivery priority information (Delivery Priority) and
(2) service selection priority information (Service Selection Priority)

is recorded into an ESG (Electronic Service Guide) that is an electronic service guide including a broadcasting program table or the like is described.

FIG. 34 is a view depicting a configuration (partial configuration) of an ESG.

In an ESG 510, a schedule (Schedule) element 511 is set.

Further, below the schedule (Schedule) element 511, such elements as a content reference (ContentReference) element 513,
a distribution window (DistributionWindow) element 515 and
a presentation window (PresentationWindow) element 516
are arranged.

An attribute (attribute) element is set in a unit of an element, and attribute information of each of a unit of an element can be recorded.

In an attribute (attribute) element 514 just below the content reference (ContentReference) element 513,
an idRef 521 is recorded.

The idRef 521 is information that makes it possible to identify to which content segment the information recorded in the overall schedule element corresponds. For example, it is possible to identify to which advertisement content the information recorded in the overall schedule elements corresponds.

The "delivery priority information (Delivery Priority)"
is recorded in an attribute (attribute) element 531 just below the distribution window (DistributionWindow) element 515.

Meanwhile, the "service selection priority information (Service Selection Priority)"

is recorded in an attribute (attribute) element 532 just below the presentation window (PresentationWindow) element 516.

Figure 35:
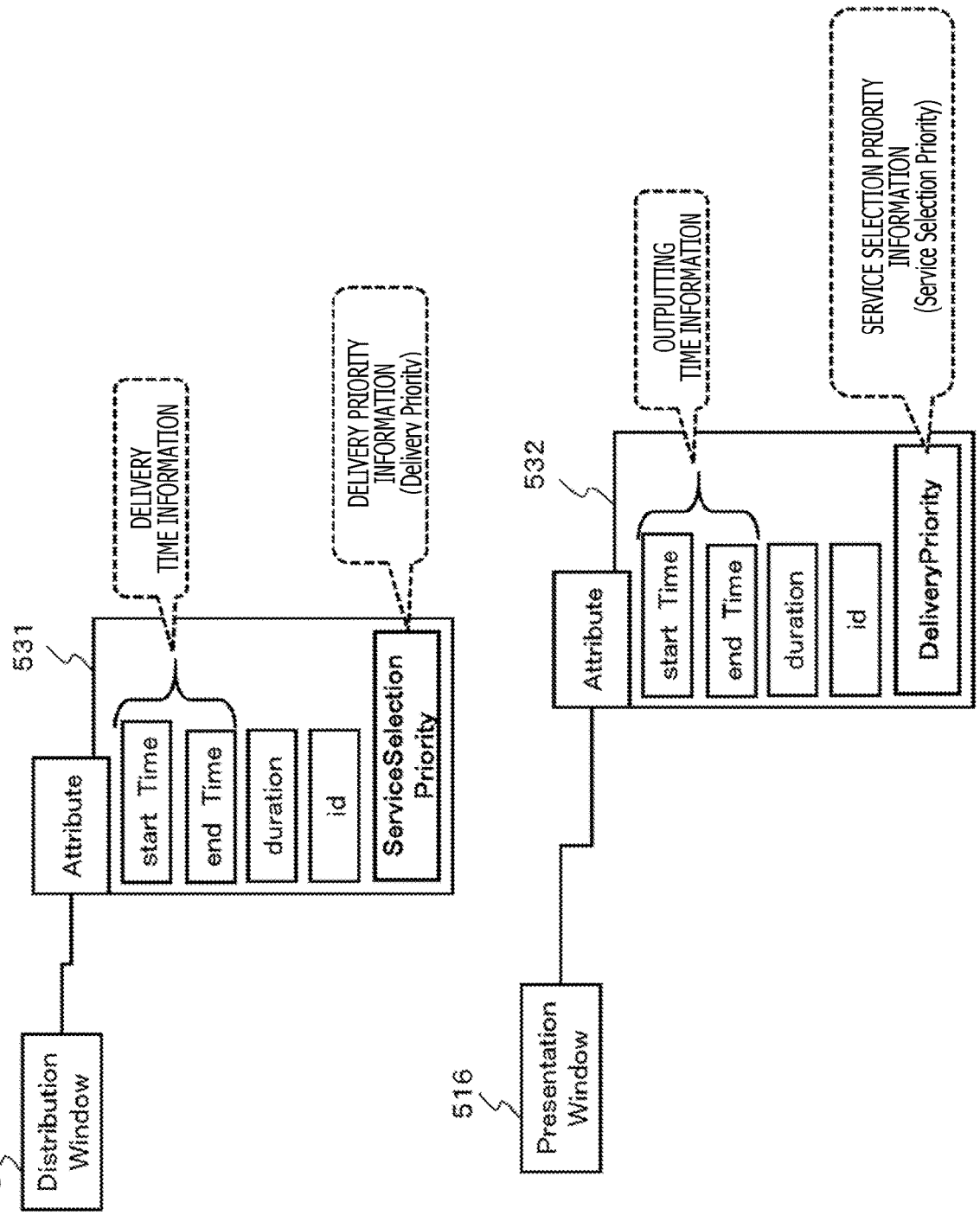
FIG. 35 is a view illustrating the different example of the recording configuration of priority information.

FIG. 35 depicts an example of recording information of the attribute (attribute) element 531 just below the distribution window (DistributionWindow) element 515 and recording information of the attribute (attribute) element 532 just below the presentation window (PresentationWindow) element 516.

In the attribute (attribute) element 531 just below the distribution window (DistributionWindow) element 515, as depicted in FIG. 35, delivery time information of an advertisement content (NRT content file), namely, a delivery start time point and end time point of the advertisement content, are recorded, and further, service selection priority information (Service Selection Priority) is recorded.

Further, in the attribute (attribute) element 532 just below the presentation window (PresentationWindow) element 516, outputting time information of an advertisement content, namely, a start time point and an end time point of the outputting time period of the advertisement from the reception apparatus, are recorded, and further, delivery priority information (Delivery Priority) is recorded.

The reception apparatus can receive an ESG before delivery of various advertisement contents transmitted from each broadcasting station and can analyze the received ESG to acquire such priority information as (1) delivery priority information (Delivery Priority) and (2) service selection priority information (Service Selection Priority)

corresponding to each advertisement content scheduled to be delivered.

The reception apparatus 30 can select an advertisement content whose reception and cache processes are to be executed in accordance with the acquired priority information.

12. Example of Configuration of Transmission Apparatus and Reception Apparatus

Now, an example of an apparatus configuration of the transmission apparatus (server) 20 and the reception apparatus (client) 30 that are communication apparatus is described with reference to FIGS. 36 and 37.

Figure 36:
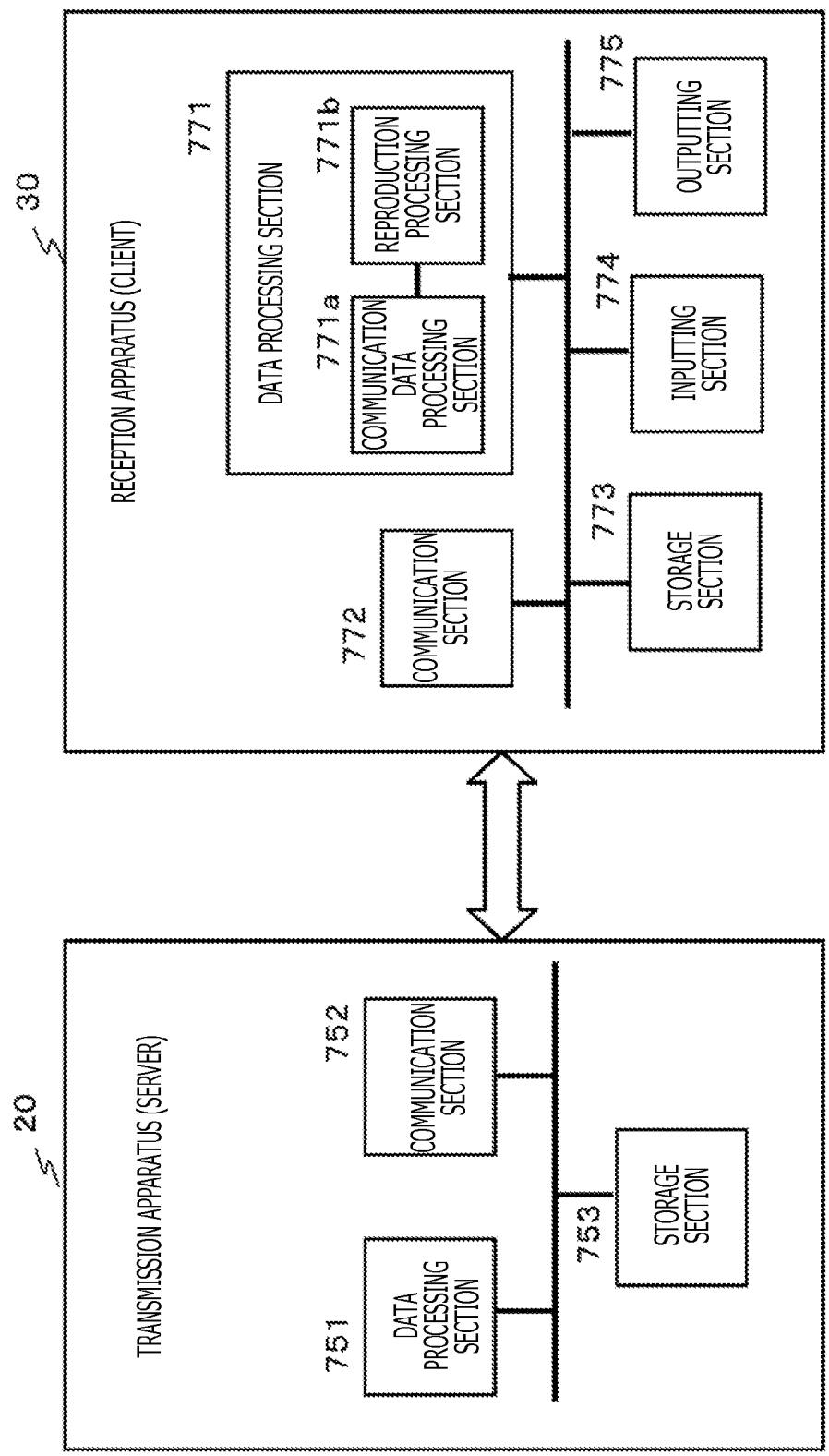
FIG. 36 is a view illustrating an example of a configuration of a transmission apparatus and a reception apparatus that are communication apparatus.

FIG. 36 depicts an example of a configuration of the transmission apparatus (server) 20 and the reception apparatus (client) 30.

The transmission apparatus (server) 20 includes a data processing section 751, a communication section 752, and a storage section 753.

The reception apparatus (client) 30 includes a data processing section 771, a communication section 772, a storage section 773, an inputting section 774, and an outputting section 775.

The data processing section includes a communication data processing section 771a and a reproduction processing section 771b.

The data processing section 751 of the transmission apparatus (server) 20 executes various data processes for executing a data delivery service. For example, the data processing section 751 performs creation and transmission control of configuration data of a data delivery service. Further, the data processing section 751 performs creation and transmission processes of an application, an NRT content, other various data, and signaling data to be provided to the reception apparatus (client) 30.

The communication section 752 performs a communication process such as delivery of an application, an NRT content file, other various data, signaling data and so forth in addition to an AV segment.

The storage section 753 stores AV segments, NRT content files, applications, data to be utilized by the applications, signaling data and so forth that are made a delivery target.

Further, the storage section 753 is utilized as a work area of data processing executed by the data processing section 751 and is utilized also as a storage region for various parameters.

On the other hand, the reception apparatus (client) 30 includes a data processing section 771, a communication section 772, a storage section 773, an inputting section 774, and an outputting section 775.

The communication section 772 receives data delivered from the transmission apparatus (server) 20, for example, AV segments, applications, data utilized by the applications, NRT content files, signaling data and so forth.

The data processing section 771 includes a communication data processing section 771a and a reproduction processing section 771b and executes processes, for example, in accordance with the working example described hereinabove and so forth.

In particular, the data processing section 771 executes data processing and so forth in which an application is utilized.

Instruction commands of a user, for example, various commands for channel selection, application activation, installation and so forth are inputted through the inputting section 774.

Reproduction data is outputted to the outputting section 775 such as a display section, a speaker or the like.

The storage section 773 stores AV segments, applications, data utilized by the applications, NRT content files, signaling data and so forth.

Further, the storage section 773 is utilized as a work area for data processing executed by the data processing section 771 and is utilized also as a storage region for various parameters.

Figure 37:
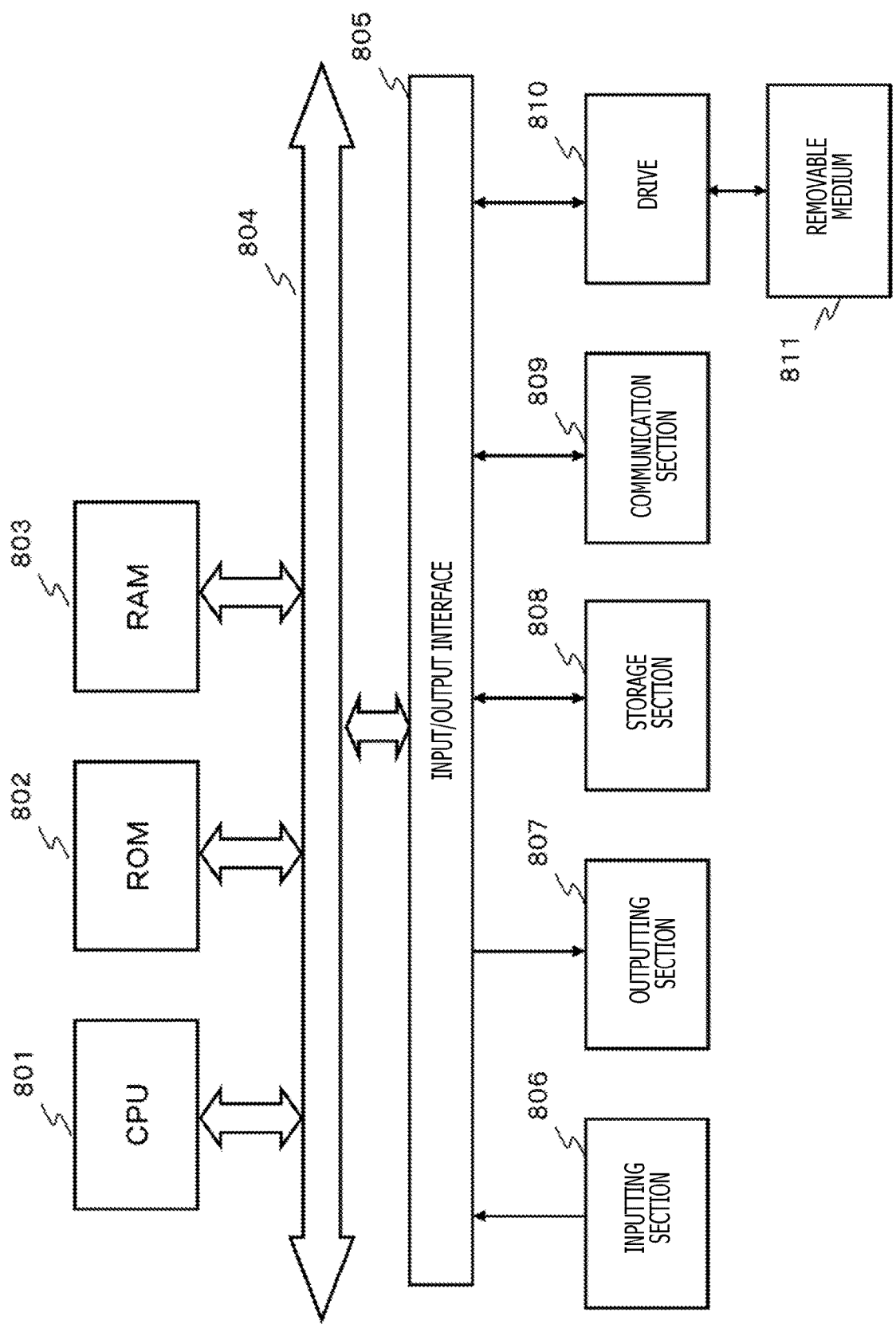
FIG. 37 is a view illustrating an example of a hardware configuration of the transmission apparatus and the reception apparatus that are communication apparatus.

FIG. 37 depicts an example of a hardware configuration of a communication apparatus that can be applied as the transmission apparatus 20 and the reception apparatus 30.

A CPU (Central Processing Unit) 801 functions as a data processing section that executes various processes in accordance with a program stored in a ROM (Read Only Memory) 802 or a storage section 808. For example, the CPU 801 executes, for example, the processes in accordance with the sequence described hereinabove in connection with the working example described above. Into a RAM (Random Access Memory) 803, a program to be executed by the CPU 801, data and so forth are stored. The CPU 801, ROM 802, and RAM 803 are connected to each other by a bus 804.

The CPU 801 is connected to an input/output interface 805 through the bus 804, and an inputting section 806 configured from various switches, a keyboard, a mouse, a microphone and so forth and an outputting section 807 configured from a display device, a speaker and so forth are connected to the input/output interface 805. The CPU 801 executes various processes in accordance with an instruction inputted from the inputting section 806 and outputs a result of the processes, for example, to the outputting section 807.

The storage section 808 connected to the input/output interface 805 is configured, for example, from a hard disk and stores a program to be executed by the CPU 801 and various data. A communication section 809 functions as a transmission and reception section of data communication through a network such as the Internet or a local area network and further functions as a transmission and reception section of a broadcasting wave, and communicates with an external apparatus.

A drive 810 connected to the input/output interface 805 drives a removable medium 811 such as a magnetic disk, an optical disk, a magneto-optical disk, a semiconductor memory such as a memory card or the like to execute recording or reading of data.

It is to be noted that, although encoding or decoding of data can be executed as a process of the CPU 801 as a data processing section, an alternate configuration that includes a codec as hardware for exclusive use for executing an encoding process or a decoding process may be applied.

13. Summary of Configuration of Present Disclosure

The working example of the present disclosure has been described in detail with reference to the specific working example. However, it is self-evident that those skilled in the art can implement modification or substitution without departing from the scope of the present disclosure. In particular, the present invention has been disclosed in the form of illustration and is not to be construed as restrictive. In order to decide the subject matter of the present disclosure, the claims should be referred to.

It is to be noted that the technology disclosed in the present specification can take such a configuration as described below.

(1) A transmission apparatus including:
a data processing section that
sets, for each of transmission contents, service selection priority information (Service Selection Priority) capable of being utilized as a cache process priority criterion in a reception apparatus, and
transmits the service selection priority information (Service Selection Priority) to the reception apparatus.

(2) The transmission apparatus according to (1), in which
the service selection priority information (Service Selection Priority) is priority information that makes it possible, in a case where delivery time periods of transmission contents through different channels overlap with each other, for the reception apparatus to select a content having a high value of the service selection priority information as a cache target.

(3) The transmission apparatus according to (1) or (2), in which
the data processing section transmits delivery time information regarding each of the transmission contents to the reception apparatus.

(4) The transmission apparatus according to any one of (1) to (3), in which
the content is an advertisement content.

(5) The transmission apparatus according to any one of (1) to (4), in which
the content is an advertisement content that is selectively outputted in response to user (viewer) information from the reception apparatus.

(6) The transmission apparatus according to any one of (1) to (5), in which
the data processing section records the service selection priority information (Service Selection Priority) into an electronic service guide (ESG: Electronic Service Guide) and transmits the service selection priority information (Service Selection Priority).

(7) The transmission apparatus according to any one of (1) to (5), in which
the data processing section records the service selection priority information (Service Selection Priority) into and transmitted together with signaling data.

(8) The transmission apparatus according to (7), in which
the signaling data is an FDT (File Delivery Table).

(9) A reception apparatus including:
a data processing section that receives contents and stores the contents into a cache section, in which
the data processing section
acquires service selection priority information (Service Selection Priority) set corresponding to each of the contents, and
preferentially receives, in accordance with the acquired service selection priority information (Service Selection Priority), a content having a high set value of the service selection priority information (Service Selection Priority) and stores the content into the cache section.

(10) The reception apparatus according to (9), in which
the data processing section
decides whether or not delivery time periods of a plurality of contents transmitted through different channels overlap with each other, and
in a case where it is decided that the delivery time periods overlap with each other,
acquires service selection priority information (Service Selection Priority) set corresponding to each of the plurality of contents whose delivery time periods overlap with each other and
preferentially receives, in accordance with the acquired service selection priority information (Service Selection Priority), a content having a high set value of the service selection priority information (Service Selection Priority) and stores the content into the cache section.

(11) The reception apparatus according to (9) or (10), in which
the content is an advertisement content.

(12) The reception apparatus according to any one of (9) to (11), in which
the content is an advertisement content that is selectively outputted in response to user (viewer) information from the reception apparatus.

(13) The reception apparatus according to any one of (9) to (12), in which
the data processing section acquires the service selection priority information (Service Selection Priority) from an electronic service guide (ESG: Electronic Service Guide).

(14) The reception apparatus according to any one of (9) to (12), in which
the data processing section acquires the service selection priority information (Service Selection Priority) from signaling data.

(15) The reception apparatus according to (14), in which
the signaling data is an FDT (File Delivery Table).

(16) A data processing method executed by a transmission apparatus, including:
by a data processing section,
setting, for each of transmission contents, service selection priority information (Service Selection Priority) capable of being utilized as a cache process priority criterion in a reception apparatus, and
transmitting the service selection priority information (Service Selection Priority) to the reception apparatus.

(17) A data processing method executed by a reception apparatus, including:

executing, by a data processing section, a process for receiving contents and storing the contents into a cache section, in which
the data processing section
acquires service selection priority information (Service Selection Priority) set corresponding to each of the contents, and
preferentially receives, in accordance with the acquired service selection priority information (Service Selection Priority), a content having a high set value of the service selection priority information (Service Selection Priority) and stores the content into the cache section.

Further, the series of processes described in the specification can be executed by hardware, software, or a composite configuration of the hardware and software. Where the processes are executed by software, a program in which the processing sequence is recorded can be installed into a memory in a computer incorporated in hardware for exclusive use and executed or the program can be installed into and executed by a general purpose computer that can execute various processes. For example, the program can recorded in advance in a recording medium. The program can be not only installed from a recording medium into a computer but also can be received through a network such as a LAN (Local Area Network) or the Internet and installed into a recording medium such as a built-in hard disk.

It is to be noted that the various processes described in the specification can be not only executed in a time series in accordance with the description but also executed in parallel or individually in response to a processing capacity of an apparatus that executes the processes or as occasion demands. Further, the term system in the present specification signifies a logical aggregation configuration of a plurality of apparatus and is not limited to a system in which apparatus of the components are provided in the same housing.

INDUSTRIAL APPLICABILITY

As described above, according to the configuration of one working example of the present technology, a configuration is implemented by which, in a case where delivery time periods of transmission contents through different channels overlap with each other, an acquisition target can be selected on the basis of priority information.

In particular, a transmission apparatus sets, for each of transmission contents, service selection priority information (Service Selection Priority) capable of being utilized as a cache process priority criterion in a reception apparatus, and transmits the service selection priority information to the reception apparatus. The service selection priority information is utilized as priority information that makes it possible, in a case where delivery time periods of transmission contents through different channels overlap with each other, for the reception apparatus to select a content having a high value of the service selection priority information as a cache target.

By the present configuration, a configuration can be implemented by which, in a case where delivery time periods of transmission contents through different channels overlap with each other, the reception apparatus can select an acquisition target on the basis of the priority information.

REFERENCE SIGNS LIST

10 Communication system
20 Transmission apparatus
21 Broadcasting server
22 Advertisement server
23 Data delivery server
30 Reception apparatus
31 TV
32 PC
33 Portable terminal
50 Signaling data
60 AV segment
70 Other data
110 Application controlling section
111 Application execution section
112 Advertisement insertion API
114 Cache controlling API
120 Reproduction controlling section
121 MPD acquisition section
122 MPD analysis section
123 Segment acquisition section
124 Segment analysis section
130 Base system
131 Cache controlling section
132 Cache section
133 First communication section (tuner)
134 Second communication section (network I/F)
133 Output controlling section
141 Decoding section
142 Outputting section
311 to 314 Period information
751 Data processing section
752 Communication section
753 Storage section
771 Data processing section
772 Communication section
773 Storage section
774 Inputting section
775 Outputting section
801 CPU
802 ROM
803 RAM
804 Bus
805 Input/output interface
806 Inputting section
807 Outputting section
808 Storage section
809 Communication section
810 Drive
811 Removable medium

The invention claimed is:
1. A transmission apparatus comprising:
circuitry configured to:
set, for each of transmission contents, service selection priority information capable of being utilized as a cache process priority criterion in a reception apparatus and delivery priority information, and
transmit the service selection priority information and delivery priority information to the reception apparatus, the delivery priority information associated with one of the transmission contents being transmitted prior to the one of the transmission contents, wherein
the service selection priority information is for the reception apparatus to preferentially select a content having a first value of the service selection priority information as a cache target over another content having a second value of the service selection priority information when delivery time periods of the transmission contents through different channels overlap with each other, and the delivery priority information, which is different from the service selection priority information, is for determining whether or not to perform execution of reception by the reception apparatus for each of the transmission contents, the delivery priority information being set by the transmission apparatus based on prediction data indicative of a distribution of viewing ratios of the transmission contents for a given period of time, the viewing ratios including a percentage for each of the transmission contents, a sum of the percentages being 100% in the given period of time.

2. The transmission apparatus according to claim 1, wherein
the circuitry is further configured to transmit delivery time information regarding each of the transmission contents to the reception apparatus.

3. The transmission apparatus according to claim 1, wherein
each of the transmission contents is an advertisement content.

4. The transmission apparatus according to claim 1, wherein
each of the transmission contents is an advertisement content that is selectively outputted in response to user information from the reception apparatus.

5. The transmission apparatus according to claim 1, wherein
the circuitry is further configured to record the service selection priority information into an electronic service guide and transmit the electronic service guide.

6. The transmission apparatus according to claim 1, wherein
the circuitry is further configured to record the service selection priority information into signaling data and transmit the signaling data.

7. The transmission apparatus according to claim 6, wherein
the signaling data is a File Delivery Table.

8. A reception apparatus comprising:
circuitry configured to:
receive delivery priority information associated with each of contents and determine whether or not to perform execution of reception by the reception apparatus for each of the contents based on the delivery priority information, which is set by a transmission apparatus based on prediction data indicative of a distribution of viewing ratios of the contents for a given period of time, the viewing ratios including a percentage for each of the contents, a sum of the percentages being 100% in the given period of time;
receive the contents upon the determination to perform the execution, and store the contents into a cache;
decide whether or not delivery time periods of the contents transmitted through different channels overlap with each other, and in a case where it is decided that the delivery time periods overlap with each other, acquire service selection priority information set corresponding to each of the contents whose delivery time periods overlap with each other, the service selection priority information being different from the delivery priority information; and
preferentially receive, in accordance with the acquired service selection priority information, a content having a first set value of the service selection priority information over another content having a second set value of the service selection priority information and store the content into the cache.

9. The reception apparatus according to claim 8, wherein each of the contents is an advertisement content.

10. The reception apparatus according to claim 8, wherein each of the contents is an advertisement content that is selectively outputted in response to user information from the reception apparatus.

11. The reception apparatus according to claim 8, wherein the circuitry is further configured to acquire the service selection priority information from an electronic service guide.

12. The reception apparatus according to claim 8, wherein the circuitry is further configured to acquire the service selection priority information from signaling data.

13. The reception apparatus according to claim 12, wherein
the signaling data is a File Delivery Table.

14. A data processing method executed by a transmission apparatus, the data processing method comprising:
setting, by circuitry of the transmission apparatus, for each of transmission contents, service selection priority information capable of being utilized as a cache process priority criterion in a reception apparatus and delivery priority information; and
transmitting the service selection priority information and delivery priority information to the reception apparatus, the delivery priority information associated with one of the transmission contents being transmitted prior to the one of the transmission contents, wherein
the service selection priority information is for the reception apparatus to preferentially select a content having a first value of the service selection priority information as a cache target over another content having a second value of the service selection priority information when delivery time periods of transmission contents through different channels overlap with each other, and the delivery priority information, which is different from the service selection priority information, is for determining whether or not to perform execution of reception by the reception apparatus for each of the transmission contents, the delivery priority information being set by the transmission apparatus based on prediction data indicative of a distribution of viewing ratios of the transmission contents for a given period of time, the viewing ratios including a percentage for each of the transmission contents, a sum of the percentages being 100% in the given period of time.

15. A data processing method executed by a reception apparatus, the data processing method comprising:
receiving, by circuitry of the reception apparatus, delivery priority information associated with each of contents and determine whether or not to perform execution of reception by the circuitry for each of the contents based on the delivery priority information, which is set by a transmission apparatus based on prediction data indicative of a distribution of viewing ratios of the contents for a given period of time, the viewing ratios including a percentage for each of the contents, a sum of the percentages being 100% in the given period of time;
receiving the contents upon the determination to perform the execution, and storing the contents into a cache;
deciding whether or not delivery time periods of the contents transmitted through different channels overlap with each other, and in a case where it is decided that the delivery time periods overlap with each other, acquiring service selection priority information set corresponding to each of the contents whose delivery time periods overlap with each other, the service selection priority information being different from the delivery priority information; and preferentially receiving, in accordance with the acquired service selection priority information, a content having a first set value of the service selection priority information over another content having a second set value of the service selection priority information and storing the content into the cache.

* * * * *